(12) United States Patent
Sharp

(10) Patent No.: US 6,310,673 B1
(45) Date of Patent: Oct. 30, 2001

(54) TRANSMISSIVE OPTICAL POLARIZING FILTERS DESIGNED TO MAXIMIZE A DESIRED PORTION OF A SPECTRAL OUTPUT

(75) Inventor: Gary D. Sharp, Boulder, CO (US)

(73) Assignee: University Technology Corporation, Boulder, CO (US)

( * ) Notice: Subject to any disclaimer, the term of this patent is extended or adjusted under 35 U.S.C. 154(b) by 0 days.

(21) Appl. No.: 09/362,954

(22) Filed: Jul. 30, 1999

Related U.S. Application Data

(63) Continuation of application No. 08/855,716, filed on May 8, 1997, now Pat. No. 5,953,083, which is a continuation-in-part of application No. 08/447,522, filed on May 23, 1995, now Pat. No. 5,751,384.

(51) Int. Cl.[7] .................................................. G02F 1/1335
(52) U.S. Cl. ............................. 349/106; 349/18; 349/61
(58) Field of Search ............................... 349/106, 18, 117, 349/119, 61; 359/634, 113

(56) References Cited

U.S. PATENT DOCUMENTS

| | | | |
|---|---|---|---|
| 2,493,200 | 1/1950 | Land | 88/112 |
| 2,638,816 | 5/1953 | Stolzer | 88/61 |
| 4,003,081 | 1/1977 | Hilsum et al. | 358/64 |
| 4,019,808 | 4/1977 | Scheffer | 350/160 LC |
| 4,025,164 | 5/1977 | Doriguzzi et al. | 350/160 LC |
| 4,232,948 | 11/1980 | Shanks | 350/347 |
| 4,367,924 | 1/1983 | Clark et al. | 350/334 |
| 4,416,514 | 11/1983 | Plummer | 350/335 |
| 4,448,823 | 5/1984 | Clifford | 428/1 |
| 4,497,543 | 2/1985 | Aoki et al. | 350/337 |
| 4,525,413 * | 6/1985 | Rogers et al. | 428/212 |
| 4,566,761 | 1/1986 | Carlsen et al. | 350/401 |
| 4,575,193 | 3/1986 | Greivenkamp, Jr. | 350/401 |
| 4,582,396 | 4/1986 | Bos et al. | 350/347 |
| 4,635,051 | 1/1987 | Bos et al. | 340/757 |
| 4,652,087 | 3/1987 | Bos et al. | 350/332 |
| 4,685,773 | 8/1987 | Carlsen et al. | 350/401 |
| 4,758,818 | 7/1988 | Vatne | 340/701 |
| 4,759,612 | 7/1988 | Nakatsuka et al. | 350/337 |

(List continued on next page.)

FOREIGN PATENT DOCUMENTS

| | | | |
|---|---|---|---|
| 4029838 | 3/1991 | (DE) | 349/97 |
| 488544A1 * | 6/1992 | (EP) | |
| 56137307A | 10/1981 | (JP) | |
| 63182987A | 7/1988 | (JP) | |
| 03028823A | 2/1991 | (JP) | |
| 04207774A | 7/1992 | (JP) | |
| Hei 7-84218 | 3/1995 | (JP) | |
| WO 90/09614 | 8/1990 | (WO) | G02F/1/133 |

OTHER PUBLICATIONS

U.S. application No. 07/967,218, Sharp et al., filed Oct. 27, 1992.

(List continued on next page.)

*Primary Examiner*—Kenneth Parker
(74) *Attorney, Agent, or Firm*—Fleshner & Kim, LLP

(57) ABSTRACT

This invention provides a complementary color polarizer using a single polarizing film followed by a stack of two or more retarders. In a preferred embodiment, the color polarizers of this invention produce orthogonally polarized complementary primary colors (red/cyan, green/magenta, or blue/yellow). This invention further provides color filters which utilize the color polarizers of this invention in combination with a polarization separator to separate the orthogonally polarized colors. The polarization separator can be passive, such as a polarizing beam splitter, or active, such as a switchable polarizer. The switchable polarizer can employ a nematic or a smectic liquid crystal cell. Two color filters of this invention can be cascaded to provide a three color (RGB) filter with an off-state. In combination with a monochrome display or camera, the color filters of this invention provide color displays or cameras.

32 Claims, 34 Drawing Sheets

U.S. PATENT DOCUMENTS

| | | | |
|---|---|---|---|
| 4,770,500 | 9/1988 | Kalmanash et al. | 350/347 E |
| 4,770,525 | 9/1988 | Umeda et al. | 353/122 |
| 4,796,978 | 1/1989 | Tanaka et al. | 350/337 |
| 4,834,508 | 5/1989 | Fergason | 350/339 F |
| 4,867,536 | 9/1989 | Pidsosny et al. | 350/337 |
| 4,917,464 | 4/1990 | Conner | 350/335 |
| 4,917,465 | 4/1990 | Conner et al. | 350/335 |
| 4,966,441 | 10/1990 | Conner | 350/335 |
| 5,032,007 | 7/1991 | Silverstein et al. | 350/335 |
| 5,033,825 | 7/1991 | Ishikawa et al. | 350/339 |
| 5,050,965 | 9/1991 | Conner et al. | 359/53 |
| 5,122,887 | 6/1992 | Mathewson | 349/97 |
| 5,126,864 | 6/1992 | Akiyama et al. | 359/53 |
| 5,132,826 * | 7/1992 | Johnson et al. | 349/117 |
| 5,179,459 | 1/1993 | Plesinger | 359/74 |
| 5,237,435 | 8/1993 | Kurematsu et al. | 359/41 |
| 5,243,455 | 9/1993 | Johnson et al. | 359/93 |
| 5,268,782 | 12/1993 | Wenz et al. | 359/81 |
| 5,299,039 | 3/1994 | Bohannon | 359/53 |
| 5,347,378 | 9/1994 | Handschy et al. | 359/53 |
| 5,422,756 | 6/1995 | Weber | 359/487 |
| 5,469,279 | 11/1995 | Sharp et al. | 359/53 |
| 5,528,393 | 6/1996 | Sharp et al. | 359/53 |
| 5,559,634 | 9/1996 | Weber | 359/638 |
| 5,565,933 | 10/1996 | Reinsch | 348/742 |
| 5,574,580 | 11/1996 | Ansley | 359/41 |
| 5,585,950 | 12/1996 | Nishino et al. | 349/118 |
| 5,608,551 | 3/1997 | Biles et al. | 359/95 |
| 5,642,214 * | 6/1997 | Ishii et al. | 349/96 |
| 5,658,490 | 8/1997 | Sharp et al. | 252/299.01 |
| 5,686,931 | 11/1997 | Fünfschilling et al. | 345/88 |
| 5,689,317 | 11/1997 | Miller | 349/97 |
| 5,751,384 | 5/1998 | Sharp | 349/18 |
| 5,828,488 * | 10/1998 | Ouderkirk et al. | 349/62 |

OTHER PUBLICATIONS

Scheffer, T.J., "New multicolor liquid crystal displays that use a twisted nematic electro–optical cell," J., Appl. Phys. (1973) 44(11):4799–4803.

Carlsen, W.J. and Buhrer, C.F., "Flat Passband Birefringent Wavelength–Division Multiplexers," Electronics Letters (1987) 23(3):106–107.

Wright, H., et.al., "Active filters enable color imaging," Laser Focus World (May 1996) 85–90.

Cambridge Research & Instrumentation, Inc., "Liquid Crystal Tunable Filter," Cambridge, MA, 2 pages.

Displaytech, Inc. (Jan., 1996), "Switchable Color Filter", Boulder, CO, 4 pages.

Title, A.M. and Rosenberg, W.J., "Tunable birefringent filets," Opt. Eng., (1981) 20(6):815–823.

Solc, Ivan, "Birefringent Chain Filters," J. Opt. Soc. Am. (1965) 55(6):621–625.

Wu, Shin–Tson, "Birefringence dispersions of liquid crystals," Physical Review A, (1986) 33(2):1270–1274.

Harris, S.E., et.al., "Optical Network Synthesis Using Birefingent Crystals, I. Synthesis of Lossless Networks of Equal–Length Crystals," J. Opt. Soc. America (1964) 54(10):1267–1279.

Amman, E.O., "Optical Network Synthesis Using Birefringent Crystals, III., Some General Properties of Lossless Birefringent Networks," J. Opt. Soc. America (1966) 56(7):943–951.

Amman, E.O. and Yarborough, J.M., "Optical Network Synthesis Using Birefringent Crystals V. Synthesis of Lossless Networks Containing Equal–Length Crystals and Compensators," J. Opt. Soc. America (1966) 56(12):1746–1754.

Sharp, G.D., et.al., "P–60: Color Switching Using Ferroelectric Liquid Crystals,"Society for Information Display, International Symposium, Digest of Technical Papers, vol. XXIV, Seattle, Washington, May 18–20, 1993.

Kondo, et.al., "Ferroelectric Liquid Crystal Materials Applied to Guest–Host Type Displays," Ferroelectrics (1988) 85:361–373.

Billings, BH., "A Tunable Narrow–Band Optical Filter," J. Opt. Soc. America (1947) 37:738–746.

P.J. Shannon, et al., "Patterned optical properties in photopolymerized surface–aligned liquid–crystal films", Nature, vol. 368, Apr. 7, 1994, pp. 532 & 533.

Schadt, et al, "Photo–Generation of Linearly Polymerized Liquid Crystal Aligning Layers Comprising Novel, Integrated Optically Patterned Retarders and Color Filters", Jpn, J. Appl. Phys. vol. 34 (1995) pp. 3240–3249 Part 1, No. GA, Jun. 1995.

Pochi Yeh, "Optical Waves in Layered Media", pp. 1–35.

J.L. Pezzaniti, et al. "Phase–only modulation of a twisted nematic liquid–crystal TV by use of the eigenpolarization states" Optics Letters, Sep. 15, 1993, vol. 18, No. 18.

Andersson, G. et al. "Device physics of the soft–mode electro–optic effect,"J. Appl. Phys. (1989) 66(10): 4983–4995.

Evans, John W., "the birefringent Filter,"J. Optical Soc. of America (1949), 39(3): 229–242.

Korester, Charles, J., "Achromatic Combinations of Half–Wave Plates,"J. Optical Soc. of America (Apr. 1959) 49(4): 405–409.

Steel, W.H., "Detailed theory of the 1/8 Å Birefringent Filter," National Standards Laboratory Technical Paper No. 17, 1–18(1961), 497–512.

Schiffman, et al., "Birefringent Filter for Millimeter Waves," IEEE Transactions on Microwave Theory and Techniques, vol. MIT–16, No. 6, Jun. 1968.

Sharp, G.D. et al., "Smectic Liquid Crystal Tunable Filters, "Ferroelectrics (1991) 114:55–69.

Sharp, Gary Dean, "Chiral smectic liquid crystal tunable optical filters and modulators", 1992.

* cited by examiner

FIG. 26

TRANSMISSIVE OPTICAL POLARIZING FILTERS DESIGNED TO MAXIMIZE A DESIRED PORTION OF A SPECTRAL OUTPUT

This application is a Continuation of application Ser. No. 08/855,716 filed May 8, 1997, now U.S. Pat. No. 5,953,083 which is a Continuation of application Ser. No. 08/447,522, filed May 23, 1995, now U.S. Pat. No. 5,751,384.

FIELD OF THE INVENTION

This invention pertains to color polarizers consisting of a polarizer in combination with a stack of retardation films, and to their use in liquid crystal switchable color filters and color displays with high saturation and high throughput.

BACKGROUND OF THE INVENTION

Switched Polarizer Filters

There are two basic classes of liquid crystal color switching filters: polarization interference filters (PIFs) and switched-polarizer-filters (SPFs). The basic unit of an SPF is a stage, consisting of a color polarizer and a two-state neutral polarization switch. This class is intrinsically binary tunable, such that each filter stage permits switching between two colors. Stages are cascaded in order to provide additional output colors. Color polarizers used in SPFs include single retardation films on neutral linear polarizers and pleochroic color polarizing filters. The polarization switch can be a liquid crystal (LC) polarization switch preceding a static polarization analyzer. The switch optimally provides neutral polarization switching. The chromatic nature of the active element degrades performance and is ideally suppressed in an SPF.

Shutters based on a color polarizer consisting of a neutral-polarizer followed by a single retarder are well reported in the art (for example in U.S. Pat. Nos. 4,003,081 to Hilsum, 4,091,808 to Scheffer and 4,232,984 to Shanks). While the polarizer/retarder structure can be described as a complementary color polarizer in the sense that it is possible to produce two distinct hues by rotating the polarizer through 90 degrees, using this type of color polarizer in an SPF does not result in saturated colors.

Shutters based on pleochroic color polarizers are also well reported (for example in U.S. Pat. Nos. 4,582,396 to Bos, 4,416,514 to Plummer, 4,758,818 to Vatne and 5,347,378 to Handschy). Pleochroic color polarizers are films that function as linear polarizers in specific wavelength bands. They are formed by doping a polymer with long-chain pleochroic dyes. Incident white light polarized along one axis is fully transmitted, but is selectively absorbed along the orthogonal axis. For instance, a cyan color polarizer functions as a linear polarizer by absorbing the red along one axis. A color polarizer that passes a primary color (either additive or subtractive) along each axis can be formed as a composite consisting of two films with crossed axes. Colors are typically selected using crossed complementary color (eg. red/cyan) polarizer films coupled with a switchable polarizer. A full-color device can comprise five polarizing films (one neutral), and two switching means. The resulting structures provide poor overall peak transmission.

Polarization Interference Filters

The simplest PIFs are essentially two-beam interferometers, where a uniaxial material induces a phase shift between orthogonally polarized field components. Color is generated by interfering these components with an analyzing polarizer. Color switching is accomplished by changing the phase shift between the arms. The most rudimentary color switches comprise a single variable retarding means between neutral polarizers. Single stage devices can also incorporate passive bias retarders with variable birefringence devices. However, these single stage PIFs are incapable of providing saturated color.

PIFs often comprise cascaded filter units in a Lyot structure, each performing a distinct filtering operation to achieve improved selectivity. A polarization analyzer is required between each phase retarder, reducing transmission. Though adequate color saturation is obtained, multiple-stage birefringent filters are by definition incapable of-functioning as color polarizer. This is quite simply because color polarizers must transmit both orthogonal polarizations, which does not permit internal polarizers.

Tuning is accomplished by varying the retardance of active elements in each stage, maintaining specific relationships between retardances, in order to shift the pass-band. PIFs use LC elements as variable retarders in order to shift the transmission spectrum. As such, in contrast to SPF, the chromaticity of the active element retardance is not only acceptable, it is often an integral aspect of the design. In PIF designs, an analyzing polarizer is a static component and tuning is accomplished by changing the retardance of the filter elements. When multiple active stages are used, the retardances are typically changed in unison to shift the pass-band, while maintaining the basic design. Variable birefringence PIFs can be tuned to provide peak transmission at any wavelength. By contrast, SPFs do not provide tunable color.

Solc filters (Solc (1965), J. Opt. Soc. Am. 55:621) provide high finesse spectra using a cascade of identical phase retarders, with complete elimination of internal polarizers. The Solc filter is a specific example of a much broader class of filters. In this generalization, Harris et al. (Harris et al. (1964), J. Opt. Soc. Am. 54:1267) showed that any finite impulse response (FIR) filter transmission function can in principle be generated using a stack of properly oriented identical retardation plates. Numerous researchers have used the network synthesis technique, along with standard signal processing methods, to generate FIR filter designs. These designs have focussed on high resolution as opposed to broad pass-bands. Tunability, when mentioned, requires that all retardances are varied in unison.

The color polarizer of the present invention, though using some of the design principles of polarization interference filter technology, is a component for use in switched-polarizer-filter structures. Prior art PIF devices require fully active retarder stacks to effectively shift the design wavelength of the filter while maintaining the basic design. Conversely, the color polarizers of the present invention use a passive retarder stack to generate a particular fixed spectral profile which is, as in SPF, invertible by using effective rotation of the analyzing polarizer.

SUMMARY OF THE INVENTION

This invention provides a complementary color polarizer using a single neutral polarizing film followed by a stack of two or more retardation films. This technology is termed "polarizer-retarder-stack" (PRS). The use of more than one retarder in the retarder stack increases the span of the filter impulse response and the retarder orientations are selected to control the amplitudes of the impulses. In a preferred embodiment, the color polarizers of this invention produce orthogonally polarized complementary primary colors (red/cyan, green/magenta, or blue/yellow). In combination with a blocking filter, the color polarizer of this invention produces two orthogonally polarized additive primary colors. Similarly, when a pleochroic color polarizer follows a PRS, it can produce two orthogonally polarized additive primaries. In an alternative structure, a pleochroic color polarizer is used instead of the neutral polarizer, and the color polarizer produces two orthogonally polarized additive primary colors in combination with one unpolarized additive primary to give the appearance of two subtractive primary colors.

This invention further provides color filters which utilize the color polarizers of this invention in combination with a polarization separator to separate the orthogonally polarized colors. The polarization separator can be passive, such as a polarizing beam splitter, or active, such as a switchable polarizer. The switchable polarizer can be a rotatable polarizer or a polarization switch in combination with a fixed polarizer. The polarization switch can employ a nematic or a smectic liquid crystal cell. The fixed polarizer can be a pleochroic color polarizer, in which case one additive primary is transmitted unpolarized. Two color filters of this invention can be cascaded to provide a three color (RGB) filter with an off-state. In combination with a monochrome display, the color filters of this invention provide color displays. In combination with a camera or electronic receiver array, the color filters of this invention provide a color camera, digital photography and electronic multispectral imaging.

It is a further object of this invention to provide saturated additive primary colors, which are not in general produced using single-retarder color polarizers of the prior art. The term saturated color refers to colors which appear monochromatic to the human eye. Design of saturated color polarizers can be accomplished using network synthesis techniques, which work backwards from the desired spectrum via the impulse response to calculate the appropriate retarder stack designs. By proper selection of number, orientation, and retardance of each component, color polarizer designs are identified that transmit substantially all of one additive primary band along one axis, and substantially all of the complementary subtractive primary band along the orthogonal axis. The term subtractive primary band refers to the inverse of an additive primary band.

The color polarizer designs of this invention provide arbitrarily narrow transition bandwidths not achievable with pleochroic dyes or single retardation film color polarizers. Furthermore, spectral profiles synthesized using finite-impulse-response (FIR) filter designs, permit multiple transmission maxima in the pass-band, with control of pass-band ripple, and multiple nulls in the stop-band.

It is yet a further object of this invention to provide complementary color polarizers with high light efficiency. This is accomplished using only a single high-efficiency polarizing film, followed by near lossless polymer retarder films. Prior art pleochroic dye complementary color polarizers require two polarizing films. In the present invention, transmission maxima can be positioned to coincide with source emissions in each primary color band by means of a simple retardation adjustment. Alternatively, all-purpose PRS designs can be generated that transmit a broad bandpass spanning the entire primary band.

It is still a further object of this invention to provide high-performance color polarizer structures that are simple to produce and can be fabricated using materials that are readily available. First, this is achieved using designs that provide saturated colors while minimizing the number of films comprising the stack. Second, the color polarizers of this invention can utilize available low-cost high performance materials produced for the flat-panel display industry. This includes high clarity, uniform retardance, large area stretched polymer retardation films. These films are available in arbitrary retardances (up to 2000 nm), giving the flexibility required to produce designs tailored to specific sources. Low-loss adhesive layers can be applied that allow easy integration of components. Films with three-dimensional stretching are also available that provide wider viewing angle, with little additional cost. This technology further capitalizes on the availability of high-efficiency, high-contrast, large-area dichroic polarizer material for visible (400–700) operation.

BRIEF DESCRIPTION OF THE DRAWINGS

FIG. 8, comprising

FIG. 12, comprising

FIG. 13, comprising

FIG. 15, comprising

FIG. 23, comprising

FIG. 26 is a three-color filter using two rotative achromatic half-wave polarization switches and two square-profile retarder stacks.

FIG. 27, comprising

FIG. 28, comprising

DETAILED DESCRIPTION OF THE PREFERRED EMBODIMENT

Figure 1:
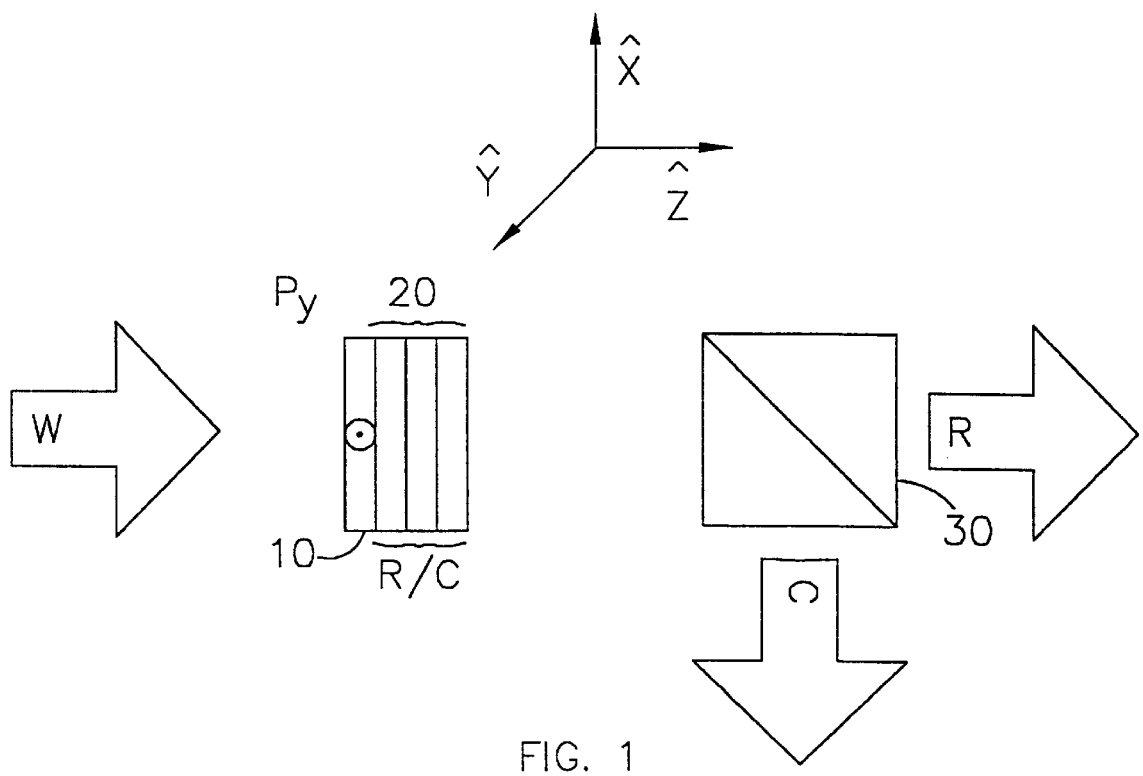
FIG. 1 is a diagram of a PRS used as a separator of complementary primary colors.

The color polarizers of this invention, illustrated in FIG. 1, use a neutral linear polarizer 10 in combination with a stack of retarders 20, termed "polarizer-retarder-stack" (PRS). The number of retarders in stack 20 and the retardances and orientations of the retarders are selected such that an additive primary spectrum is transmitted along a first polarization axis and the complementary subtractive primary spectrum is transmitted along the orthogonal polarization axis. The orientations of retarders in retarder stack 20 are defined herein with respect to the axis of polarization of polarizer 10. The retardance of the retarders is specified herein as the retardance at a design wavelength, typically the pass-band center.

PRS is intrinsically a "complementary color polarizer" technology. Complementary colors are any two colors which, when combined, produce white. In FIG. 1 the complementary colors are red and cyan (R/C), but they can alternatively be green and magenta (G/M) or blue and yellow (B/Y). PRS polarizes input white light and then transforms it into orthogonally polarized complementary colors.

As illustrated in FIG. 1, PRS can be followed by passive polarization separator (polarizing beamsplitter) 30 to retain both additive and subtractive primary bands. This has many applications, particularly in the field of single-source projection display. Alternatively, PRS can be followed by an active polarization separator such as a polarization switch that effectively modulates the orientation of an analyzing polarizer to select between the additive or subtractive primary color. Such structures are particularly useful in the field of frame-sequential color video systems, including video cameras and video displays.

Figure 2:
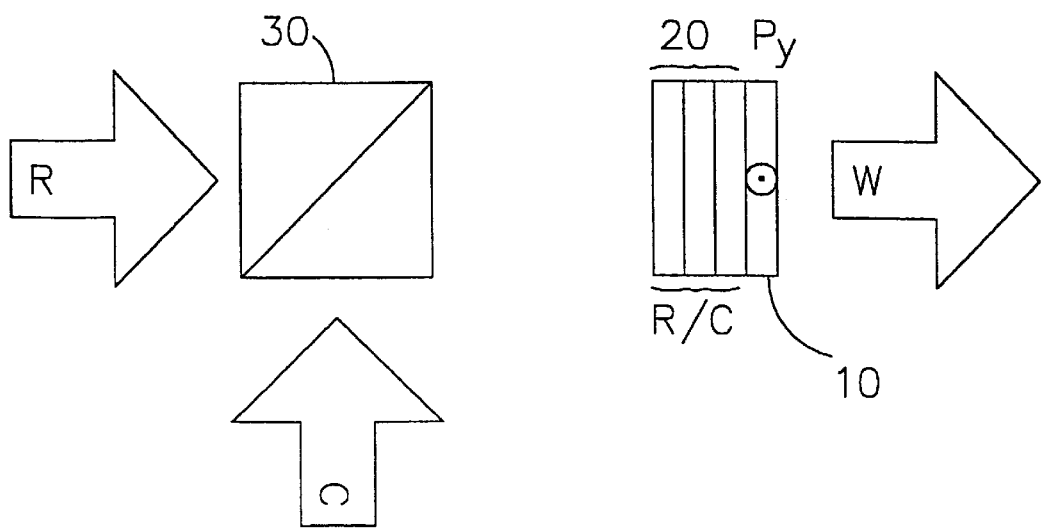
FIG. 2 is a diagram showing reciprocal use of a PRS as a combiner of complementary colors, to form white light in a single polarization.

PRS can be used in a reciprocal fashion for combining colors, or superimposing wavelength bands in a single polarization state, as shown in FIG. 2. A PRS (10 and 20) in combination with polarizing beamsplitter 30 can thus combine orthogonally polarized complementary colors to produce white light in a single polarization state. Such structures are useful for superimposing sources operating in different wavelength bands, in order to produce colinearly propagating polarized beams with no loss of light. Such is the case in projection display systems using individual red, green and blue sources.

The present invention teaches a method for designing structures for the effective isolation of an additive primary color (red, green, or blue) from it's complementary subtractive primary color (cyan, magenta, or yellow). PRS thus provides orthogonally polarized additive and subtractive primary colors from input unpolarized white light. Prior art pleochroic color polarizers require two polarizing films to accomplish the same function and consequently have lower throughput. Since a subtractive primary bandwidth exceeds that of an additive primary, nominally by a factor of two, the color polarizer of this invention must be more selective than is possible with single-retarder prior art devices. PRS optimally provides high peak transmission throughout the additive primary band along one axis, with no transmission of the subtractive primary band. The complementary spectrum, along the orthogonal axis, provides effective blocking of the additive primary band and efficient transmission of the subtractive primary band. In a preferred embodiment, this represents multiple pass-band maxima and stop-band nulls, along with a narrow transition bandwidth. This is accomplished by using additional retarders to increase the content of the impulse response and thereby more closely approximate the ideal transmission profile.

Due to the availability of high efficiency neutral polarizer materials, as well as near lossless stretched polymer films, PRS color polarizers are constructed with very high throughput. In addition, the spectral transmission functions are not constrained by the characteristics of available pleochroic dye materials. This can further enhance throughput by allowing the peak transmission to be tailored to the spectral characteristics of the source. Finally, the color contrast and narrow transition bandwidths provided by PRS designs of this invention provide far superior saturation to that possible with pleochroic dye or single retarder color polarizers.

PRS Design Optimization

The PRS designs of this invention are produced using several design steps, including identification of the ideal spectral profile, series approximation of the profile, apodization of the profile, generation of the stack design from the profile, and design of the final color polarizer at each primary using the profile and real material parameters. The ultimate stack design results from a fundamental compromise between the complexity of the stack (number of retarders and alignment tolerances), and the quality of the transmission spectrum, characterized by saturation and throughput. That is, given an unlimited number of impulses and span of the impulse train, the ideal transmission function can in principle be generated. Conversely, the simplest structure is a single retarder, which generates unsaturated colors that are inadequate for most purposes. Between these extremes are compromise solutions that yield very high performance in only a few layers.

In general, a sequence of N retarders generates a total of $2^N$ time impulses. When equal thickness retarders are used, this number is reduced to (N+1). Note that when the design allows multiple retarders of the same orientation, the retarders can be replaced by a single retarder with the summed retardance. In a more general sense, zero-order retardances can be added to any of the elements to produce quasi-achromatic retardance shifts. This permits complex impulse responses, which produce additional design options. The present invention comprises structures generating three or more time impulses, with amplitudes selected to optimize color saturation and throughput. These amplitudes are controlled by the orientations and retardances of the waveplates and the analyzing polarizer. These parameters are determined using the network synthesis method, based on a suitable truncation of the series describing the optimum profile.

The design begins by specifying the ideal amplitude or intensity transmission profile for the color polarizer, which accounts for coupled additive and inverse subtractive spectra. The Fourier transform of this function represents the infinite impulse response. The filter is constructed using N retarders, representing (N+1) samples of the impulse response. Consequently, the spectrum is periodic with period determined by the separation of time samples, determined by the retardance of each element. Since the additive spectrum can have only a single pass-band, this sampling must be sufficiently frequent to insure that higher/lower orders do not lie in the visible spectrum. This is equivalent to stating that the order of the retarders determines the free-spectral-range (FSR) of the filter. In practice, the "duty-ratio" (on-state:off-state) of the spectrum depends a great deal on the center wavelength of the particular primary band, since the rate of retardance change depends strongly on center wavelength. Since optimization focusses on minimizing the number of extraneous time samples, minimizing the FSR required for adequate visible blocking is the first step. At the minimum FSR, an adjacent order of the additive primary band lies proximate to, but not inside, the visible range. Although adjacent orders fall outside the visible range, a bandtail of an adjacent order may extend into the visible range, and ripples can occur in the visible range.

Once the minimum sampling interval is specified, it remains to determine the number and amplitudes of the impulses. These can simply be the Fourier coefficients of the series, truncated at a maximum number. However, truncating with a rectangular window function produces pass-band ripple and stop-band side-lobes which degrade performance. An alternative is to first multiply the impulse response function by a suitably tapered window function. Many of these are known in signal-processing, including Hamming, Hanning, Blackman, and Kaiser windows. The result is a windowed (truncated) Fourier series, which is the input to the network synthesis program. For still more optimum selection of impulse response, iterative design procedures can be used, such as frequency-sampling, or equiripple design approximations. Once the impulse response is determined, the retarder/polarizer orientations are selected using the network synthesis technique.

The network synthesis technique (see Harris et al. (1964), J. Opt. Soc. Am. 54:1267, Ammann et al. (1966), J. Opt. Soc. Am. 56:1746, and Ammann (1966), J. Opt. Soc. Am. 56:943) is a procedure for determining the orientations of the N retarders, and the exit polarizer, to obtain the desired amplitudes of the (N+1) impulses. Since PRS structures produce a finite impulse response, the transmission spectra generated by an analyzing polarizer depend intimately on the amplitudes of the time-domain impulses and the orientation of the polarizer. Many transmission functions which may be suitable for use as complementary primary color polarizer can be generated. Furthermore, it is well-known that the network synthesis technique generates multiple configurations for realizing filters with identical spectral profiles. The simplest design to fabricate can be selected from this set. It is thus recognized that the specific designs given herein are a sub-set of PRS designs capable of separating additive and subtractive primary bands.

Once the orientations have been selected for the optimum profile, the design parameters are analyzed with standard Mueller matrix techniques, which include a dispersion fit to specific retarder materials. The retardances are then selected to provide optimum color saturation at each primary for specific materials. The criteria for evaluating PRS designs is based on considerations of saturation, hue, and throughput. In any PRS design, one must be concerned with how these parameters affect both additive and subtractive primary spectra, which are intimately coupled. The saturation and hue are evaluated using the CIE chromaticity diagram. The quality of color generated by a particular filter output can be characterized by calculating a series of overlap integrals, including the transmission function for a specific filter state, the power spectrum of the source, and the CIE color matching functions.

The point describing each output color on the 1931 chromaticity diagram is obtained by the calculation $$x(\alpha) = \frac{X(\alpha)}{X(\alpha) + Y(\alpha) + Z(\alpha)}$$

$$y(\alpha) = \frac{Y(\alpha)}{X(\alpha) + Y(\alpha) + Z(\alpha)}$$

where $\alpha$ is and index giving the state of the filter (RGB). The terms are calculated by the overlap integrals $$X(\alpha) = \int P_s(\lambda) T(\lambda, \alpha) \bar{x}(\lambda) d\lambda$$

$$Y(\alpha) = \int P_s(\lambda) T(\lambda, \alpha) \bar{y}(\lambda) d\lambda$$

$$Z(\alpha) = \int P_s(\lambda) T(\lambda, \alpha) \bar{z}(\lambda) d\lambda$$

where $\bar{x}, \bar{y}, \bar{z}$ are the 1931 CIE color matching functions. $P_s(\lambda)$ is the power spectrum of the source and $T(\lambda, \alpha)$ is the transmission function of the filter in state $\alpha$.

Saturated primary colors are generated by maximizing the ratio between source power transmitted in the desired primary band to that transmitted outside of the primary band. Since the PRS design is often matched to the source characteristics, optimization can be quite specific. In general, one can state that true white sources, such as a 6000

K black body, place greater demand on filter performance than distributed sources, such as a CRT phosphor. In fact, the latter can be regarded a white source which is effectively preconditioned by a passive filter. It is well-known that passive filters can always be inserted to reject bands that lie outside of the primary color bands to increase saturation.

A particular primary color spans a well defined spectral band of the source. As such, an ideal PRS permits this entire band to pass with no insertion loss, while producing high optical density for blocking the remaining light. This implies a very steep transition slope, along with a series of distributed high-contrast nulls in the blocking band. Ideal PRS structures can in principle be produced, yet often with a prohibitive number of retarder films. A fundamental design complexity can be estimated by simply considering the Fourier content of the desired transmission spectrum, which gives the impulse response. In practice, acceptable transition slopes and side-lobe amplitudes/locations must be judiciously chosen to optimize saturation with a limited number of components.

Since saturation and hue are measures of weighted power ratios, they say nothing specific about the absolute transmission of the structure. Because applications for tunable filters often demand low insertion loss, the throughput is therefore a separate point of optimization. Fundamentally these are at odds since maximum power transmission occurs for full transmission of the source, or maximum desaturation. In reality, one must select the cutoff wavelengths for each primary color band initially. It is then reasonable to maximize in-band transmission exclusively, making the requirements for high saturation and high throughput compatible.

Filter parameters affecting saturation and throughput are briefly discussed in the following. Note that the spectra are described in terms of the additive primary, though it is implied that nulls in the additive primary spectrum represent peaks for the subtractive spectrum, and vice-versa.

Peak Transmission

This is maximized by using high efficiency polarizer, low-loss retarders, and a design that minimizes polarization related losses in the primary band. For PRS designs, absorption by the polarizer is typically the dominant source of loss. However, methods known in the prior art for bleaching polarizer can be used to trade null contrast for increased throughput. Practical considerations, such as AR coatings on exposed polarizer surfaces to minimize Fresnel losses also decrease glare and insertion loss.

Resolution

From a throughput standpoint, the resolution must be sufficiently low to sustain peak transmission throughout the primary band. From a saturation standpoint, the pass-band resolution must be sufficient to isolate only the desired primary band. Designs which produce sufficiently low resolution, along with steep transition slopes (or multiple peaks in the pass-band), are preferred.

Transition Band Slope This is defined by the (10%–90%) bandwidth between peak transmission of a primary and the first adjacent null.

Null Transmission

Null contrast is fundamentally determined by the polarizer extinction ratio, but also relies on the proper retardance and alignment of the stack films. It further assumes no significant depolarization due to scattering. In practice, 100:1 peak/null contrast is readily achievable, which is far in excess of that required to achieve saturated colors.

Number of Nulls and Their Placement

The number of nulls and their spectral positions depend upon the stack design and on the retardance of the components. It is advantageous to strategically place nulls at out-of-band power spectral maxima.

Side-lobe Amplitude

Side-lobe amplitudes depend upon the specific stack design and should be minimized. It is advantageous to place side-lobe maxima away from out-of-band power spectral maxima. Techniques for apodizing the transmission function to reduce side-lobe amplitude can be used to increase performance, often without increasing the number of retarders.

Blue/Red Leak

This refers to the free-spectral-range (FSR) or periodicity of the transmission function. Adjacent orders should be placed outside the visible or away from source emissions to avoid desaturation of the primary band.

Source Characteristics

The source characteristics and special performance requirements are an important aspect of design optimization. This includes the center wavelengths of the primary band emissions, the distribution of power within the primary band emissions (bandwidth), and source emission outside of the primary bands. The polarizer material may have a wavelength sensitive transmission (dichroic polarizers are typically less transmissive in the blue) for which the filter design can compensate if necessary.

PRS Materials

The materials suitable for the neutral polarizing means include structures that discriminate between polarization based on absorption, such as dichroic polarizers, and those based on polarization shearing, such as birefringent polarizers, pile-of-plate polarizers, cholesteric liquid crystal films, or microprisms. The latter are required for implementing passive structures for separating or combining colors. Either class can be used in active systems incorporating polarization switches.

Polarization shearing structures are usually very transmissive, but are often expensive and bulky. Dichroic polarizer materials are low cost and are available in large area, such as that by Polaroid, Nitto, and Sanritzu. These materials vary in neutrality, peak transmission and extinction ratio. Since it is typically advantageous to maximize transmission throughout the visible, materials with high neutral transmission and moderate extinction are desirable. As discussed above, excessive color contrast can be traded for increased transmission by bleaching dichroic polarizer materials. Color polarizers can be used in cases where a particular primary is to be passed by the stack unpolarized. Patterned polarizers can be used to pixelate the PRS.

Retardation material employed in PRS stacks preferably provides the following: high optical clarity, uniform retardance, range in retardance sufficient for the design requirements (this depends upon range of induced birefringence and practical range in thickness), environmental durability, and in many cases large area and low cost.

Retarder stacks can be constructed using layers of form-birefringence devices, liquid crystal polymer films, stretched polymer retarder sheets, or crystalline retarders. Currently, form-birefringence devices are limited to low retardances due to practical considerations. These are either etched, holographically recorded, or deposited high resolution periodic structures that do not diffract light, but impart a phase shift between orthogonal states. It is currently difficult to produce multi-order low loss visible retarders using form birefringence.

Liquid crystal polymer films, particularly UV cross-linkable polymer nematic linear retarders, have potential for forming retarder stacks. However, materials that, when polymerized, form glassy retarder films are not as yet commercially available. A potentially attractive feature is the ability to produce thin high-order retarders, since the material can have very high birefringence. This can permit the fabrication of multi-layer stacks on a single substrate with low cost.

The most attractive materials for the relatively low resolution requirements of color generation are currently stretched polymer films. These materials are available in arbitrary retardances (0–2,000 nm), using a variety of materials with unique birefringence dispersion characteristics. Large sheets can be purchased at a low cost, permitting large clear aperture filters. The characteristics of z-stretched polymers (Nitto NRZ) permit large view angles with small retardance shifts. This is attractive for direct-view applications of the PRS. Several polymer materials are useful in producing PRS, including but not limited to, poly-vinyl alcohol, polycarbonate, mylar, polypropylene, polystyrene, triacetate (tri-butyl-acetate), and polymethylmethacrylate.

Conventional crystalline retarder materials, such as quartz, mica, and calcite, are well suited to applications requiring higher resolution than that feasible with polymer films. They are also useful for applications requiring low wavefront distortion, and/or high power handling requirements. They are more expensive than polymer retarders and do not lend themselves to large area, particularly when low retardances are required.

An important aspect of PRS stack design is the wavelength dependence of retardation. Because retardation is inversely proportional to wavelength, it's rate of change depends explicitly on wavelength. Furthermore, the retardance of most materials depends implicitly on the dispersion of the birefringence. The rate of change in retardance is given by $$\frac{1}{\Gamma}\frac{d\Gamma}{d\lambda} = \frac{1}{\lambda} + \frac{1}{\Delta n}\frac{d\Delta n}{d\lambda}$$

where $\Delta n$ is the birefringence. Dispersion of the material birefringence accounts for the second term. For most retarder materials of interest, the slope of the birefringence spectrum is also negative, further increasing the rate of retardance change at shorter wavelengths. The result is a more "compressed" spectrum in the blue than that in the red. For this reason, optimum designs can vary significantly depending upon the particular additive primary band.

The materials used in the PRS designs reported herein are modelled using the birefringence dispersion relationship by Wu (Wu (1986), Phys. Rev, A 33:1270):

$$\Gamma = (\Gamma_o + 2\pi m)\frac{\lambda}{\lambda_o}\frac{\lambda(\lambda_o^2 - \lambda^{*2})}{\lambda_o(\lambda^2 - \lambda^{*2})}$$

where $\Gamma_0$ is the zero-order retardance, m is the retarder order, $\lambda_0$ is the design wavelength, and $\lambda^*$ is a mean UV resonance, obtained by measurement. This is done by adjusting $\lambda^*$ until theory matches the measured spectrum of the retarder material oriented at 45-degrees between polarizers. Using the above two equations, the dispersion of the birefringence is approximated by $$\frac{1}{\Delta n}\frac{d\Delta n}{d\lambda} = \frac{-2\lambda^{*2}}{\lambda(\lambda^2 - \lambda^{*2})}$$

which verifies that the rate of dispersion is in general negative.

The wavelength dependence of retardance has implications for structures that are ideally achromatic, such as polarization switches, and for chromatic structures, such as color polarizers. As described previously, the location of the center wavelength has a profound effect on the resulting duty ratio in the visible. A design with a symmetric duty ratio in the frequency domain has a center wavelength dependent duty ratio in the wavelength domain. Such a design will have a larger duty ratio for a B/Y color polarizer and a smaller duty ratio for a R/C color polarizer.

Typically, the design wavelength of structures intended to provide achromatic behavior throughout the visible are skewed toward the blue. Rather than use a 550 nm design wavelength (centered in the visible), an exemplary design uses a shorter wavelength, typically 500 nm for an FLC polarization switch, in order to compensate for the above effects.

There are virtually an unlimited number of PRS color polarizer designs, subject to specific source characteristics, material dispersion, and desired output spectrum. Again, it is recognized that any FIR filter that approximates the ideal spectral profile can in principle be generated using the techniques described herein. A few specific design examples generated using the network synthesis technique are described herein. The first example is based on the decomposition of a symmetric square profile, yielding multiple pass-band maxima, a narrow transition bandwidth, and multiple stop-band nulls. The second example is based on the Solc filter, which is another specific case of a bandpass design using equal thickness retarders. The third example is the split-element filter, an example of a color polarizer with a complex impulse response.

Square Profile PRS

As discussed previously, there are a number of impulse response functions that represent useful PRS color polarizers. General requirements for producing saturated colors are steep transition slopes, low side lobe amplitudes and effective finesse adequate to isolate the additive primary spectrum (APS) from the subtractive primary spectrum (SPS). An exemplary general-purpose color polarizer design, for instance, is one based on the Fourier decomposition of a square transmission spectrum. Such a design can be realized by forming the Fourier series for a square wave, the coefficients of which are the impulse response amplitudes, and truncation by an appropriate window function. An alternative technique is to use iterative numerical methods to arrive at the amplitudes of the impulse response function. For instance, given a fixed number of retarders, the transition bandwidth can be adjusted to obtain a specific maximum pass-band and stop-band ripple. An alternative is to fix the transition bandwidth and allow the ripple amplitude to be variable.

Figure 3:
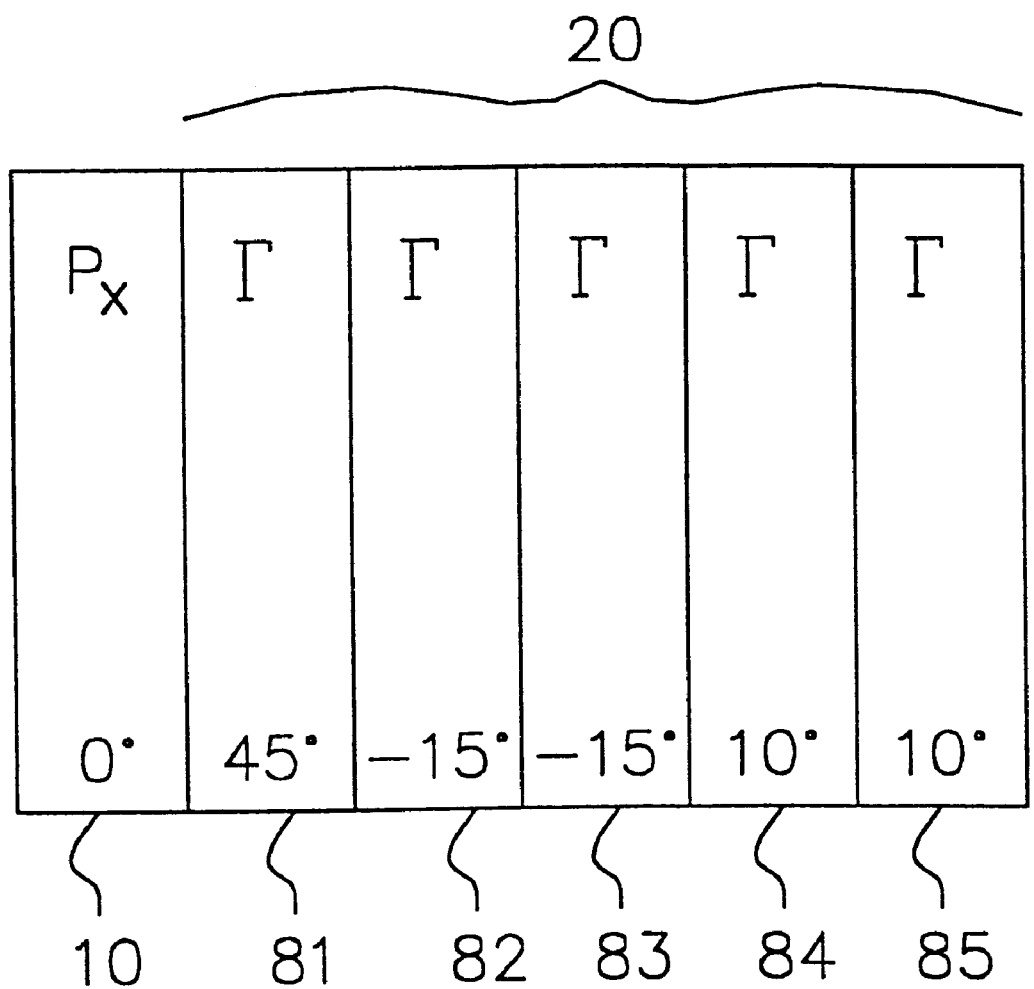
FIG. 3 is a layout of a square-profile equal-ripple PRS using five identical thickness polycarbonate retarders.

The specific example of an optimized PRS using six samples of the impulse response is shown in FIG. 3. This color polarizer comprises polarizer 10 and retarders 81 through 85. This polarizer was designed to provide a fixed ripple amplitude, specifically 1% transmission maximum in the stop-band, and less than 1% maximum loss in the pass-band. The sampling is such that the duty-ratio of the frequency spectrum is symmetric (50:50). Based on the coefficients of this optimization, the orientations of the retarders were generated using the network synthesis technique. One solution consists of five films with identical thickness, shown in FIG. 3, where two pairs have the same orientation. The stack can thus be fabricated using either five sheets of identical retarder, or three sheets with two retardances. In the latter case, retarders 82 and 83 are replaced by a single retarder having retardance 2Γ and orientation −15°, and retarders 84 and 85 are replaced by a single retarder having retardance 2Γ and orientation 10°.

The design of FIG. 3 is based on a symmetric profile, for the same finesse-of-two given by a single retarder, yet excellent color saturation is obtained. This is partially because the definition of finesse, the ratio of the FWHM to the FSR, does not adequately take transition slope into account. It is further due to the nonlinear dependence of retardation on wavelength, and the choice of primary band center wavelength. For instance, a design based on the dispersion of polycarbonate yields a blue/yellow color polarizer with an effective finesse of three. By contrast, the task of generating a red/cyan filter using the same symmetric profile design is more formidable, since the retardation characteristics serve to reduce, rather than increase the effective finesse.

Figure 4:
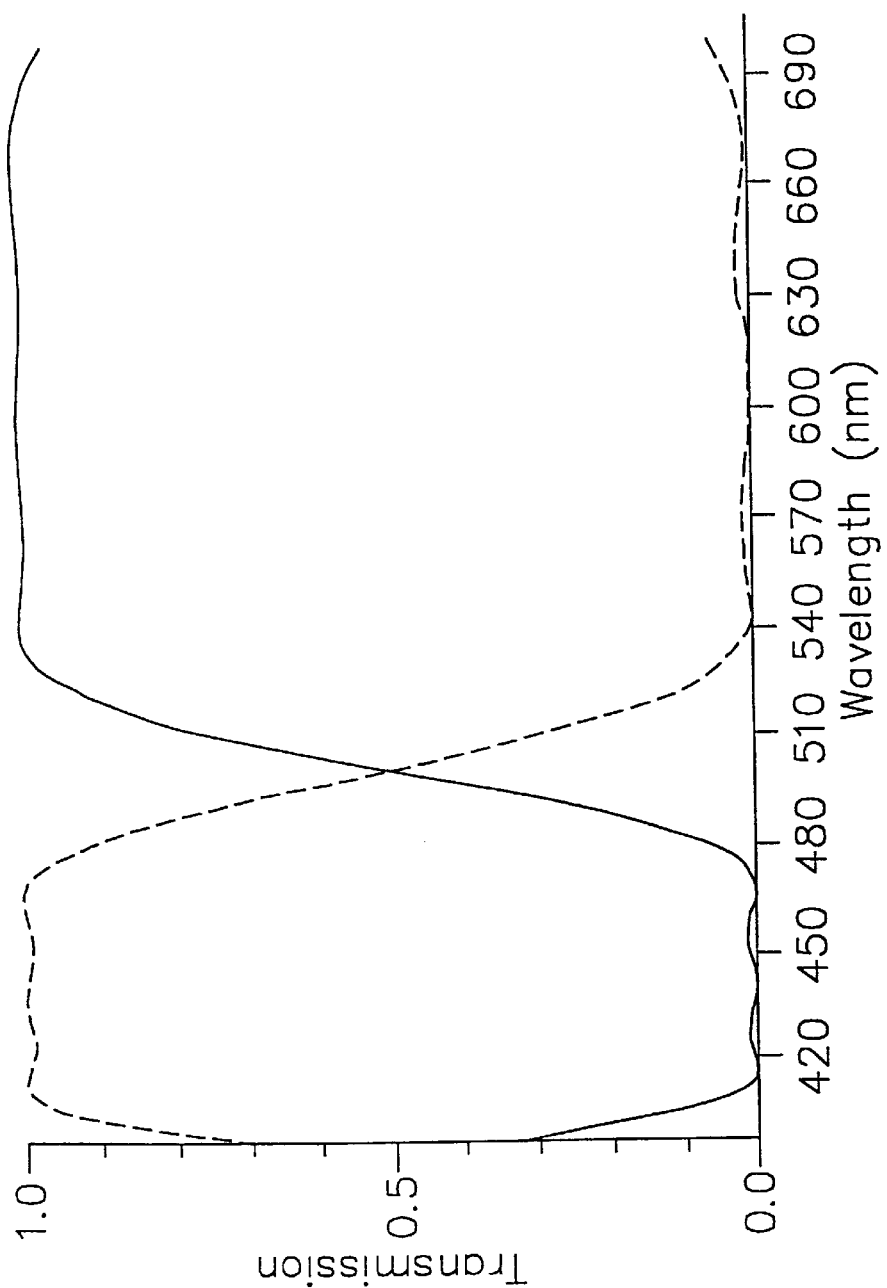
FIG. 4 is calculated additive and subtractive primaries generated by a B/Y PRS color polarizer based on the design of FIG. 3. The retarders are polycarbonate with a retardance of one full-wave at 600 nm.

The model (calculated) spectrum of FIG. 4 is based on the color polarizer of FIG. 3 employing five polycarbonate retarder sheets, each with a retardance of one full-wave at 600 nm. FIG. 4 shows the transmission of the blue additive primary spectrum and of the complementary yellow subtractive primary spectrum. A summary of the spectral characteristics is as follows:

Maxima (100%): 417 nm, 440 nm, 468 nm

Nulls (0%): 546 nm, 600 nm, 670 nm

Side Lobe amplitude: <1.0%

FWHM: 103 nm (400 nm–503 nm)

Effective Finesse: 3

As shown in FIG. 4, the additive primary spectrum of a polarizer designed using network synthesis analysis of a square wave profile is itself an approximate square wave. Multiple pass-band maxima and stop-band nulls are distinguishing features of an approximate square wave spectrum. The multiple maxima and minima flatten the pass-band and stop-band profiles. Sharp transition band slopes are also characteristic of an approximate square wave spectrum. In FIG. 4 the band slope is approximately 45 nm. In the approximate square wave spectra of this invention, preferred band slopes are less than 70 nm. For each of the additive primary colors, filters can be designed by the network synthesis technique having band slopes less than 50 nm and, in some cases, less than 40 nm.

Figure 5A:
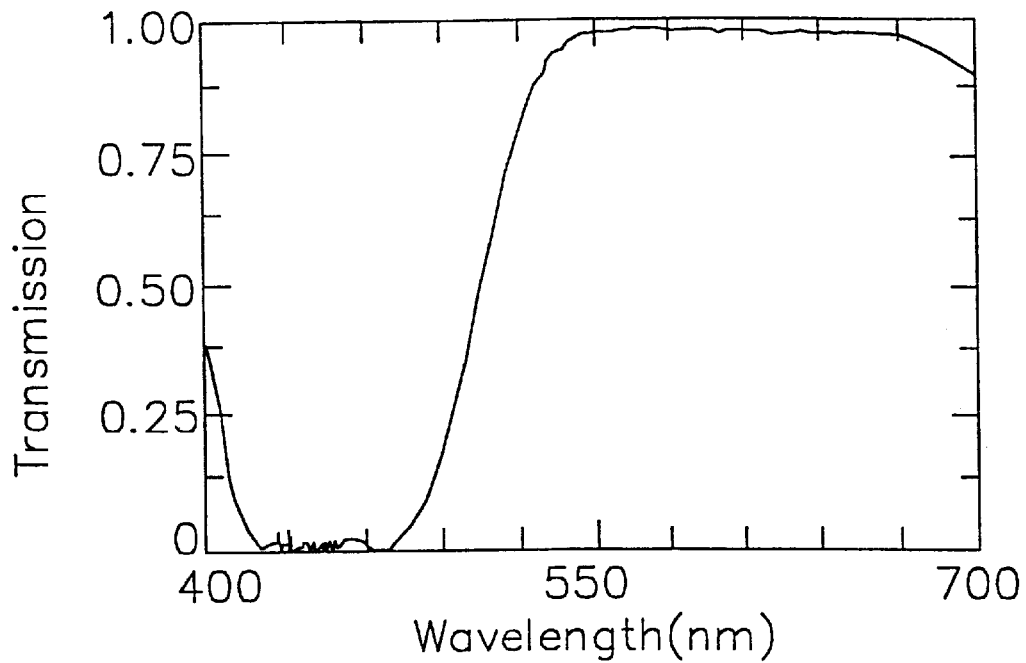
FIG. 5a is the measured transmission of a B/Y retarder stack between parallel polarizers using the design of FIG. 3. The retarders are Nitto NRZ polycarbonate films which were cemented together using the standard adhesive layer. Five 600 nm films were used for the stack. The spectrum shows 98% transmission throughout the subtractive primary, with roughly 100:1 blocking throughout the blue primary. The transition bandwidth is quite narrow, allowing a high efficiency green output when combined with a red/cyan stage.
Figure 5B:
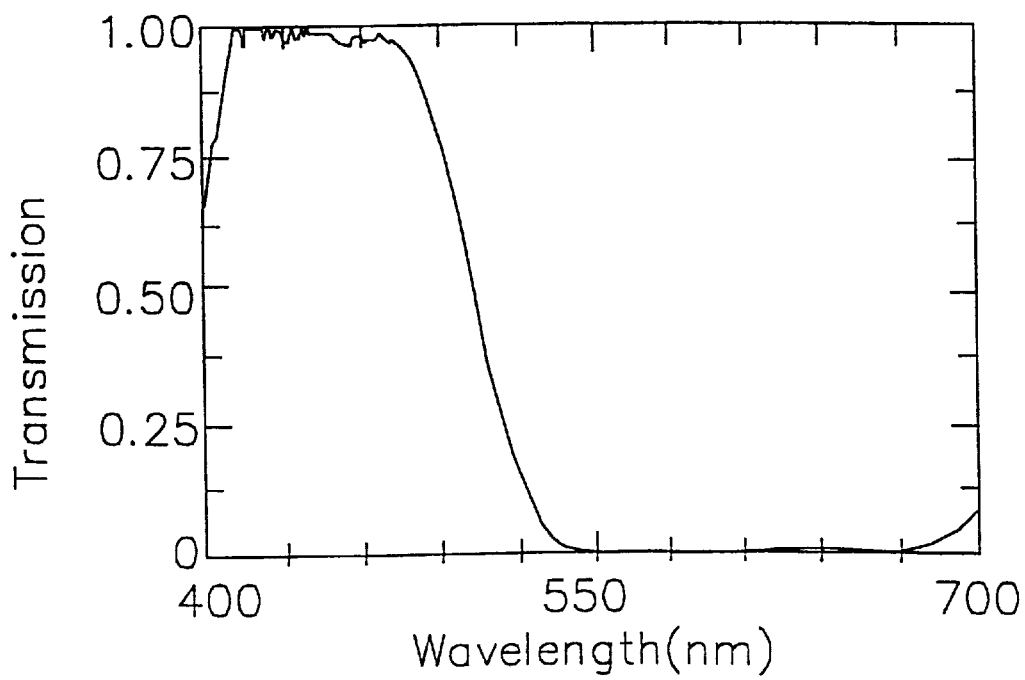
FIG. 5b is the measured transmission of the B/Y retarder stack of FIG. 5a between crossed polarizers showing high transmission throughout the blue, with strong rejection of green and red.

FIGS. 5*a* and 5*b* show the actual measured spectra of the color polarizer, with near perfect agreement with the model of FIG. 4. The stack was measured between parallel and crossed polarizer, showing complementary additive (FIG. 5*b*) and subtractive (FIG. 5*a*) primaries. The transmission was normalized for source characteristics and Fresnel losses, giving the transmission of the stack alone. The absorption/interferometric loss of the films and adhesive layers, along with any polarization interference losses is shown to be roughly 2%. These figures verify high peak transmission throughout the desired band, very low side-lobes, high contrast, and narrow transition bandwidths.

Figure 6:
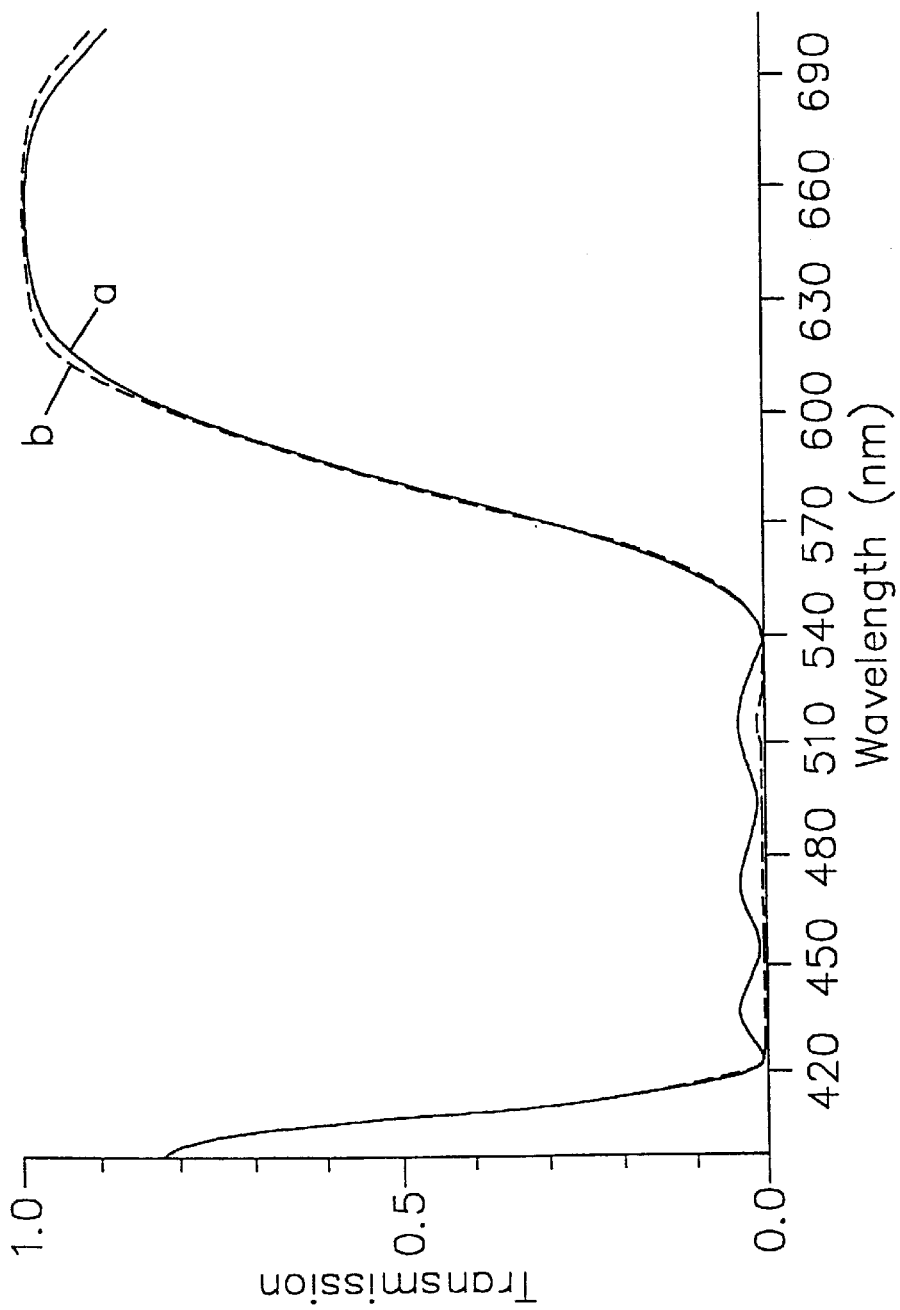
FIG. 6 is calculated additive primary spectra generated by a R/C PRS color polarizer based on the designs of (a) Table 1 and (b) Table 2.

Red/cyan color polarizers were also designed by the network synthesis technique. As described above, network synthesis produces more than one retarder stack design for a given impulse response function. Table 1 lists four different retarder stacks, each having five retarders, which produce the same transmission spectrum. The additive primary spectrum for the five retarder stacks is shown in curve (a) of FIG. 6. Table 2 lists nine different retarder stacks, each having seven retarders, which produce the same transmission spectrum, shown in curve (b) of FIG. 6. Note that the seven retarder stacks have two more samples of the impulse response than the five retarder stacks; curve (b) has more pass-band maxima and stop-band nulls than curve (a) and has a sharper transition band slope.

Figure 7:
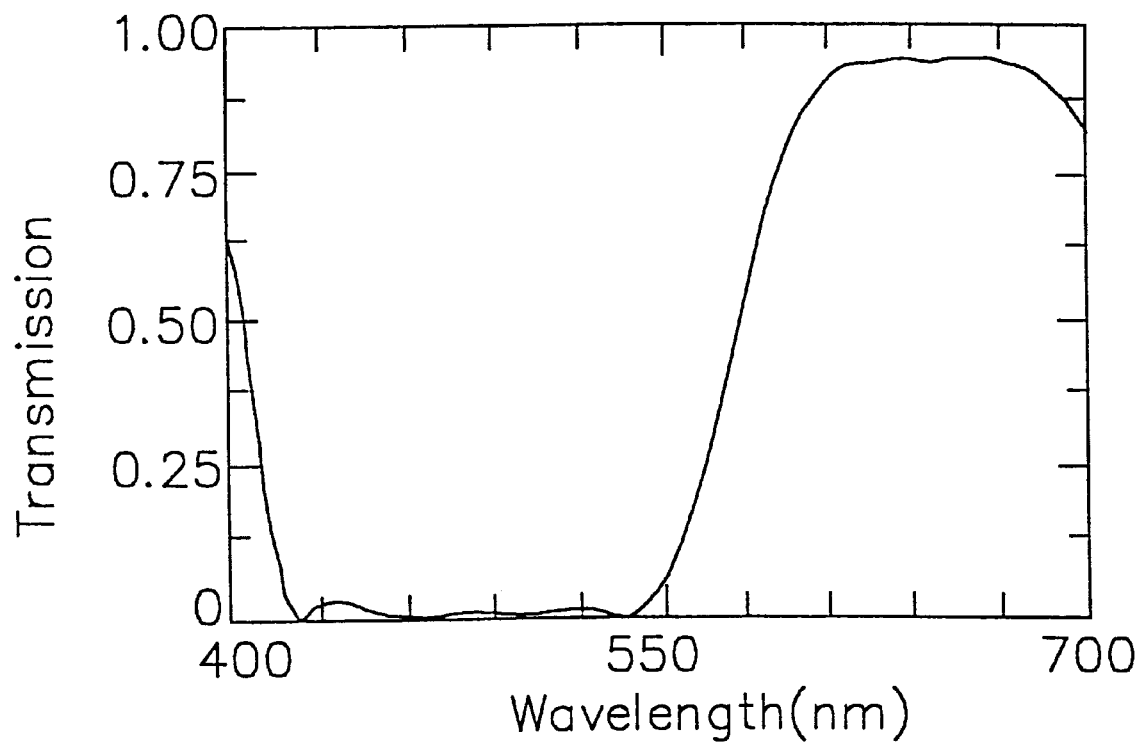
FIG. 7 is the measured transmission of the R/C retarder stack of Table 2, design 4, using six 643 nm retarders.

The color polarizer of design 4, Table 2, was constructed for a design wavelength of 643 nm and the additive primary band transmission was measured (FIG. 7). Because retarder 1 is approximately parallel to the input polarizer, it was omitted from the fabricated device. The measured transmission was normalized for source characteristics and Fresnel losses. The measured spectrum (FIG. 7) shows excellent agreement with the model spectrum (FIG. 6*b*). Note that the tail of an adjacent pass-band appears at the blue end of the visible spectrum. This can be removed by increasing the free-spectral-range of the filter.

Solc-Based PRS Color Polarizers

Solc-based devices also utilize multilayer equal thickness retarders. In the case of the folded Solc device, only two unique orientations are required., while the films of the fan device "wind" from the input polarizer orientation to the orthogonal orientation. In automated systems, where the films can accurately be applied at any angle with respect to the polarizer, this should not present a problem.

The Solc PRS examples shown provide periodic sinc function profiles. The pass-band consists of a single peak, with adjacent orders separated by a series of side-lobes. The high side-lobe amplitude is due to the abrupt truncation of the series, though other configurations can produce apodized spectra. Based on a fixed sampling rate (or retarder thickness), the width of the pass-band narrows as the span of the impulse response is increased. In general, the retarder order is selected to achieve the desired free-spectral-range, and the finesse of the filter is proportional to the number N of retardation films.

There are two versions of the Solc PRS, based on folded and fan bandpass configurations. The PRS structure consists of a single input neutral polarizer, followed by a series of at least two retardation films. The orientations of the films are determined based on the Solc design equations. For the folded version, the retarders are multi-order half-wave retarders. In this case, the subtractive primary band emerges parallel to the input polarizer and the additive primary band is orthogonally polarized. The retarder orientations alternate in sign according to the rocking angle, $\alpha = \pi/4N$ with respect to the input.

In the case of the fan filter, the retarders are multiple order full-wave plates. The retarder orientations form a fan, and are distributed according to the angles $\alpha$, $3\alpha$, $5\alpha$, . . . $(2N-1)\alpha$ with respect to the input polarizer. Using this design for a PRS, the additive primary band emerges parallel to the input polarizer, and the subtractive primary is polarized orthogonal to the input.

Provided that the retarder orientations conform exactly to the Solc design equations, a theoretical transmission of 100% is insured at the center wavelength of the additive primary. Examples of R/C, G/M and B/Y PRS structures were modeled for both folded and fan versions. Dispersionless material was assumed to provide a best-case range in retarder order. Summaries of transmission spectra are provided in Tables 3, 4 and 5. The parameters in each table are illustrated in the representative spectrum of FIG. 8. Although for generality the spectrum of FIG. 8*b* shows three pass-bands the additive primary spectra of this invention have just one pass-band in the visible spectral range.

Solc Red/Cyan

Figure 9:
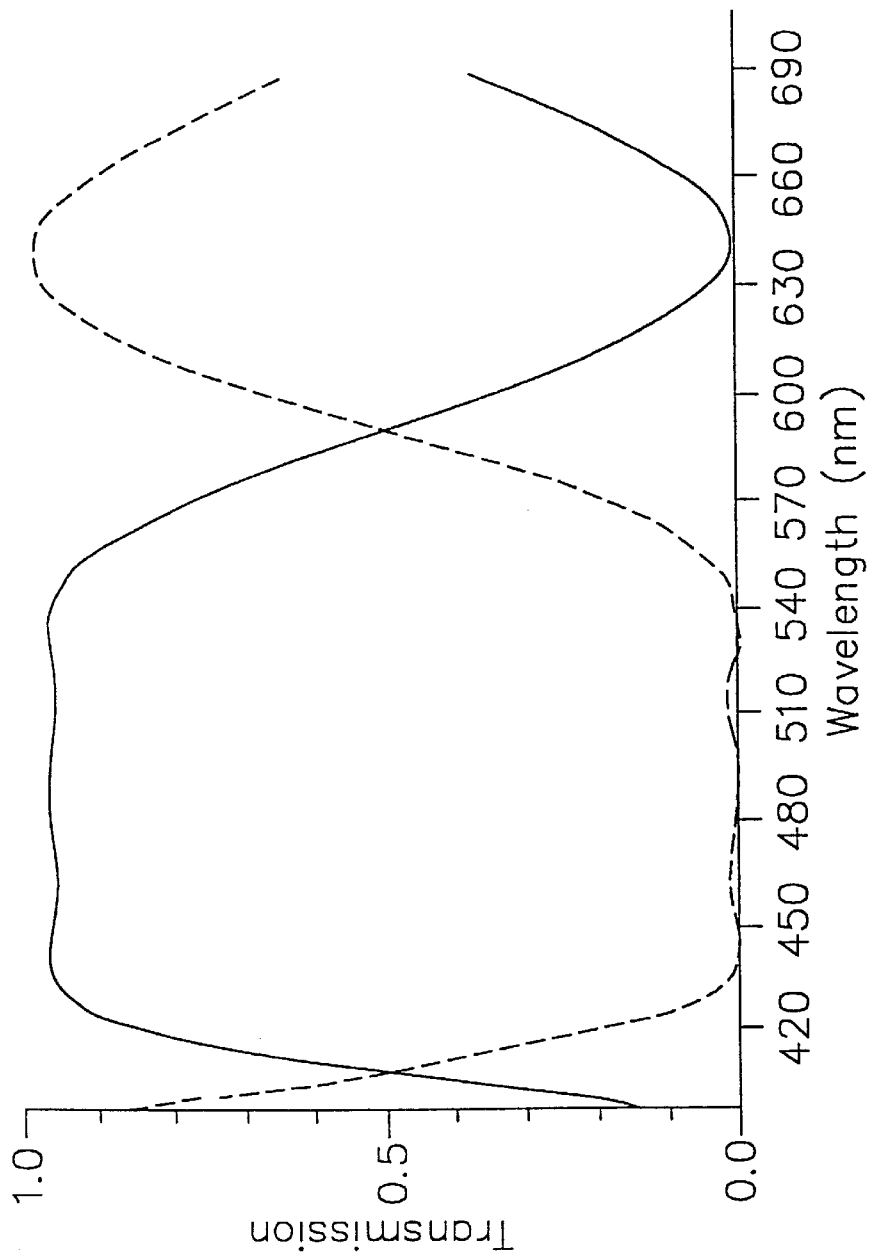
FIG. 9 is computer model additive and subtractive spectra for an R/C PRS for design 5 of Table 3.

Folded and fan R/C color polarizers using 2–4 retarders were considered, though additional retarders can be employed to increase resolution. The fan type with full-wave retarders yielded the optimum FSR. The folded type with zero-order half-wave retarders has an excessive FSR, requiring additional retarders for sufficient resolution. The folded type with first-order half-wave retarders exhibited blue leak. A summary of fan versions with one-wave of retardance and folded versions with 1.5-waves of retardance is given in Table 3. FIG. 9 shows an exemplary R/C configuration (design 5), a folded design with three retarders oriented according to a 15° rocking angle. The transmission function exhibits low side lobe levels, and a fairly sharp transition band slope. Consequently, high transmission is maintained throughout the cyan parallel polarizer spectrum. In addition, the slow change in retardance in the red permits a 100 nm FWHM.

Solc Green/Magenta

Figure 10:
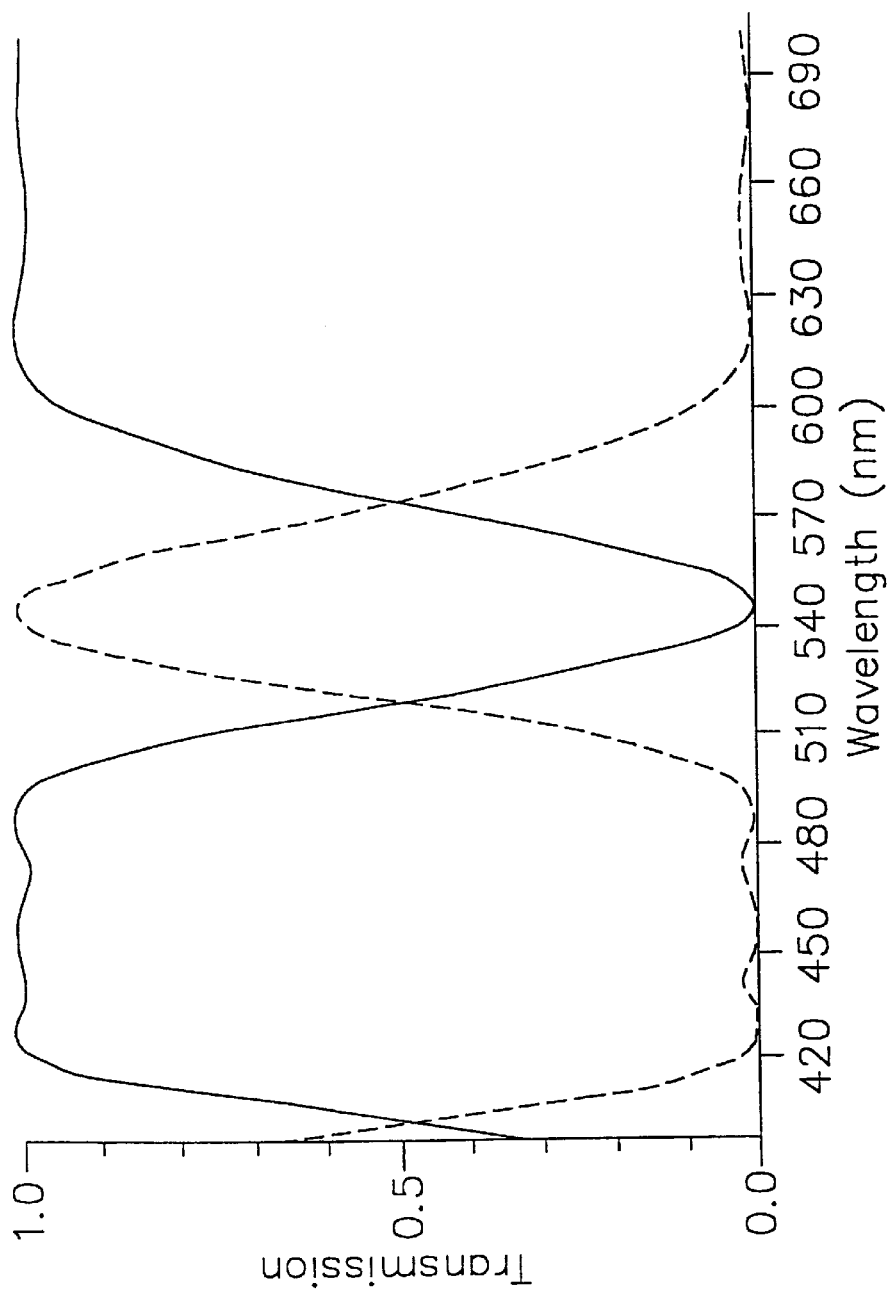
FIG. 10 is computer model additive and subtractive spectra for a G/M PRS for design 5 of Table 4.

Several folded and fan versions were found to produce acceptable G/M spectra. Again, designs with 2–4 retarders were considered. The minimum retardance was 1.5 waves, which was found to provide moderate resolution when four retarders were used. Retardances as large as three waves were allowed, due to the symmetry of the blocking in the visible. As such, resolution values ranging from 36 nm to over 100 nm were feasible. FIG. 10 shows an exemplary G/M color polarizer using design 5 of Table 4. The design features high resolution, and low side-lobe amplitudes.

Solc Blue/Yellow

Figure 11:
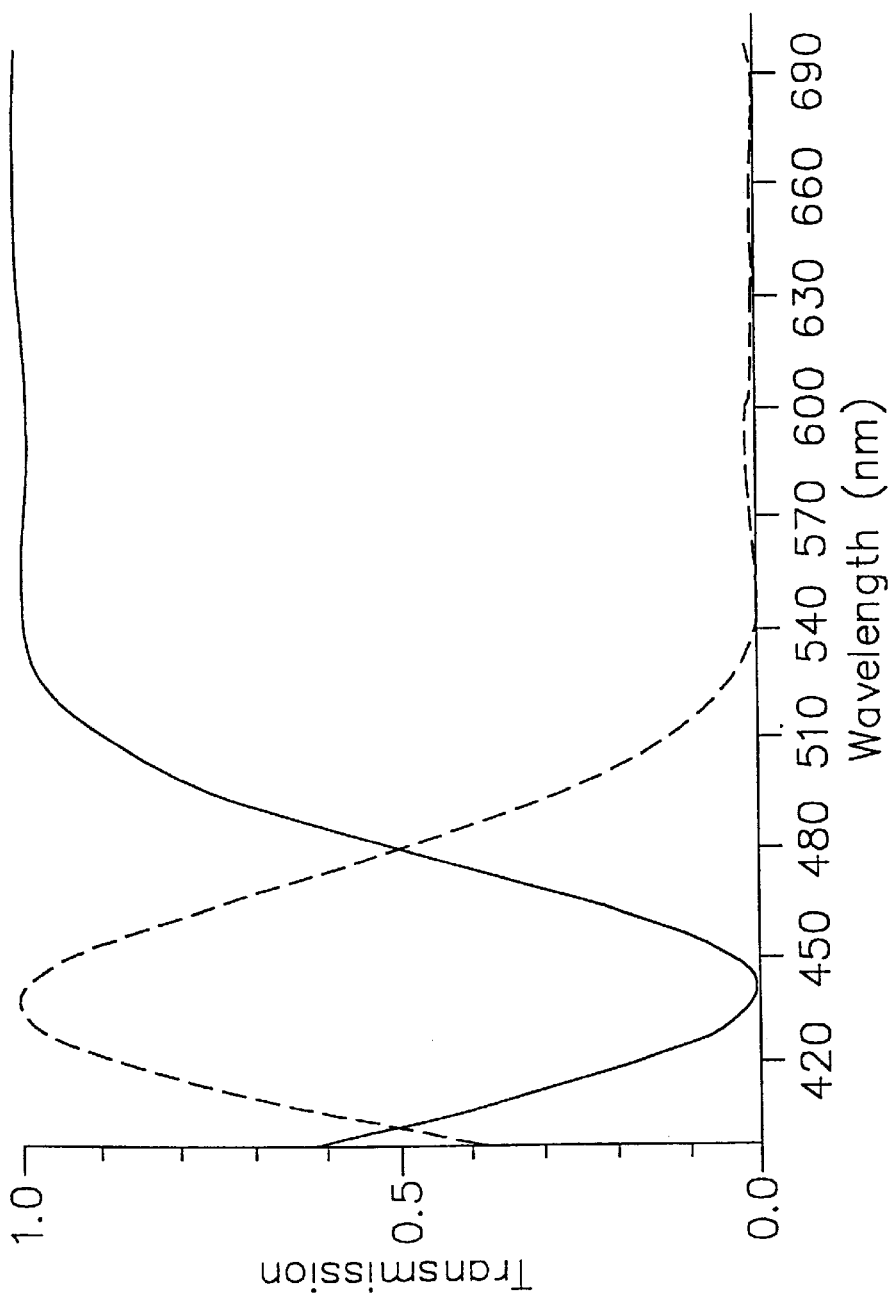
FIG. 11 is computer model additive and subtractive spectra for B/Y PRS for design 2 of Table 5.

The summary data of Table 5 shows folded and fan versions with 1.5 and 2.0 waves of retardance, again with 2–4 retarders. The model spectrum of design 2 of Table 5 is shown in FIG. 11. Results of this analysis illustrate that bandpass PRS designs, which increase the finesse with each additional retarder, are more appropriate at longer wavelengths (R/C). This is because the rapid variation of retardance in the blue, relative to the red, results in unacceptably high pass-band resolution. Since the push for higher resolution is in this case for narrower transition bandwidths, there is a tradeoff in the blue when using designs that increase finesse in an attempt to better saturation. That is, narrow transition bandwidths decrease the throughput of the additive primary (and hence desaturate the subtractive primary), while broad transition bandwidths do not adequately isolate blue and green bands. As shown in the square-profile example, this problem is solved by using designs that produce narrow transition bandwidths while maintaining low finesse.

Split-Element PRS

The split-element filter is a design example based on complex impulse response functions, i.e. it includes achromatic as well as chromatic retarders. Split-element filters are described in detail in U.S. application Ser. No. 08/275,006, filed Jul. 12, 1994, which is incorporated herein by reference in its entirety. In split-element filters, achromatic retardance shifts are required in the split-element and center elements to generate the spectrum of a two-stage Lyot filter. Designs allowing complex impulse responses represent additional design options in the color polarizers of the present invention. However, since they typically require the addition of a zero-order retardance to each element, several retardation values can be required to implement the PRS. This is contrasted with designs based on real impulse responses, where equal thickness retarders can be employed. The basic design considerations for split-element PRS color polarizer are presented in the following, along with specific considerations for each primary.

Figure 12A:
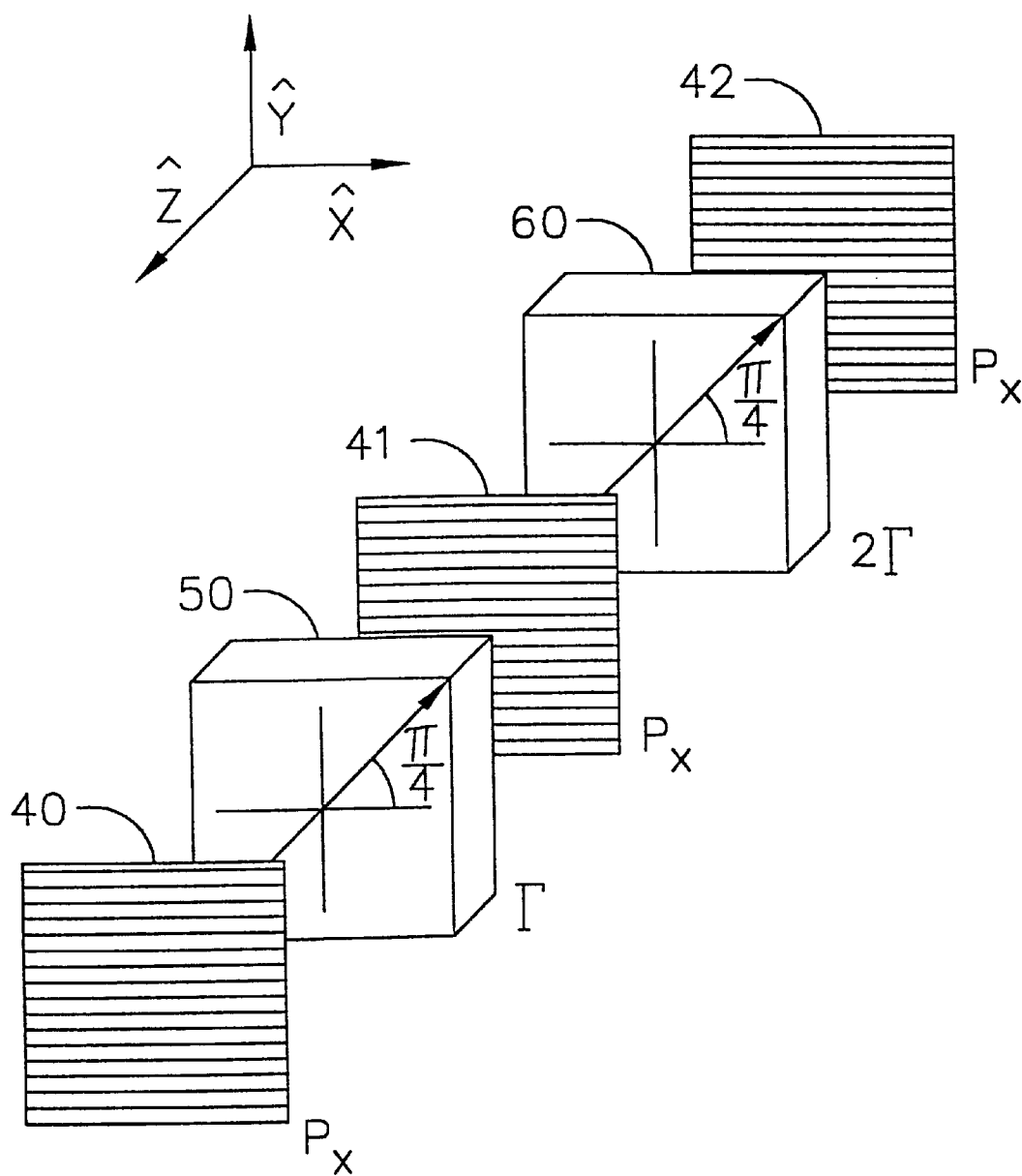
FIGS. 12a–c, shows the layout of (a) a two-stage finesse-of-four Lyot filter, and of the equivalent split-element filters, including, (b) crossed-retarder and, (c) parallel-retarder configurations.
Figure 12B:
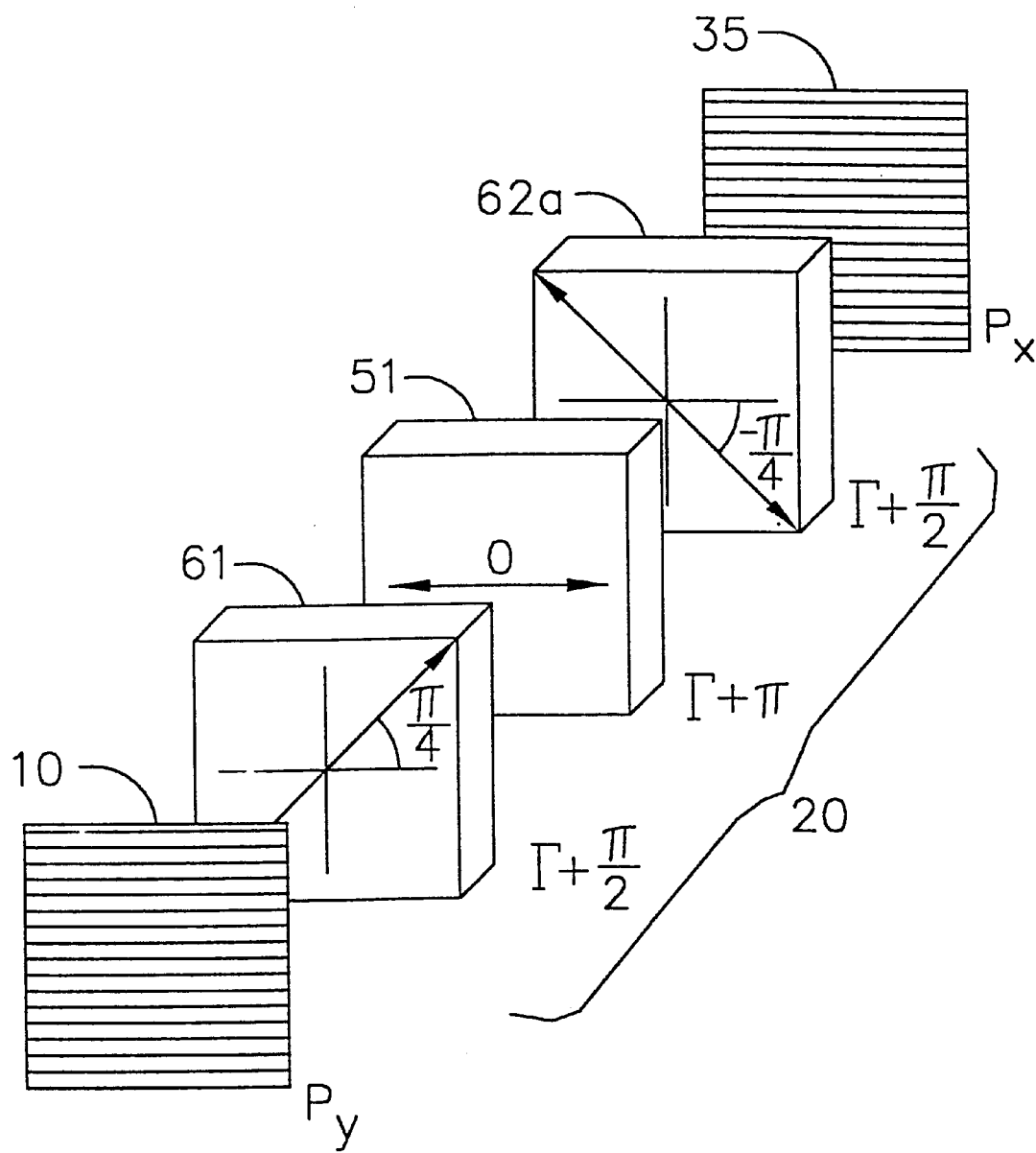
Figure 12C:
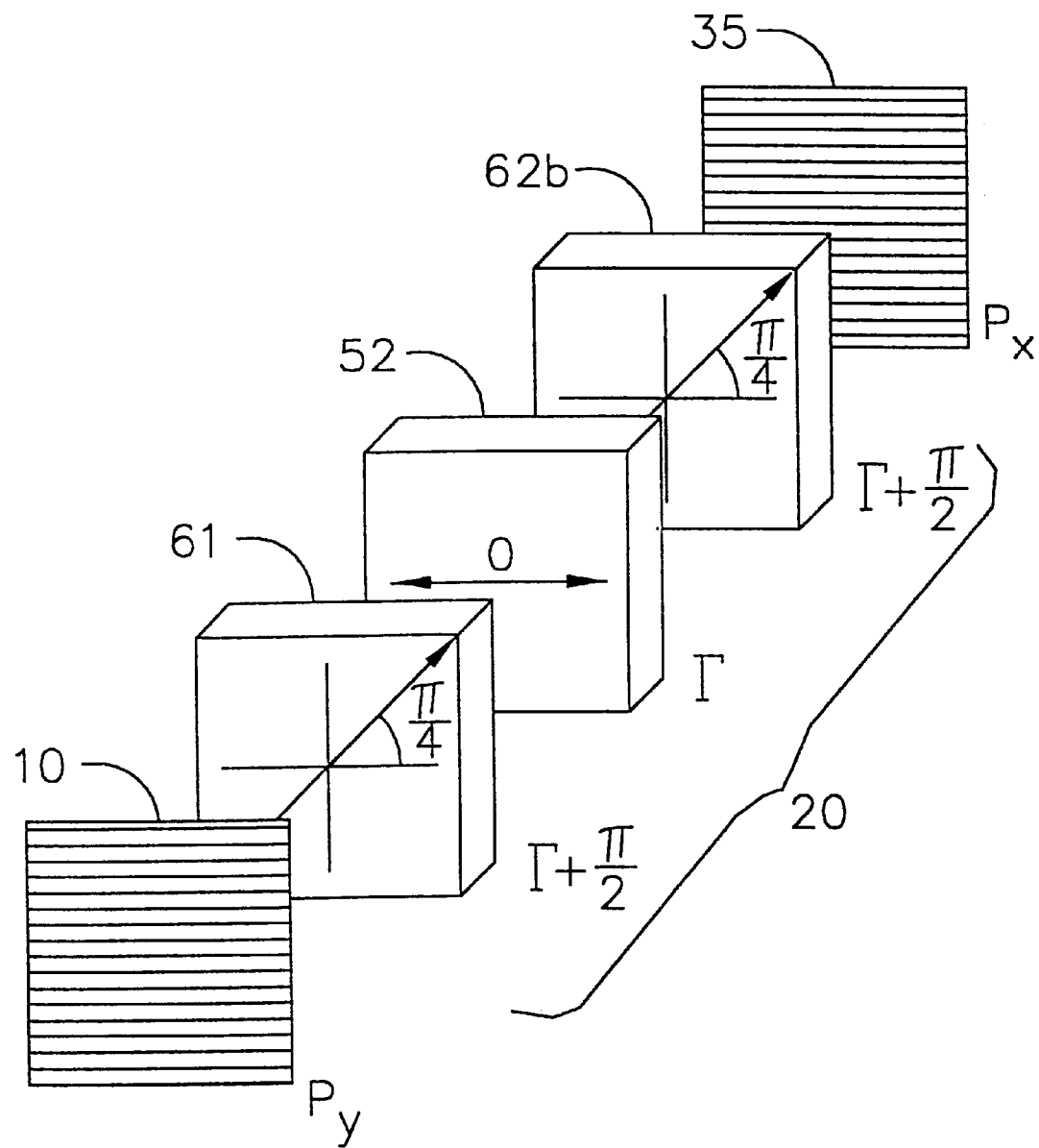

The general design of a split-element PRS color polarizer begins with it's analogy to a two-stage Lyot PIF. The two stage Lyot filter (FIG. 12a). The two stage Lyot filter requires three parallel neutral polarizers 40, 41 and 42, bounding retarder plates 50 and 60. The retarders have a 2:1 thickness ratio and are oriented at $\pi/4$. While a Lyot structure cannot function as a color polarizer (due to the requirement for two stages), it does provide bandpass spectra similar to the split-element filter and is an instructive starting point. As shown in FIGS. 12b–c, the split-element filter is constructed by splitting the thicker element (60) of the Lyot filter and placing the halves (61 and 62) on either side of the center retarder (51 or 52), with either crossed (FIG. 12b) or parallel (FIG. 12c) optic axes. The central retarder is oriented parallel or perpendicular to the axis of input polarizer 10. The intermediate polarizer of the Lyot filter is eliminated. For a bandpass output, exit polarizer 35 is in general crossed with the input polarizer. Note that pure (achromatic) $\pi/2$ retardances must be added to split-elements 61 and 62 in order to achieve the exact Lyot spectrum. Similarly, for the case of crossed split elements, an achromatic $\pi$ retardance must be added to center retarder 51. This is not required for center retarder 52 of the parallel retarder device.

Figure 13A:
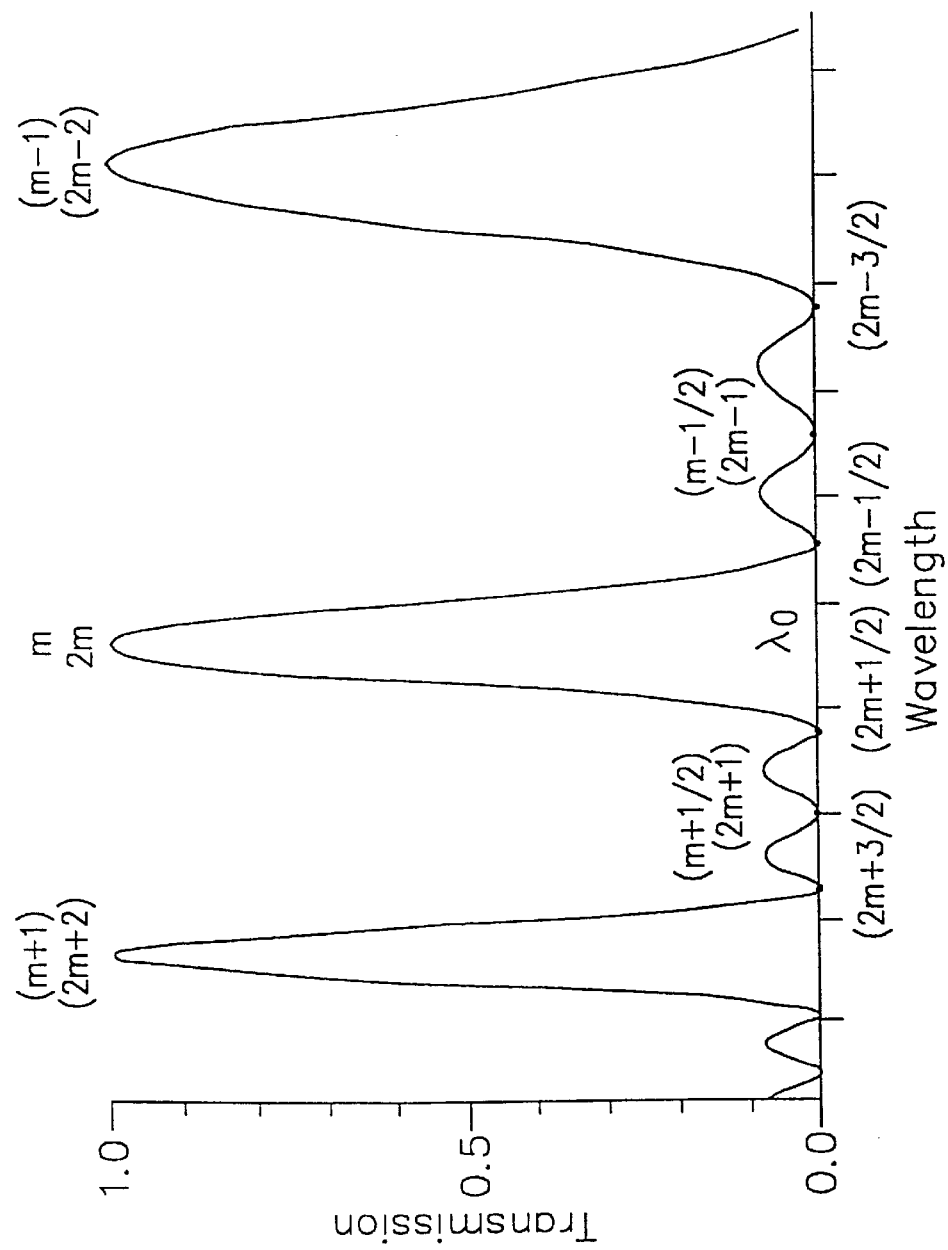
FIGS. 13a–c, is sample spectra for (a) a two-stage Lyot filter containing retarders of order m and 2m, and spectra for split-element filters with (b) parallel-retarders and (c) crossed-retarder, showing retardances at peak/null wavelengths. The center retarder is taken to be of order n and the split-element retarder of order m.

FIG. 13a shows the spectrum produced by a Lyot filter, where the retardances are represented by order m and 2m, respectively, at the design wavelength. The transmission spectrum is given by $$T(\lambda) \sim \cos^2(\Gamma/2)\cos^2(\Gamma)$$

where $\Gamma$ is the wavelength dependent retardance of the low-order retarder $$\Gamma(\lambda) = 2\pi m \frac{\lambda_o}{\lambda} \frac{\Delta n(\lambda)}{\Delta n(\lambda_o)}$$

$\Delta n$ is the dispersive birefringence of the retarder material, and $\lambda_o$ is the design wavelength. Because parallel polarizer stages produce cosine-squared spectra, peak/null wavelengths of the Lyot filter are identically aligned. That is, both waveplates are full-wave retarders at the peak transmission wavelengths, and the half-wave retardance of the low-order stage coincides with the full-wave retardance of the high-order stage in the blocking band. This produces equal-amplitude side lobes as shown in FIG. 13a.

The split-element PRS comprises polarizer 10 and retarder stack 20 of FIGS. 12b–c. The retarder stacks comprise either retarders 61, 51 and 62a, or retarders 61, 52 and 62b. In the split-element color polarizers of this invention, the subtractive primary spectrum is transmitted along the axis of input polarizer 10, and the additive primary band is transmitted along the orthogonal axis. Like a Lyot filter, the split-element PRS produces a periodic sinc-squared transmission function, with each peak separated by three nulls. This represents the additive primary color spectrum. For the inverse spectrum this implies a maximum of three wavelengths with unity transmission to span the subtractive primary band. Ability to maintain high peak transmission of the additive primary color band determines the degree with which it is blocked in the subtractive color spectrum.

Figure 13B:
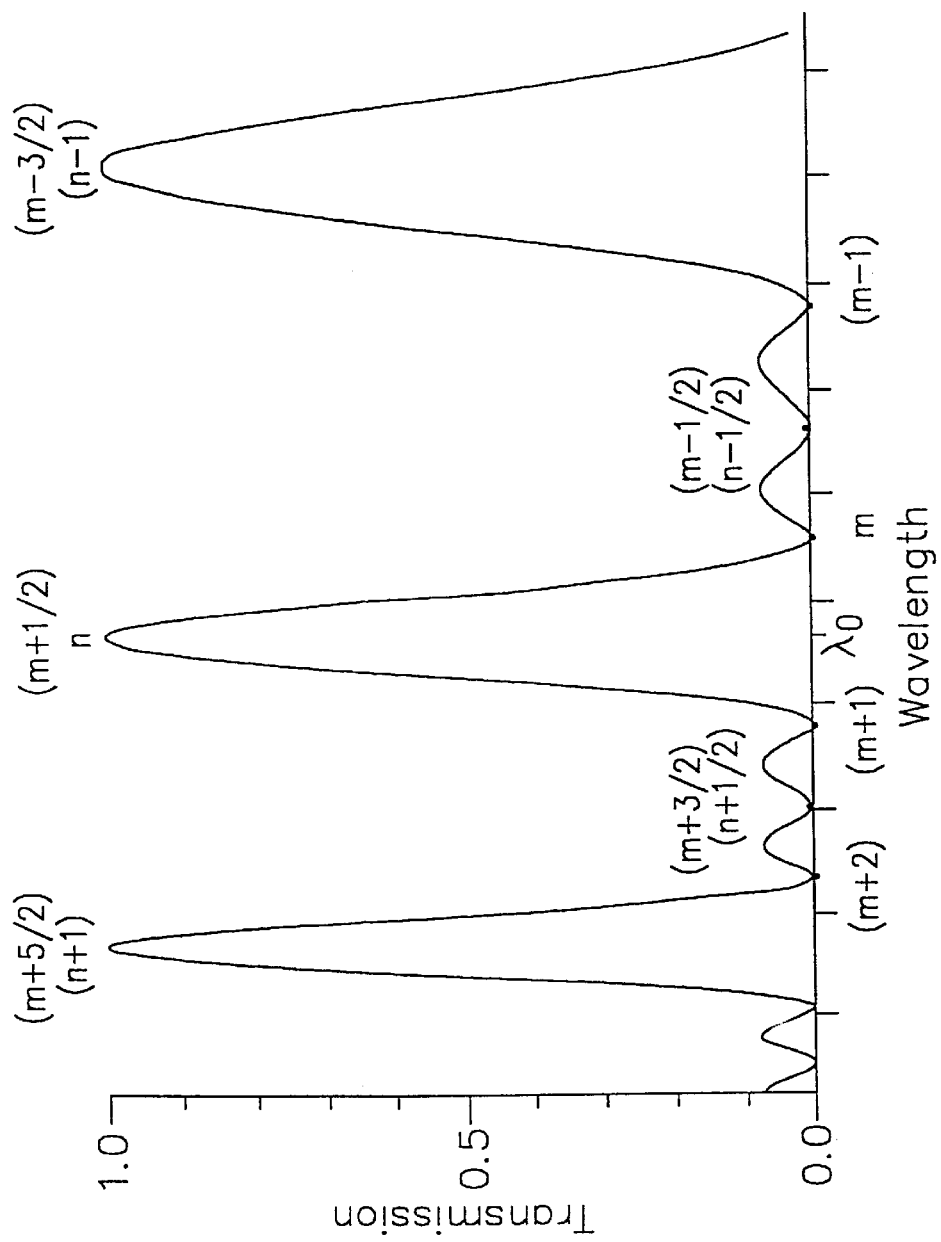

There are two design options for the split-element PRS color polarizer: crossed split-elements and parallel split-elements, as shown in FIGS. 12b and 12c. Take the sum of split-element retardance to be $\Gamma_{SE}$, and the center element retardance to be $\Gamma_C$. In the crossed-retarder configuration, the transmission function along the x-axis is given by $$T(\lambda) \sim \sin^2(\Gamma_{SE}/2)\sin^2(\Gamma_C/2)$$

showing mathematically that achromatic half-wave retardances (quarter-wave for each split-element) are required to identically produce a Lyot spectrum. The parallel split-element transmission function $$T(\lambda) \sim \sin^2(\Gamma_{SE}/2)\cos^2(\Gamma_c/2)$$

requires a half-wave shift in the split-element retardance. Thus, the split-element retarder is in general a half-wave plate of order m at the wavelength of peak transmission, as shown in FIGS. 13b and c. FIG. 13 illustrates the convention for labeling pass-band orders. The central retarder of order n is either a half-wave plate or a full-wave plate at the design wavelength, depending upon whether the split-elements are crossed or parallel, respectively. Because the center element retardance differs for parallel and crossed split elements, the transmission spectra produced by each are unique.

When building the color polarizer, it is neither practical nor necessary to add achromatic quarter-wave or half-wave retardances to the elements. Fortunately adequate color saturation is achieved by simply adding zero-order retardances to the split-elements and the central element when necessary. The use of zero-order retardances precludes simultaneously achieving ideal efficiency of the transmitted wavelength, along with balanced side-lobe levels. In practice, small adjustments in retardance are added to strike a balance between saturation and throughput. Ignoring this for the moment, the split-element PRS spectra are very nearly the Lyot-like spectra shown in FIGS. 13b and c.

In the PRS color polarizers of this invention, the sum of split-element retardance is, within a zero-order retardance, in a 2:1 ratio with the center element retardance. This allows nearly equal thickness retarders to be used for each element of the stack. Like a Lyot filter, the split-element determines the resolution of the filter, while the thinner (central) element determines the spectral period, or free-spectral-range (FSR). For the color polarizers of this invention, the absolute difference in retardance between each split-element retarder and the center retarder at the design wavelength is a quarter-wave, or $$|\Gamma_{SE}/2 - \Gamma_C| = \frac{1}{4} \text{ WAVES.}$$

This shows that the resolution of the split-element color polarizer is coupled with the blocking bandwidth.

The lower limit on retardance is that for which the center element performs no significant filtering operation. Center element retardances as low as zero-order half-wave can provide useful color polarizers, particularly for dispersive materials. The maximum resolution of the color polarizer is reached when the FSR is no longer adequate to provide effective discrimination between primary colors. A ceiling on the center retarder order can thus be determined, based on "best-case", or dispersionless materials. This ceiling is presented in Tables 6–8 summarizing split-element color polarizer designs centered at each primary.

In either design, the split-element retardance is $m^{th}$ order half-wave at the transmission peak. For parallel split-elements, the central retarder is an $n^{th}$ order full-wave retarder, and for crossed split-elements it is an $n^{th}$ order half-wave retarder. In general, the split-element stage produces adjacent maxima at retardances of $(m+\frac{3}{2})$ and $(m-\frac{1}{2})$ waves, which nearly coincide with nulls produced by the central stage. For parallel split elements, this occurs for retardances of $(n+\frac{1}{2})$ and $(n-\frac{1}{2})$ waves, respectively. For crossed split-elements, this occurs for retardances of $(n+1)$ and n waves, respectively. The two additional nulls between each peak correspond to full-wave retardances of the split-element, $(m-1)$, m, $(m+1)$, $(m+2)$.

Figure 13C:
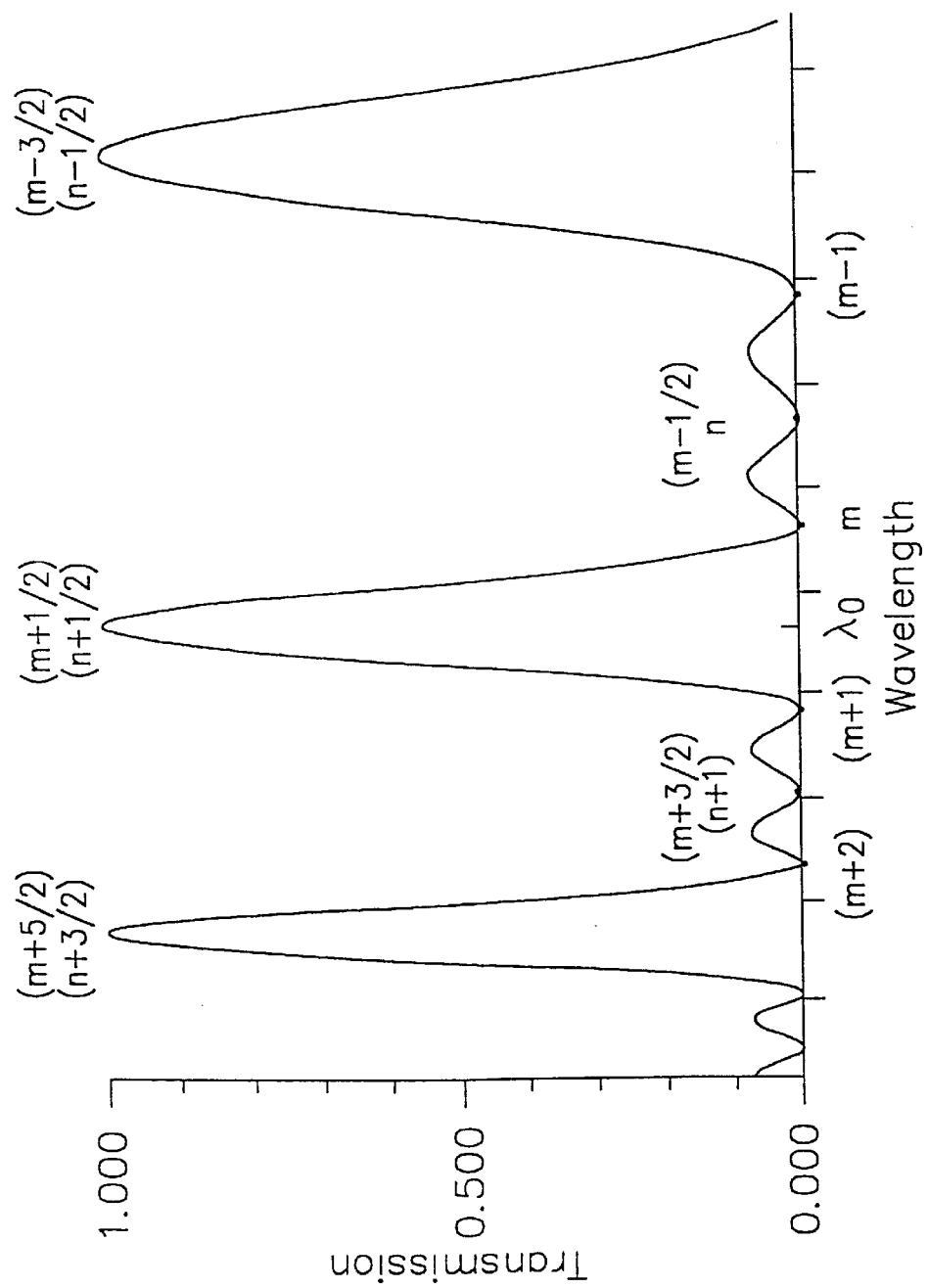

The chromaticity of the required zero-order retardances can create a compromise between peak transmission of the primary, and uniformity of the blocking (balance of side-lobe amplitude). This is best shown by examining FIGS. 13b and c. FIG. 13 shows the maxima and nulls for the ideal split-element retarder having achromatic retarders added to the split-element retarder and, in FIG. 13c, to the center retarder. When zero-order retarders are used instead of achromatic retarders, relative positions of the maxima and nulls are shifted. For crossed split-elements, neither $(m+\frac{3}{2})$ and $(n+1)$ nor $(m-\frac{1}{2})$ and n waves of retardance can occur at the identical wavelength when $(m+\frac{1}{2})$ and $(n+\frac{1}{2})$ waves of retardance do, and vice-versa. For parallel split-elements neither $(m+\frac{3}{2})$ and $(n+\frac{1}{2})$ nor $(m-\frac{1}{2})$ and $(n-\frac{1}{2})$ waves of retardance can occur at the identical wavelength when $(m+\frac{1}{2})$ and n waves of retardance do, and vice-versa.

Figure 8A:
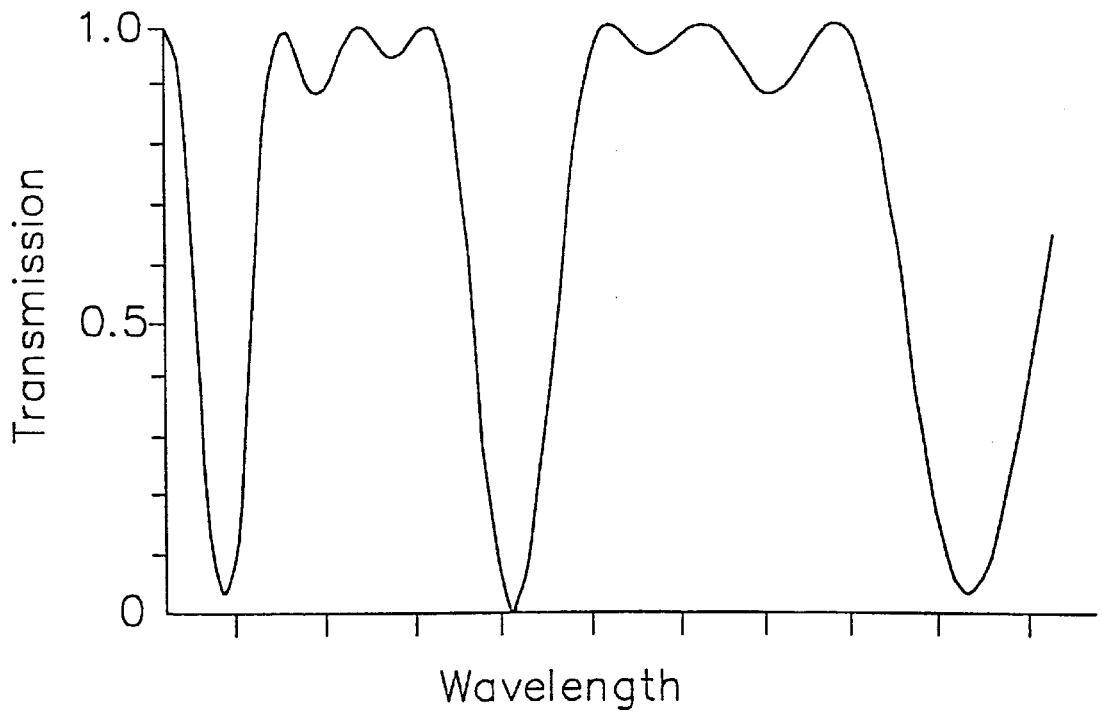
FIGS. 8a–b, shows example spectra illustrating the parameters given in design Tables 3–8.
Figure 8B:
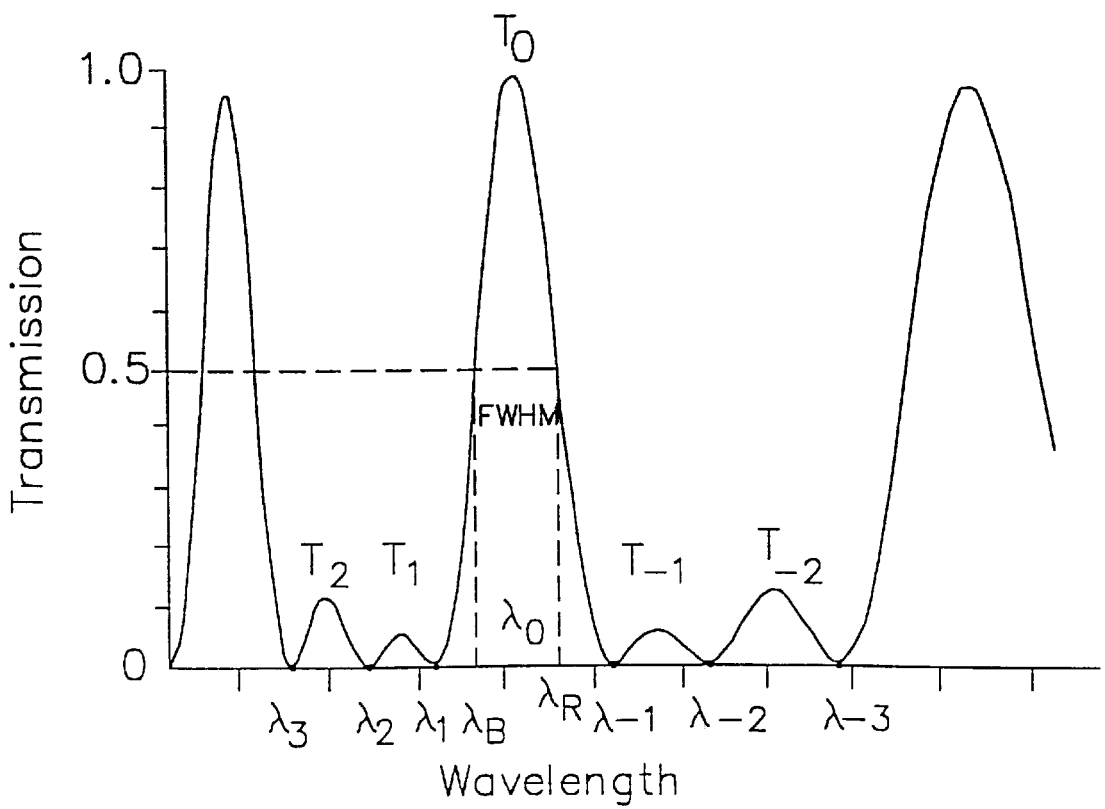

In these filters, the ratio of side-lobe amplitude depends only upon the sign of residual retardance between center and split-elements. That is, when $$(\Gamma_{SE}/2 - \Gamma_C) = -\frac{1}{4}, T_1 > T_2$$

and when, $$(\Gamma_{SE}/2 - \Gamma_C) = +\frac{1}{4}, T_1 < T_2$$

where $T_1$ and $T_2$ are the amplitudes of the side lobes as shown in FIG. 8. In general, symmetric side lobes have the same amplitude, or $T_1 = T_{-1}$ and $T_2 = T_{-2}$. The desired relative side-lobe amplitude depends upon the spectral position of nulls relative to the source primary bands. Null wavelengths depend upon resolution, and the birefringence dispersion of the material.

When necessary, there are two methods to compensate for the chromaticity of the zero-order retardances in order to improve side-lobe balance. One method is to shift the relative design wavelengths of center and split-elements, which is equivalent to shifting the relative retardances. This is most appropriate when there is an asymmetric blocking requirement (blue or red, as opposed to green). The second method is to use materials with dissimilar birefringence dispersion to compensate for the difference in retardance. For instance, when the residual retardance is negative, a more dispersive material should be used for the split-elements. When the residual retardance is positive, a more dispersive material should be used for the center retarder.

It should be mentioned that the imbalance of side lobe amplitude can be beneficial in many instances. In some designs, it is actually desirable to further imbalance the side-lobe amplitudes to achieve blocking characteristics more suited to the source spectrum. Such cases are described further with respect to specific color polarizer designs.

The spectra generated by split-element color polarizers are summarized using the representative spectra of FIG. 8. In general, the additive primary spectrum (APS) is represented by a pass-band with peak transmission $T_o$ at center wavelength $\lambda_o$ and resolution FWHM=$(\lambda_R - \lambda_B)$. By contrast, the subtractive primary spectrum (SPS), the inverse, is represented by a notch. The relative broad bands of high transmission adjacent to the notch coincide with the complementary subtractive primary color.

Adjacent to the central pass-band are higher and lower orders that must be positioned outside the visible (or away from visible source emissions) to avoid blue/red leak, respectively. Transmission of light by these orders desaturates the APS. Conversely, in the interest of simplifying the stack design, the span between the orders should be the minimum bandwidth that produces saturated colors.

Depending upon the particular design, each maximum is separated by a series of nulls and side-lobes. The location of null wavelengths is indicated in FIG. 8. Since the nulls of the APS coincide with the peaks of the SPS, care must be taken to match the source spectrum with the critical null wavelengths. It is desirable to minimize the amplitude of the side-lobes, represented by $T_1(=T_{-1})$ and $T_2(=T_{-2})$.

Split-Element Red/Cyan

The R/C split-element color polarizer experiences the greatest improvement in saturation and throughput over single retarders. The increase from one null (single retarder), to as many as three nulls in the blocking band provides both high red transmission and excellent saturation. In spite of the relative slow change in retardance in the red, relative to the blue-green, sharp transition slopes are achievable as well as broad blocking in the blue-green, even with dispersive materials. The selection of retardances depends most importantly on the birefringence dispersion, the peak transmission wavelength, and the nearest (green) null wavelength. However, the slope of the red-green transition band is ultimately limited by blue leak from the higher order.

Tables 6–8 were constructed for dispersionless materials, representing the upper limit on retardance (no significant blue leak). Table 6 gives nine red/cyan designs, five of which have crossed split-elements. The crossed split-element designs can be identified by half-wave center retardances. Low retardance split-elements have longer center design wavelengths to permit acceptable blocking in the green. High retardance split-elements have shorter center design wavelengths to minimize blue leak. To reduce side-lobe amplitude, relative large differences between center element and split-element design wavelengths were used for low retardance designs. This has the adverse effect of reducing peak transmission, as shown. As the order is increased, the difference in design wavelengths can be decreased, giving greater peak transmission. In all cases, some design wavelength difference is used to balance the side lobe amplitudes. For low retardances, as little as one (broadened) null is present, and at the maximum retardance, as many as three nulls are present. Difference in design wavelength for specified center and split-element retardances can equivalently be described as a difference in the retardances with a single design wavelength. When adjusting the retardances to tailor side lobes and nulls, the variation in retardance is generally less than $\pi/4$.

Figure 14:
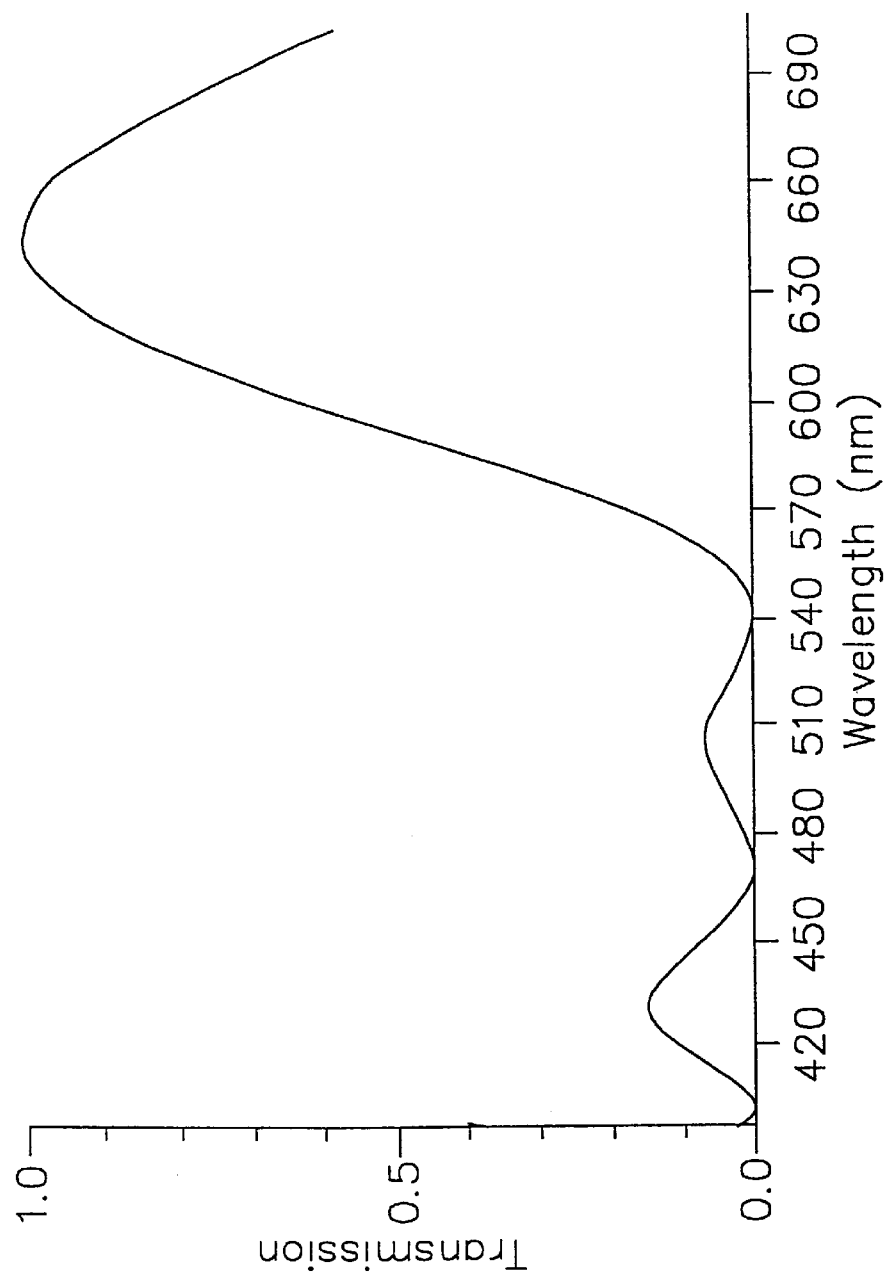
FIG. 14 is a computer model additive primary spectrum for an R/C split-element PRS for design 4 of Table 6.
Figure 15A:
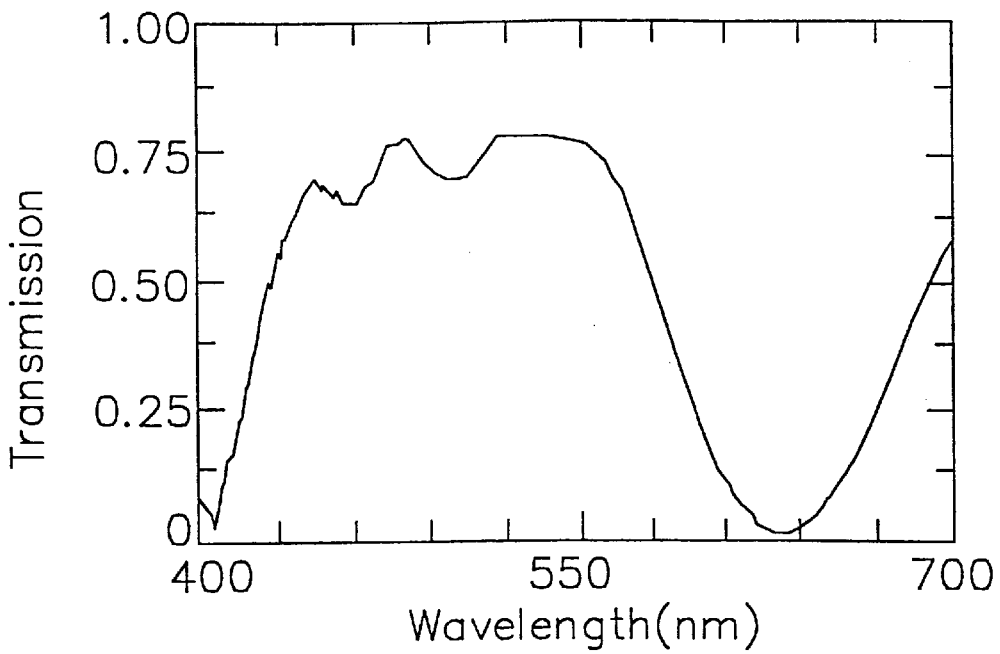
FIGS. 15a–b, is measured spectra of the (a) subtractive primary and (b) additive primary for an R/C PRS using the split-element of design 4 of Table 6 and polycarbonate retarders. The polarizer is Sanritzu LLC2-5518, and the retarder is Nitto NRF polycarbonate film. The stack was assembled using the adhesives provided on the standard product.
Figure 15B:
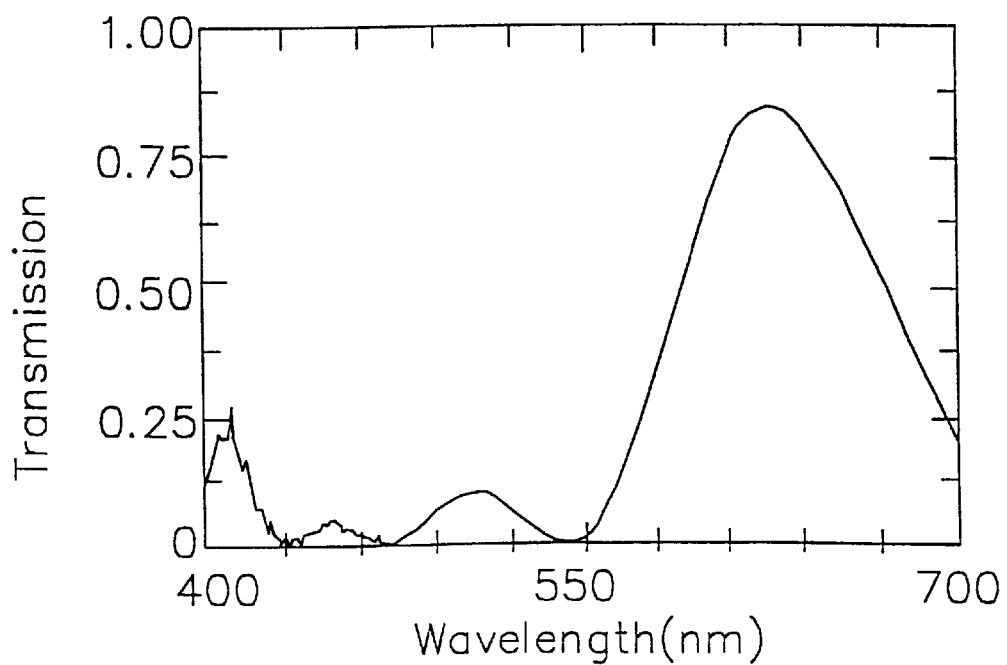

FIG. 14 shows the additive primary spectrum for an RlC color polarizer using design 4 of Table 6. FIG. 15 shows the measured transmission of an actual R/C split-element color polarizer subtractive primary spectrum (FIG. 15a) and additive primary spectrum (FIG. 15b). The stack is a single split-element design with crossed split-elements, fabricated with NRF retarder film, and Nitto G1225 polarizing film.

Split-Element Green/Magenta

While the best single retarder designs are G/M filters, due to the symmetric blocking requirement, a significant improvement is still realized in using split-element designs. In single retarder schemes, particularly with dispersive materials, increasing the resolution of the green band excessively narrows the blue rejected band. This represents a desaturation of the additive primary band, and a throughput loss for the subtractive band, particularly in the blue. Conversely, increasing the resolution of the split-element green band broadens the bandwidth of each of the two primaries comprising the subtractive primary band. Due to the large blocking bandwidth between maxima of the split-element, a large range in green resolution is available. The low resolution limit ultimately occurs when the split-element provides spectra no better than that possible with a single retarder (two or fewer visible nulls). The high resolution limit occurs when the central stage FSR is insufficient, allowing blue-leak. Within these bounds, the range in retarder order, or resolution, depends a great deal on birefringence dispersion.

As many as three wavelength nulls in the blue and three in the red are available for isolating green from magenta. In general (even for dispersionless materials), the maximum resolution is that for which blue-leak by the higher order maximum begins to desaturate the primary. A total of 12 designs are presented in Table 7 using non-dispersive materials. A design wavelength of $\lambda_o$=545 nm was arbitrarily selected. In all examples, the design wavelengths for split-element and central stages are identical, giving a theoretical peak transmission of 100%. An ideal neutral polarizer is assumed in order to differentiate the effect of the retarder stack from other potential losses.

Table 7 shows the characteristics of twelve split-element designs. With dispersionless materials, the low resolution limit appears to be less than 2.5 waves of split-element retardance. With this resolution, a single red null is present, with one (full-wave center retarder), or two (1.5 wave center retarder) blue nulls. The high resolution limit occurs with ~6.5 waves of split-element retardance, where the blue order appears at roughly 420 nm. A total of 5 nulls are present here, and the final red null would occur below 700 nm for a slightly lower design wavelength. The corresponding range in resolution is 104 nm FWHM for 2.5 waves of split-element retardance, and a 38 nm FWHM for 6.5 waves of split-element retardance.

Figure 16:
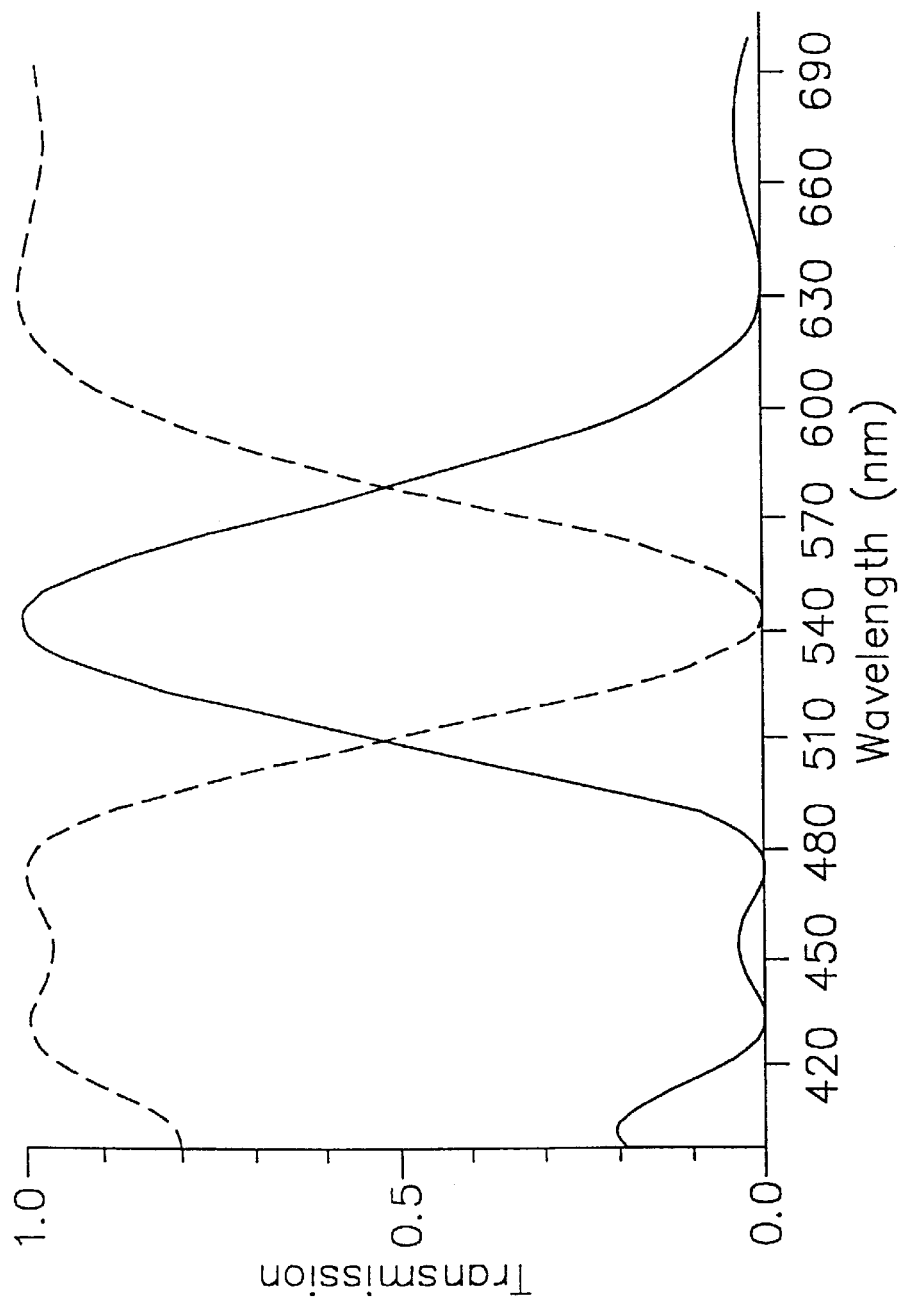
FIG. 16 is computer model additive and subtractive spectra for a G/M split-element PRS for design 6 of Table 7.

Design 6, modeled in FIG. 16 is an exemplary split-element G/M color polarizer. The spectrum has moderate resolution (70 nm FWHM), and well placed nulls Two blue nulls permit effective blocking, a single null being sufficient in the red. The near side-lobe amplitudes are also fairly low (3.4%).

When dispersive materials are used, significantly different transmission spectra result. Birefringence dispersion produces an imbalance between blocking bandwidth in the blue and red bands. For instance, a polycarbonate PRS using only 1.5 waves of split-element retardance, gives no red nulls, but produces two blue hulls. The low resolution limit, where one red null first occurs, corresponds to a split-element retardance of 2.5 waves. The high resolution limit occurs at roughly 4.5 waves, where the blue order appears at 418 nm. The corresponding range in resolution is 82 nm for 2.5 waves of split-element retardance, to 45 nm for 4.5 waves of split-element retardance.

Figure 17:
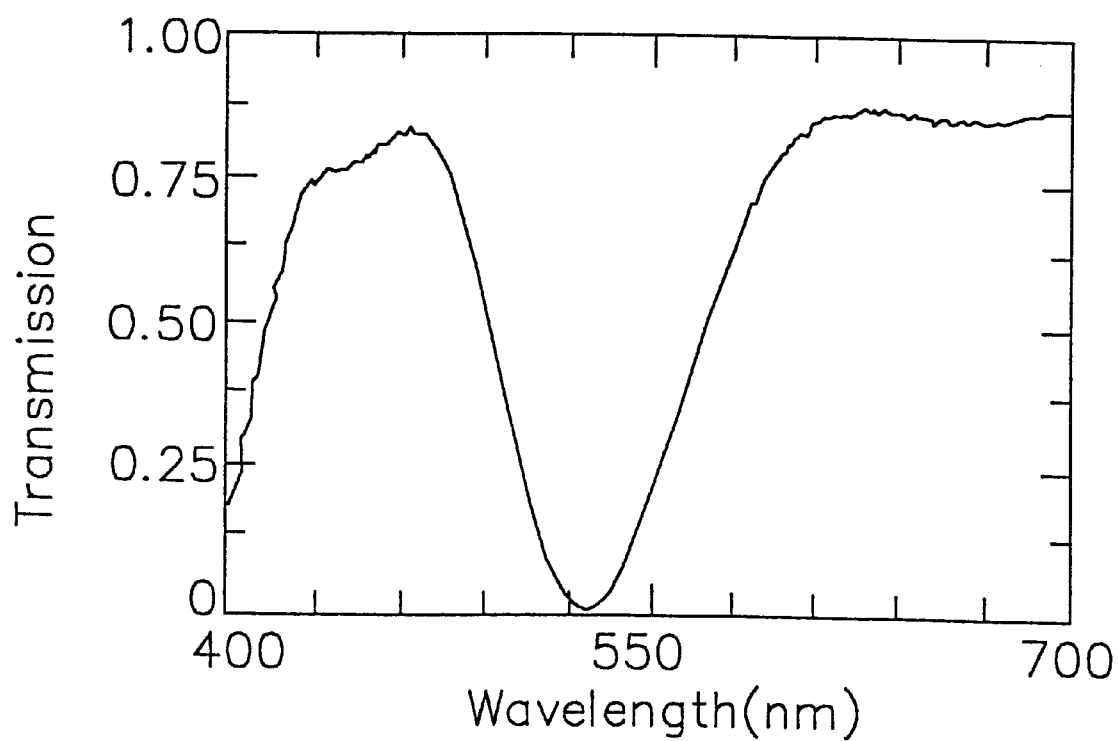
FIG. 17 is the measured subtractive primary spectrum for a G/M PRS using the split-element of design 4 of Table 7 and polycarbonate retarders. The polarizer is Sanritzu LLC2-5518.

FIG. 17 shows the measured transmission of a G/M color polarizer based on Design 4 with a parallel analyzing polarizer. The split-element was fabricated using NRF retardation film and Nitto G1225 polarizer. Note that the resolution is considerably higher than Design 4 with dispersionless material (FIG. 16).

The throughput of the subtractive spectrum is intimately connected to the side lobe amplitude of the additive primary spectrum. The relative amplitude of side lobes depends upon the relative retardance of the split-elements and center retarder. When the split-element retardance is less than twice the center retardance, the side lobes directly adjacent the pass-band are smaller than the remaining two. When the split-element retardance exceeds twice the center retardance, the side lobes directly adjacent the pass-band are suppressed relative to the remaining two. This is most likely the attractive design, though the ultimate choice in relative retardance depends upon the source characteristics.

Split-Element Blue/Yellow

The challenge in fabricating a high quality B/Y split-element color polarizer is to obtain a broad blue transmission band while providing sufficient blocking in the green and red. In the case of the R/C color polarizer, the steepest transition slope of the pass-band occurs between red and green primaries. This gives the desirable result of a broad red transmission and effective green blocking. Conversely, the B/Y color polarizer has it's shallowest transition slope between the blue and green bands. Thus, in providing adequate separation of green and blue primaries, the resolution of the blue band becomes excessive. Consequently, this represents a degradation of the yellow saturation. This situation is much worse for materials with a large birefringence dispersion. Examples will show that this is where the benefits of the double-split-element are most felt.

Double-split-element retarder stacks comprise a center retarder, an inner pair of split-element retarders, and an outer pair of split-element retarders. The inner split-element retarders can be parallel or crossed with each other, as can the outer split-element retarders. In following example both pairs of split-element retarders are crossed.

Figure 18:
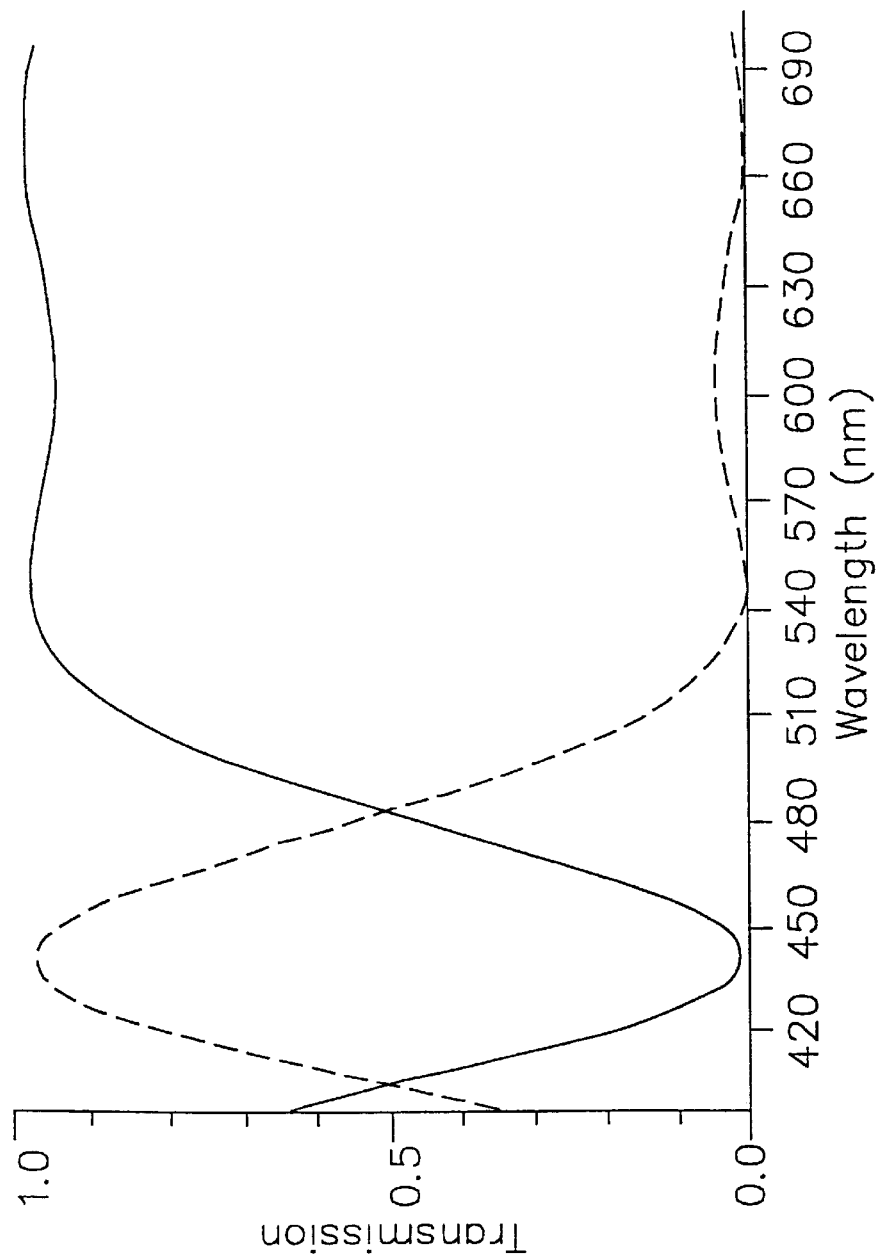
FIG. 18 is computer model additive and subtractive spectra for a B/Y split-element PRS for design 4 of Table 8.

Eight split-element B/Y designs were considered for dispersionless material, along with a single double-split-element design, as shown in Table 8. Design 3 produced acceptably low resolution (FWHM=78 nm), low side lobe amplitude, and a first null at 550 nm. Designs 1 and 2 had broad transition bands, but failed to produce a green null. Design 3 has the benefit of a slightly lower resolution than Design 4, along with a narrower transition band, but the side lobe amplitude is quite high in the red. Designs 5–8 were acceptable, but the blue bandwidth becomes increasingly narrow. Such designs are most appropriate for source spectra with rather confined blue power spectra. FIG. 18 shows the additive and subtractive primary spectra for design 4.

The double-split-element provides compensation for the increase in retardance at shorter wavelengths. The design permits a slowly varying transmission function in the blue, to allow a broad blue pass-band, with a narrow blue to green transition band width. The basic approach is to produce a sharp blue-green transition slope with a notch in the green, rather than a bandpass in the blue. This eliminates the tradeoff between blue-green transition slope and excessive blue resolution. As the resolution of the notch is increased, in part due to birefringence dispersion, the blue band is broadened rather than narrowed. In fact, the double-split-element in general contains the notch transmission function produced by a single split-element with crossed split-elements. With a double-split-element, the notch spectrum is further modulated by the transmission function for a single retarder between crossed or parallel polarizers. This is a low resolution transmission function that transmits the blue and rejects the red. The result is a broad blue transmission function and effective green-red blocking.

Figure 19:
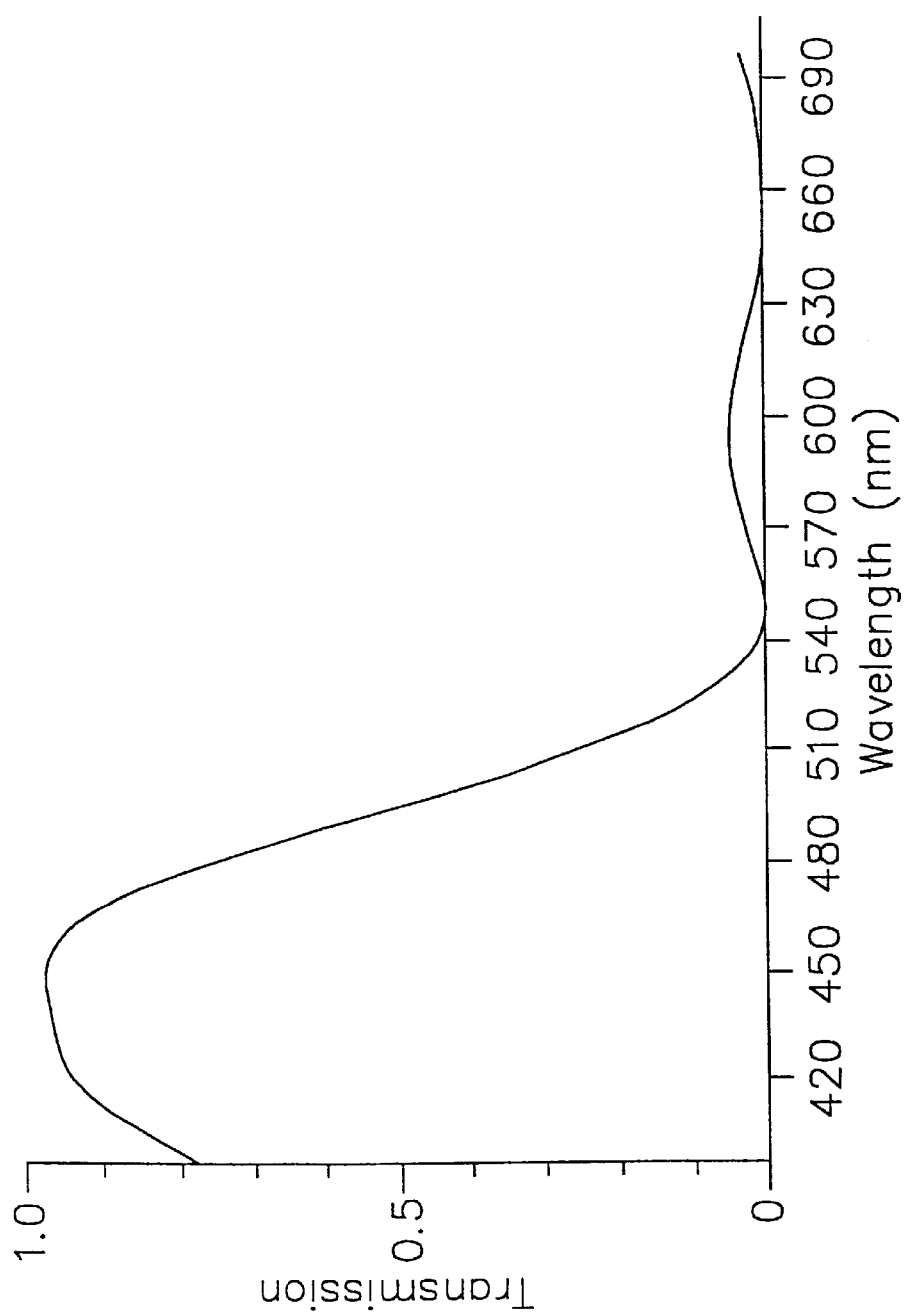
FIG. 19 is a computer model additive spectrum for a B/Y double-split-element PRS using design 9 of Table 8.

Design 9 of Table 8 gives outside and inside split-element retardances, along with the central retardance. Note that the split-elements produce the subtractive (magenta) primary spectrum of Design 5 of the G/M split-element (see Table 7). The red is then rejected by the transmission function of a first-order blue half-wave retarder between crossed polarizers. The result is a desirable 97 nm FWHM, a 496 nm cutoff wavelength and a first null at 550 nm. FIG. 19 shows the transmission function for this design using dispersionless material.

Figure 20:
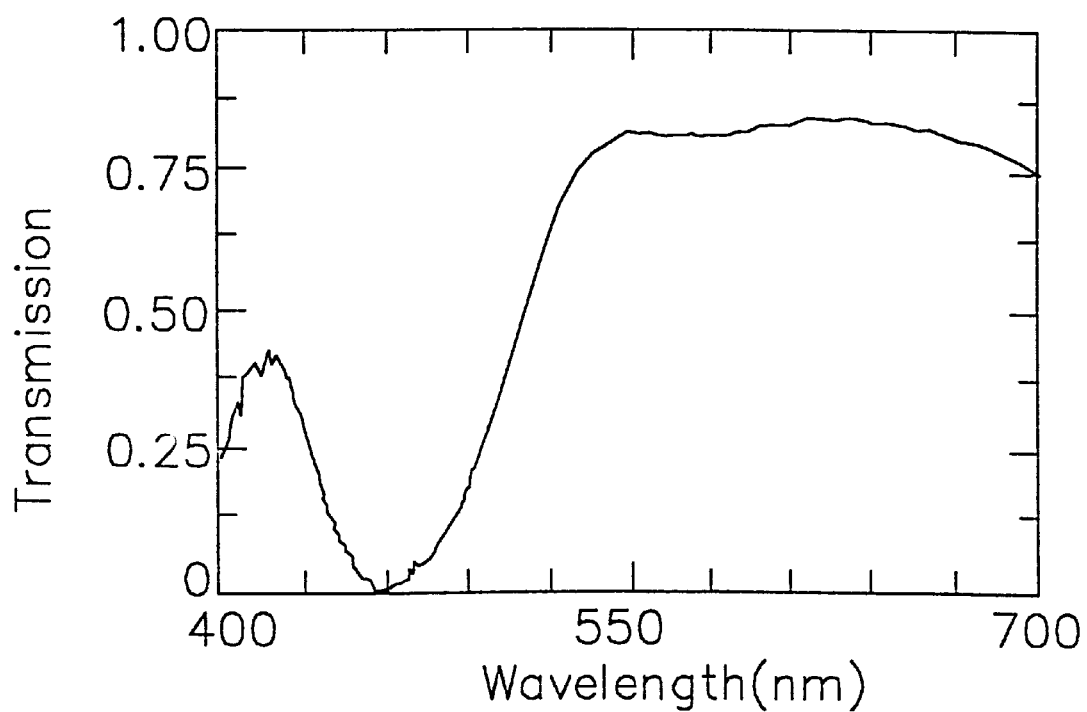
FIG. 20 is a measured subtractive primary spectrum for design 9 of Table 8 using polycarbonate retarders. The polarizer is Nitto G1225DU.

FIG. 20 shows the measured subtractive primary spectrum of a B/Y double-split-element fabricated with a stack of Nitto NRF polycarbonate retardation films on a Sanritzu LLC2-5518SF polarizer. The spectrum shows less green transmission than red, due to the characteristics of the polarizer. Fresnel losses due to front and back surfaces are present, indicating a potential of 89% transmission in the red. The blue transmission is quite low as can be seen in the figure. A decrease in the bandwidth of the blue notch is due to the dispersion of the retardation film.

Systems Utilizing PRS

Passive Color Separators and Combiners

Figure 21:
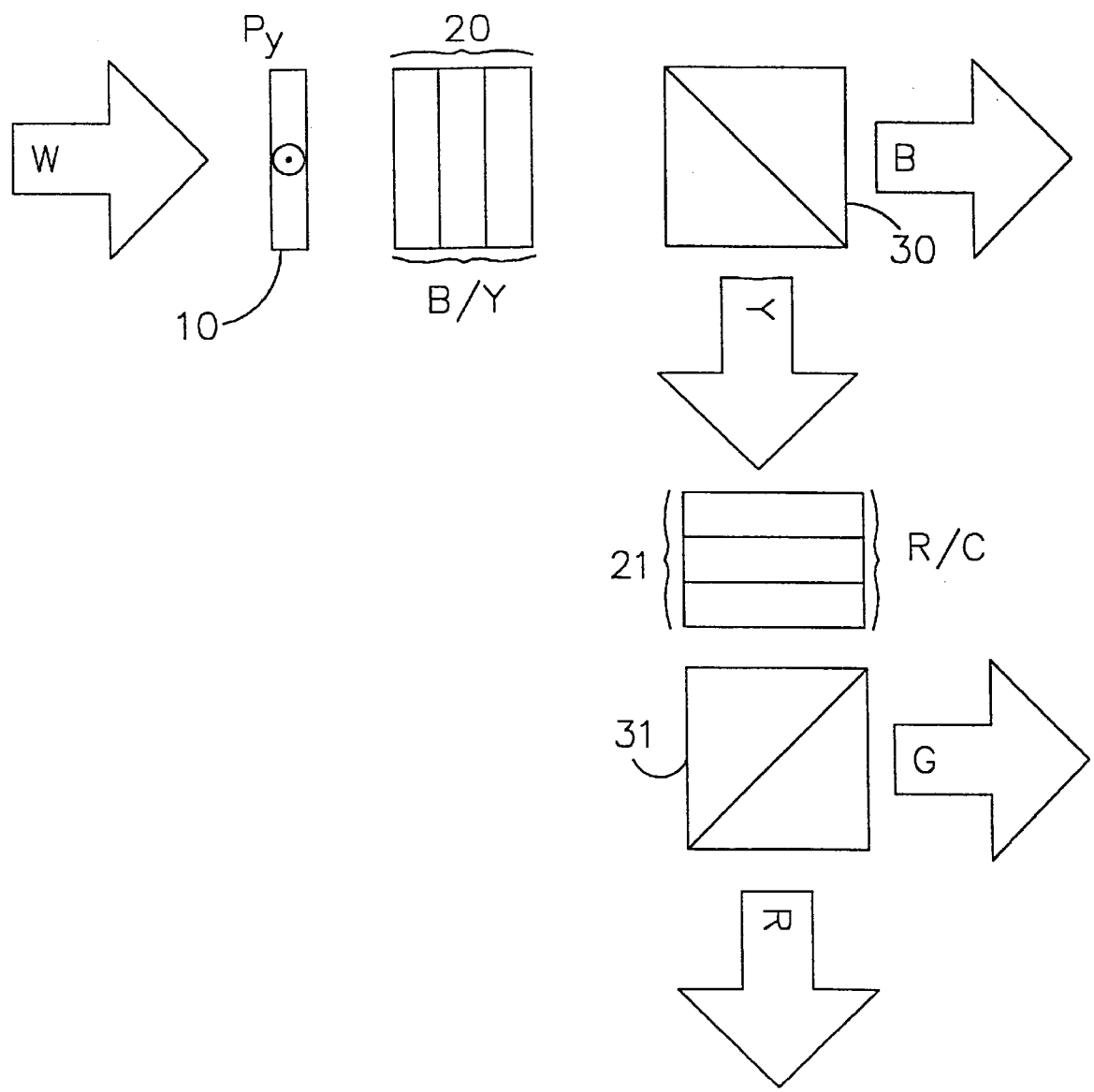
FIG. 21 is a diagram showing the use of two PRS stacks to separate white light into polarized red, green and blue bands.
Figure 22:
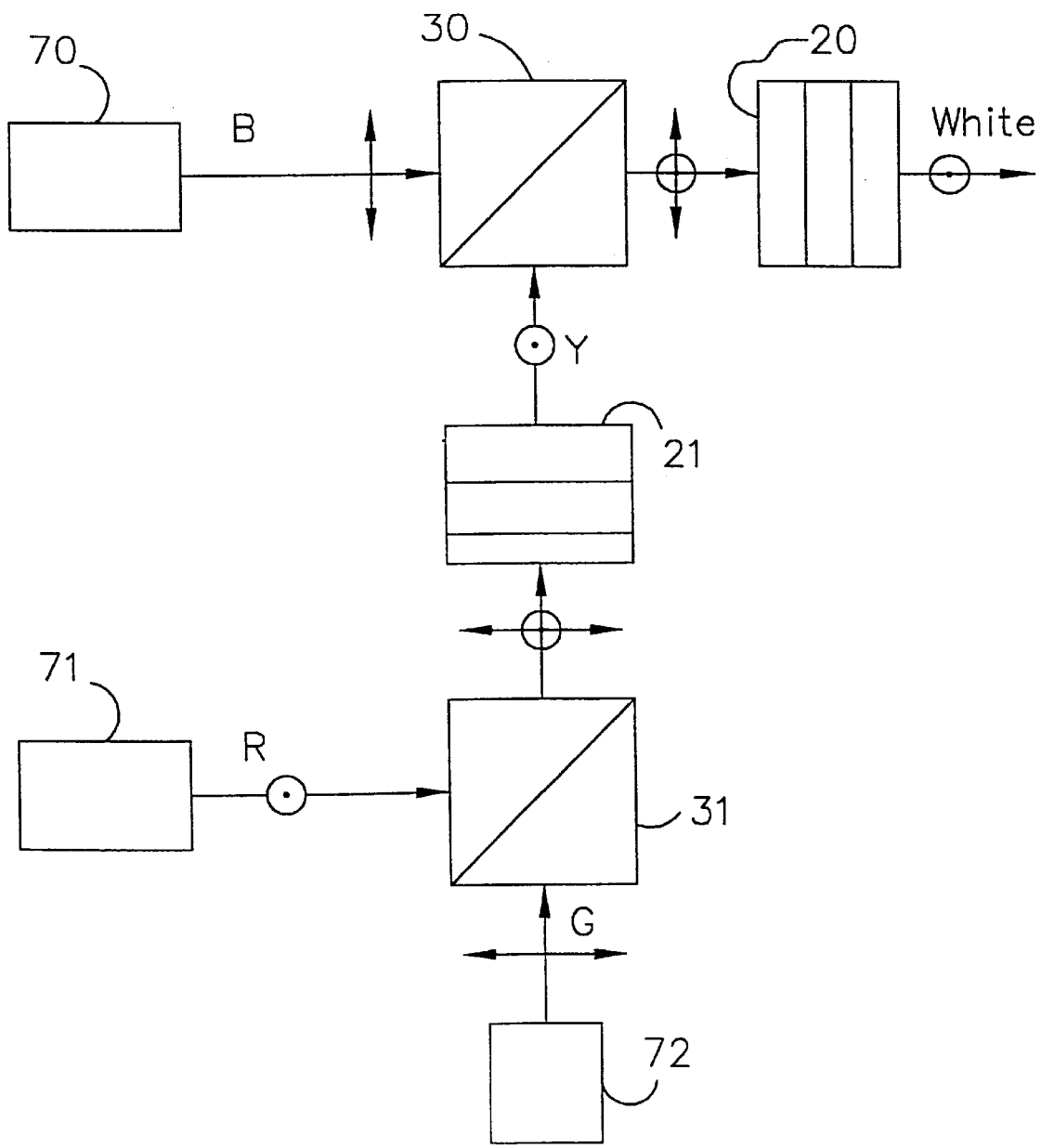
FIG. 22 is a diagram showing the use of two PRS stacks to combine three polarized sources to form white light in a single polarization state.

When PRS is formed with polarization splitters, reciprocal color separators and combiners are formed. FIG. 21 shows a three-color separator using two PRS stacks, 20 and 21, neutral polarizer 10, and two polarization splitters, 30 and 31. White light is converted into polarized additive primary color bands using B/Y and R/C stacks. Similarly, sources 70, 71 and 72 emitting light at each of the additive primaries can be combined into a single white linear polarization state using the setup of FIG. 22.

Two-Color Shutters

Figure 23A:
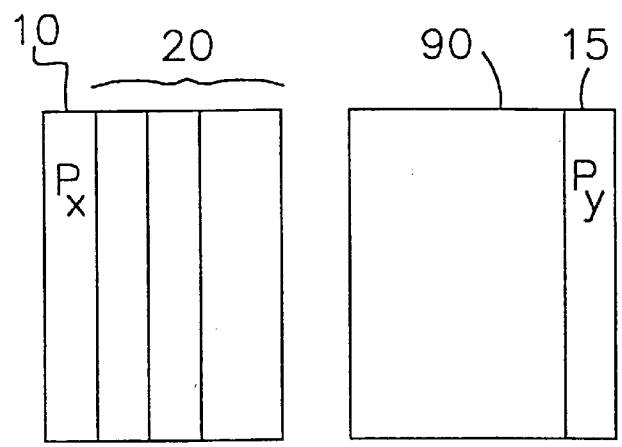
FIGS. 23a–b, is block diagrams showing the layout of (a) a single-stage two-color PRS filter and (b) a two-stage four-color PRS filter.

Since PRS is complementary, it is well suited to providing modulation between R/C, G/M or B/Y. Color shutters are formed by combining a PRS structure with an active polarization separator such as a switchable polarizer, which can be a polarization switch preceding a static analyzing polarizer. A block diagram of a two-color switch is shown in FIG. 23a. The color polarizer comprises neutral polarizer 10 and retarder stack 20. The polarization separator comprises polarization switch 90 and analyzing polarizer 15.

The switchable polarizer for use with PRS ideally provides the function of a neutral polarizer that can be modulated between 0° and 90° orientations. A guest-host dichroic 45-degree tilt FLC polarizer, or a combination of two polarizer-on-demand structures would provide this function. Alternatively, any polarization switching element preceding a neutral polarizer is effectively a switchable polarizer. In general, a preferred switch is one that achieves a half-wave modulation with a zero-order retardance (approximately achromatic), low voltage and power consumption, a large field of view, low insertion loss, millisecond to sub-millisecond switching, and scaling to large aperture at low cost.

Nematic liquid crystal switching means include homogeneous, π-cell and twisted and super-twisted device alignments. Compound elements to improve switching performance, such as the push-pull cell, are also suitable. Smectic liquid crystal switches can be made of SmA* (paraelectric), SmC*, distorted helix ferroelectric, antiferroelectric, and achiral ferroelectric devices. The SmA* and SmC* can be homogeneously aligned or surface stabilized. An exemplary ferroelectric liquid crystal switching means is a homogeneous aligned 22.5-degree tilt SmC* half-wave device which switches in orientation between 0 and π/4. Switches are not limited to LC materials, and may include true electrooptic effect devices, piezoelectric, or electromechanical switches. They can be retarders which reflect the polarization or polarization rotators.

A drawback of a zero-order half-wave switch is it's inability, due to chromaticity, to provide efficient switching throughout the visible (400–700 nm). Compound elements which provide more achromatic polarization switching, particularly those requiring only one active device, greatly improve performance. A combination of two low-tilt ferroelectric liquid crystal (FLC) switches provides enhanced modulation, and also produces more achromatic polarization switching. An achromatic rotator is formed in the configuration where, with one field polarity, the optic axes of the cells are crossed and, with application of a reverse field, the axes tilt in opposing directions. However, two cells are required per stage, increasing cost, complexity, and reducing transmission.

Figure 24:
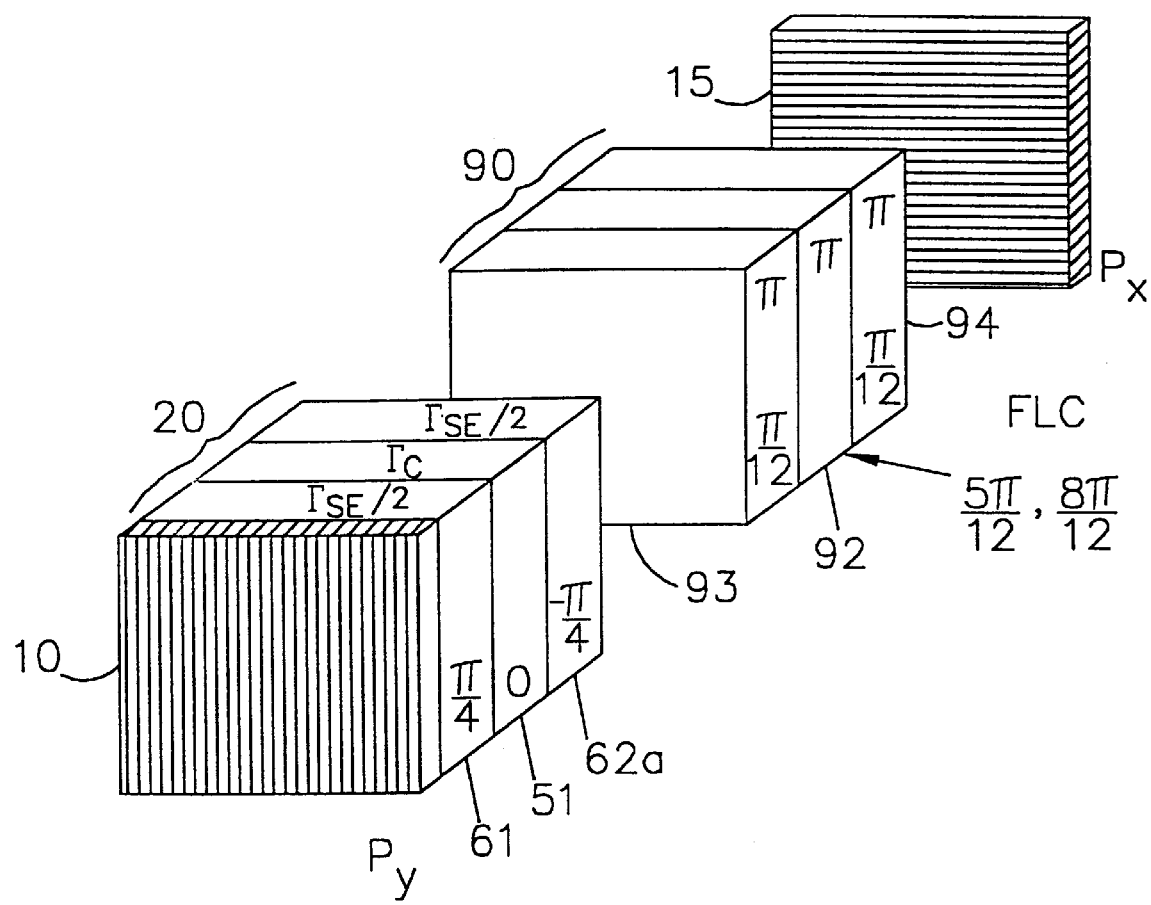
FIG. 24 is an example of a two-color filter using a rotative achromatic half-wave polarization switch and a split-element PRS.

A more elegant approach is to combine a single active element with passive retarders to achieve achromatic switching. Such structures can be formed by combining one or two passive half-wave retardation films with an FLC half-wave retarder to produce a compound achromatic switch. An achromatic half-wave polarization switch is described in U.S. patent application Ser. No. 08/419,593, filed Apr. 7, 1995, which is hereby incorporated by reference in its entirety. One embodiment of the achromatic half-wave switch is illustrated in FIG. 24. Switch 90 comprises FLC half-wave plate 92 having orientation switchable between $5\pi/12$ and $8\pi/12$, positioned between passive half-wave plates 93 and 94 oriented at $\pi/12$. The composite retardance of switch 90 is a half-wave and the composite orientation switches between 0 and $\pi/4$. In other words, the three elements together appear like a single rotatable half-wave plate switchable between 0 and $\pi/4$, but with achromatic retardance. Polarization switch 90 in combination with static polarizer 15 functions as a switchable polarizer. When the composite orientation is 0, the polarization is not modulated by the switch and x-polarized light is transmitted. When the composite orientation is $\pi/4$, y-polarized light is flipped to x-polarization and is then transmitted. The achromatic half-wave polarization switch is a symmetric structure, allowing achromatic switching in both transmission and reflection. In general, these switches also provide a compensation for spatial variation in the retardance of the active element that can produce visible color variations.

FIG. 24 shows the layout of a two-color shutter employing FLC compound achromatic polarization switch 90 with split-element stack 20. The split-element stack comprises center retarder 51 and split-element retarders 61 and 62a.

The two-color switches described above switch between an additive primary and the complementary subtractive primary. Modified devices can switch between two additive primaries or between two subtractive primaries. To switch between two additive primaries, the color polarizer is combined with a passive filter that blocks one of the two additive primaries which comprise the subtractive primary output. This blocking can be achieved using any passive filter, such as dye-type, multi-layer stack, or even PIF optical filters. An appropriately oriented pleochroic color polarizer, positioned after the input polarizer, can function as the blocking filter. The blocking filter can be positioned before, after, or within the active switch. Table 9 lists combinations of active filters and blocking filters which provide outputs of two additive primaries.

To provide two subtractive primaries, the additive primary which is common to the two subtractive primaries is left unpolarized or unanalyzed. To achieve this, polarizer 10 and/or polarizer 15 in the switch of FIG. 23 is a pleochroic color polarizer instead of a neutral polarizer. A pleochroic polarizer functions as a polarizer only in a specific wavelength band. For instance, a blue color polarizer polarizes red and green light but leaves blue unpolarized. Any color polarizer with this characteristic can be employed. When the pleochroic polarizer is positioned at 10, the common additive primary is not polarized at the input. It therefore is not affected by the retarder stack or polarizer switch, and is transmitted in both switching states. When the pleochroic polarizer is positioned at 15, blue light is polarized at the input and is manipulated by the retarder stack and the polarization switch, but it is nevertheless transmitted in both switching states because it is not analyzed by the exit polarizer. Both polarizers 10 and 15 can be pleochroic color polarizers, allowing the common additive primary to pass through unpolarized. The stack must be designed so that it orthogonally polarizes the remaining two additive primaries. There are two options for each stack, based on two complementary color polarizers, as listed in Table 10. To provide a cyan/magenta shutter, for example, the common additive primary is blue so the pleochroic color polarizer is blue. The remaining two additive primaries are red and green, which can be orthogonally polarized by either a red/cyan stack or a green/magenta stack.

Full-Color Shutters

Figure 23B:
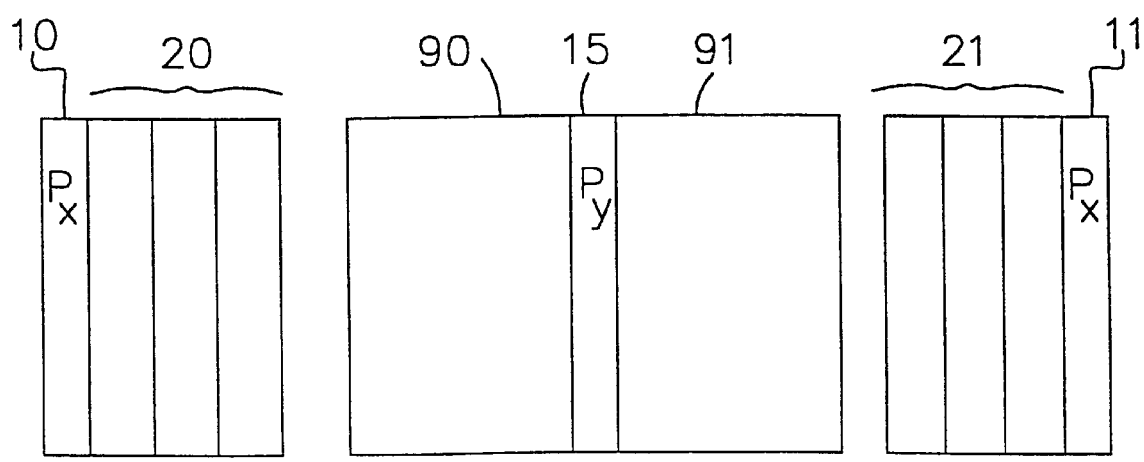

When two PRS color shutters are cascaded, full-color switching can be realized. FIG. 23b shows the block-diagram of a two-stage structure that provides four output bands, three of which are the additive primary colors (RGB) and the fourth is an off-state. The full color shutter comprises a first color polarizer (10 and 20) with a first switchable polarizer (90 and 15), cascaded with a second color polarizer (11 and 21) and a second switchable polarizer (91 and 15). Note that the direction of propagation through a particular stage is of no consequence. Therefore, either stage can be swapped end-for-end with no change in the transmitted spectra, e.g., elements 90 and 20 can be swapped.

Any combination of R/C, G/M, and B/Y PRS color polarizers can be used to generate the three primary colors. Two primary colors are generated directly as the additive primary of the color polarizer, though additional saturation is obtained via blocking by the alternate stage. The third color is generated as the product of the two subtractive primary spectra. The fourth color, the off-state, represents the product of the two additive color spectra. Due to the excellent color contrast of the PRS, the fourth state can be a high-contrast off-state. This is optimally achieved using the two most broadly separated additive primaries, red and blue, to insure no overlap of the transition bands. Red and blue primaries are provided by R/C and B/Y PRS structures, respectively. Furthermore, the contrast of the off-state is optimized for active units that modulate or effectively modulate the polarizer by 90-degrees.

Figure 25:
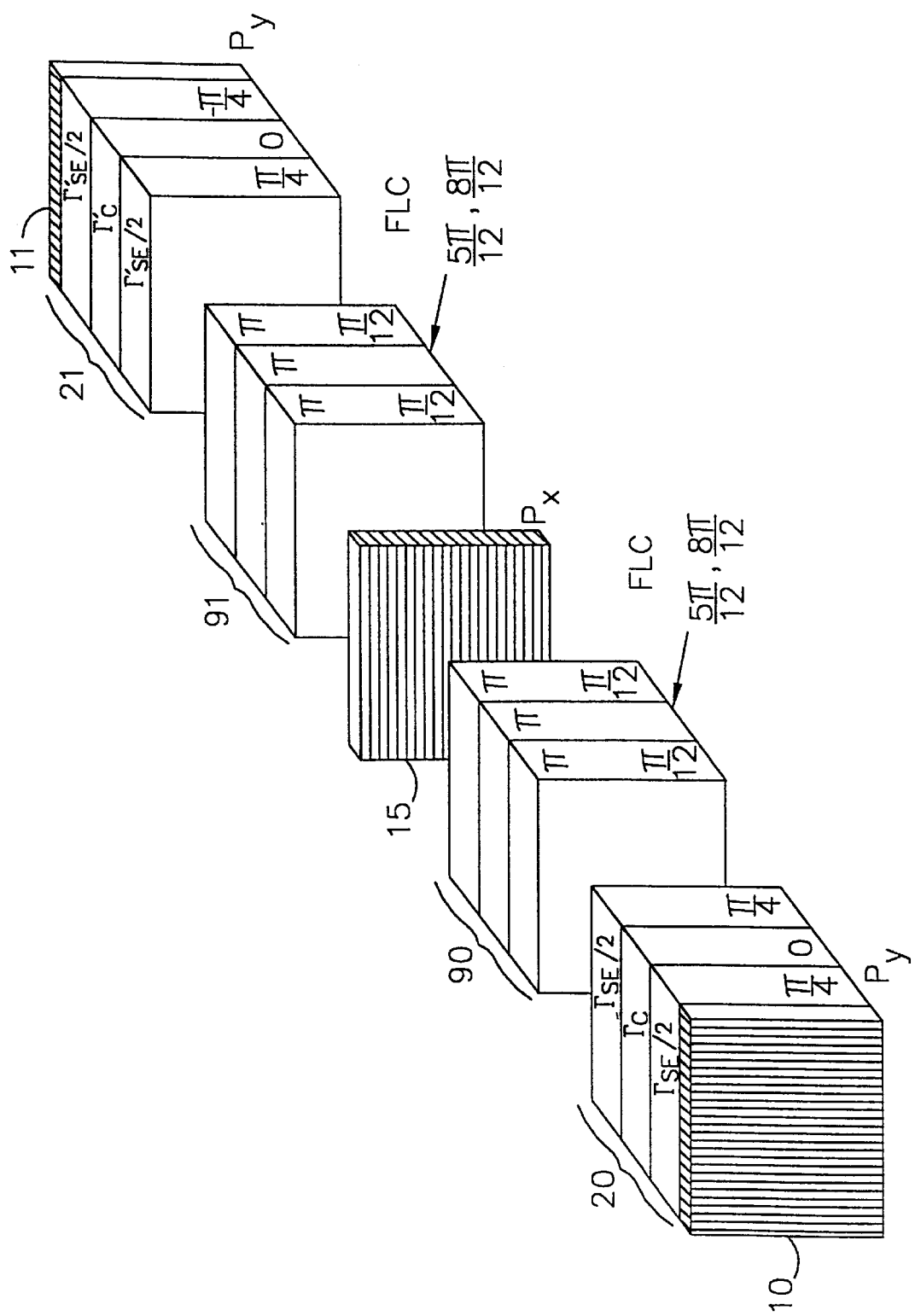
FIG. 25 is an example of a three-color filter using two rotative achromatic half-wave polarization switches and two split-element retarder stacks.
Figure 27A:
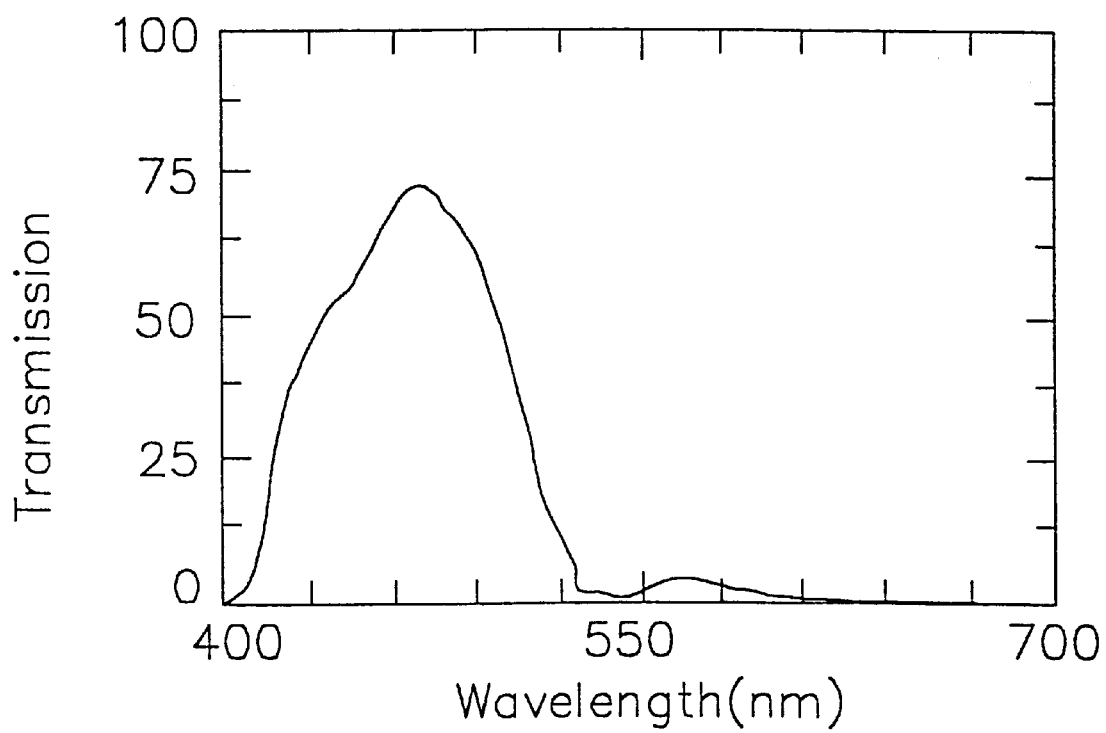
FIGS. 27a–d, is the measured transmission of the filter of FIG. 26 in the (a) blue, (b) red, (c) green and (d) off-state.
Figure 27B:
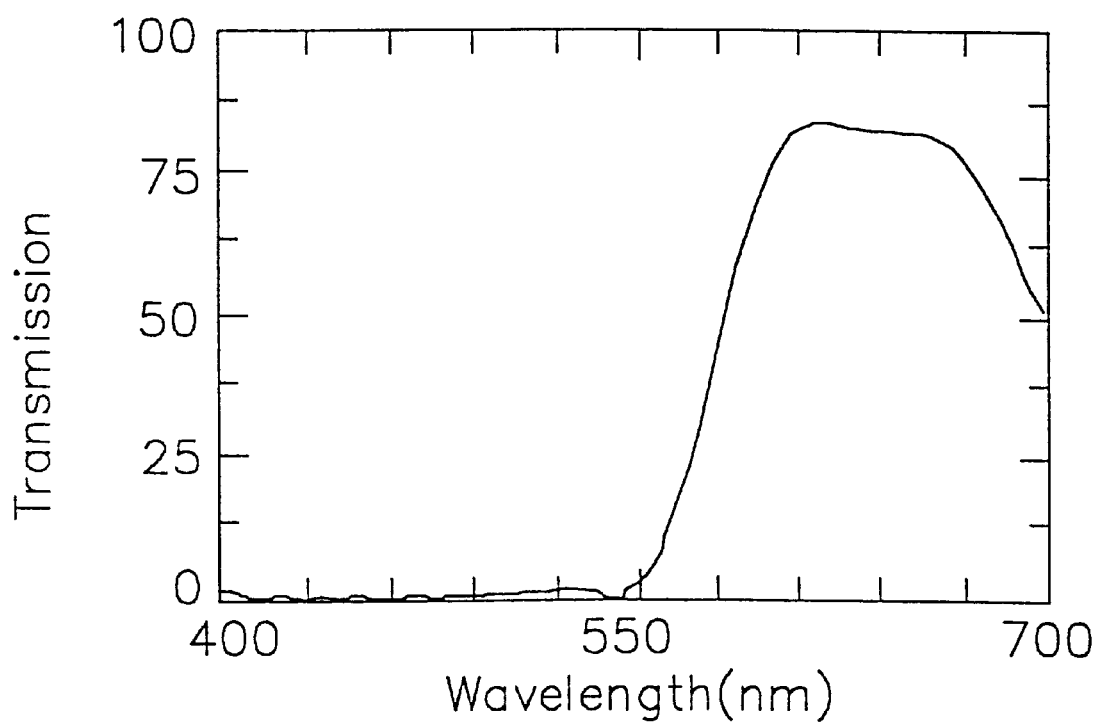
Figure 27C:
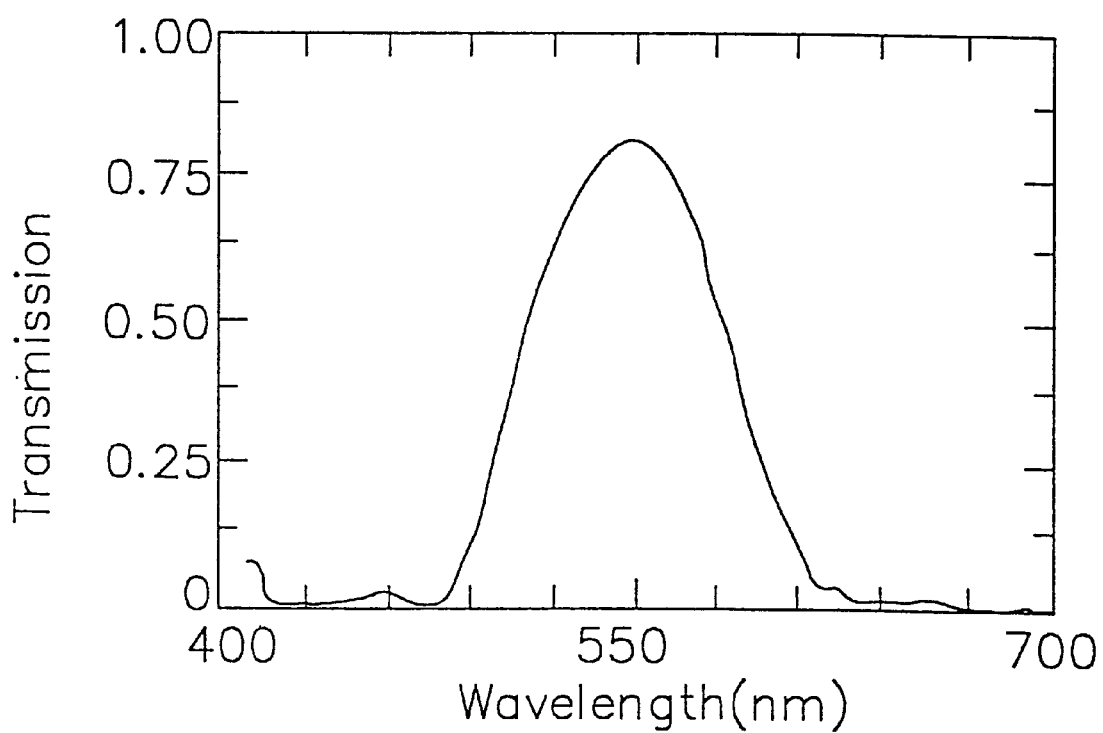
Figure 27D:
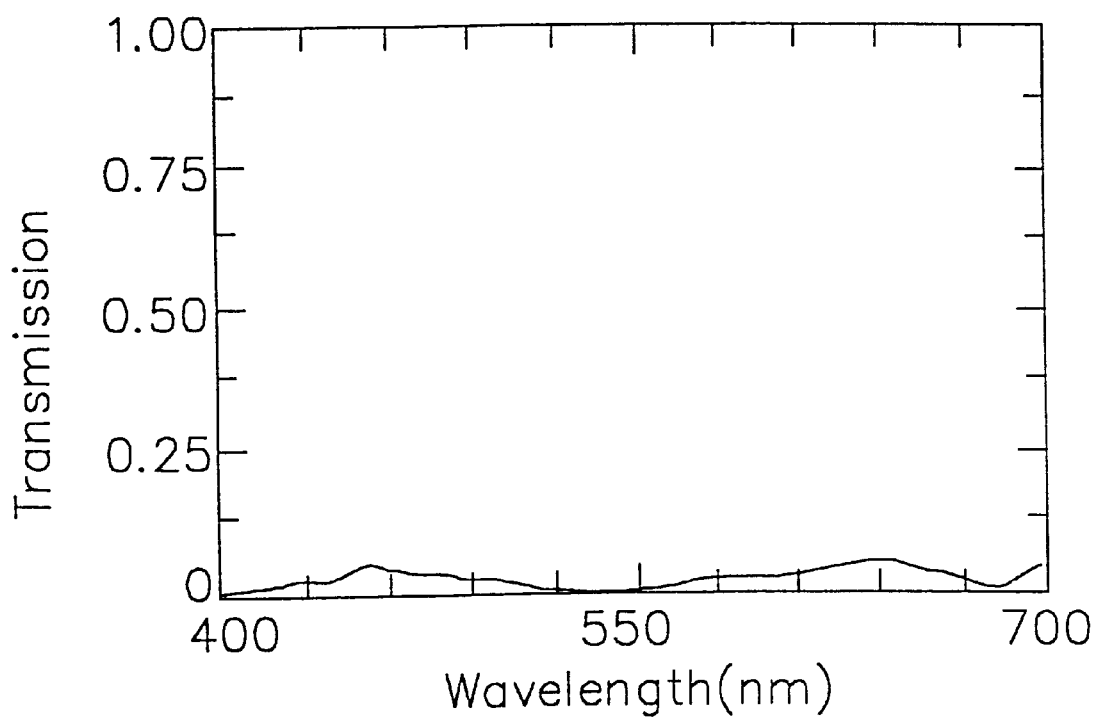

In a preferred embodiment, achromatic compound polarization switches are employed. In addition to improved color saturation, the highest optical density off-state is obtained with the use of achromatic polarization switches. FIG. 25 is an embodiment of the two-stage shutter utilizing achromatic polarization switches 90 and 91. The filter has a B/Y double split-element color polarizer in one stage and an R/C single split-element color polarizer in the other stage.

Figure 26:
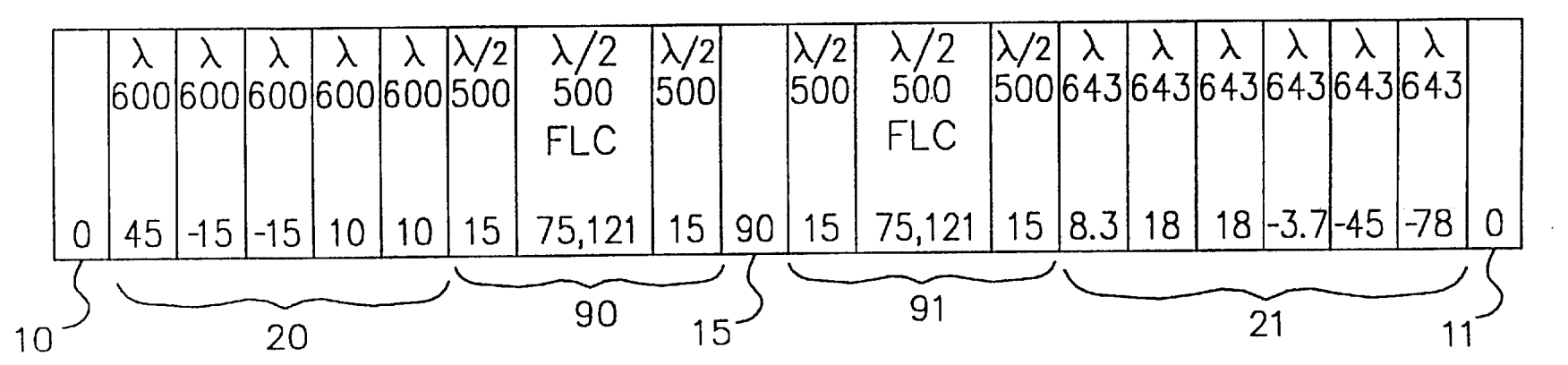

A two-stage color shutter designed by network synthesis using square-wave profiles is shown in FIG. 26. Retarders are represented as boxes with the retardance and design wavelength listed at the top and the orientations listed at the bottom. In the case of FLC polarizers which rotate between two orientations, the orientations are separated by a comma. Retarder stacks 20 and 21 have B/Y and R/C colors, respectively, and are based on network synthesis square profile designs. The individual color polarizer spectra were shown in FIGS. 5 and 7, respectively. The stacks were constructed with Nitto NRZ polycarbonate retarders having a 600 nm design wavelength for the B/Y stack and a 643 nm design wavelength for the R/C stack. Polarizers 10, 15 and 11 are Nitto G1225 DU polarizers with AR coatings. Polarization switches 90 and 91 were fabricated with 500 nm half-wave FLC cells in combination with Nitto NRF 500 nm half-wave retardation film.

Experimentally measured output spectra for the design of FIG. 26 are shown in FIG. 27 for the (a) blue, (b) red and (c) green additive primaries. The off-state is shown in FIG. 27d. Saturation and throughput are excellent for all three primaries. Losses are attributed almost exclusively to polarizers 10, 15 and 11. These spectra were measured with polarized input light; for unpolarized input light the transmission is halved. After dividing transmission by two, the peak transmission for the three primary pass-bands averages about 40%. This is about three times better than the commercially available full-color shutters.

Color Displays and Cameras

The color switching filters can be combined in various configurations to produce video cameras or video displays to produce color video systems. Such systems have the advantage that color operation can be achieved with cameras or displays that are only black and white. Therefore, the need for three-beam CRTs with shadow masks and RGB phosphor triads is removed, as is the need for RGB color dots in video cameras and LC displays. The systems of the present invention still present or sense as many different colors as the more conventional systems. That is, any color contained in the area of color space defining the three primary bands of the filter can be generated or sensed, as any of the colors can be composed of a vector comprising admixtures of the components.

Figure 28A:
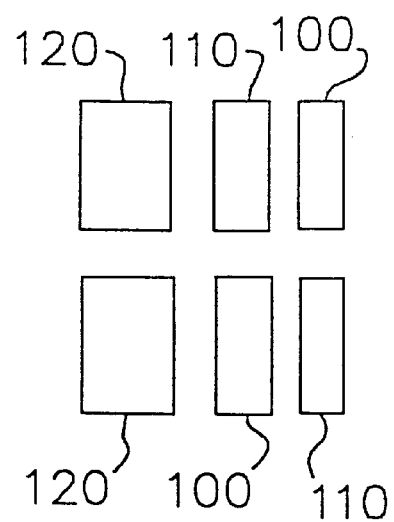
FIGS. 28a–d, show the use of PRS color filters in systems including, (a) a single pixel, or imaging receiver, (b) a field-sequential color display using a CRT, (c) a backlit LCD field-sequential display, and (d) a reflection-mode field-sequential color display illuminated by ambient light.

FIG. 28a illustrates a multispectral digital camera utilizing the color filter of this invention 100 in combination with a monochrome camera comprising imaging optics 110 and receiver 120. The imaging optics can be positioned either before or after the color filter. The filter can be either a two-color or full-color shutter. The full-color filter can be used to provide a field sequential full-color camera.

Figure 28B:
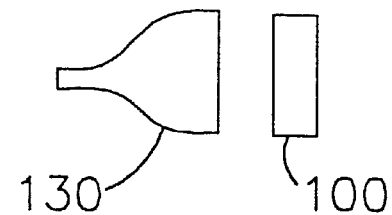
Figure 28C:
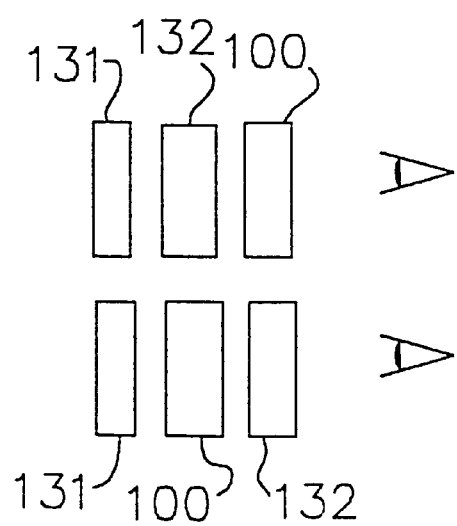
Figure 28D:
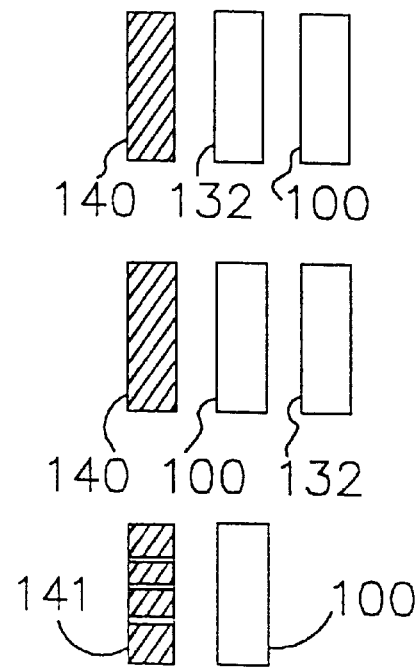

Color display systems are illustrated in FIGS. 28b–d. They comprise filter 100 in combination with a monochrome display. The monochrome display can be an emissive display or a modulator display. The emissive display (130 in FIG. 28b) can be, for example, a single-electron-beam CRT with a phosphor or phosphor combinations that emit white light. Other examples of emissive displays include active-matrix electroluminescent (AMEL) displays and field emission devices (FED). The transmission-mode modulator display of FIG. 28c utilizes multipixel shutter array 132 in combination with backlight source 131. The backlight source can be a lamp or ambient light. The shutter array can have analog or binary switching and can be, for example, a liquid crystal display (LCD). High data rate monochrome LCDs can use fast nematic, DHF, or ferroelectric liquid crystal materials, for example SmC* or SmA*. The reflection-mode modulator of FIG. 28d uses shutter array 132 in combination with ambient light and reflector 140. Because in reflection mode light makes two passive through the color filter, half of a symmetric color filter can be utilized for filter 100. The reflector can be a digital mirror device 141 which provides a monochrome display and eliminates the need for a separate shutter array.

For full color display, field sequential display of the three primary colors is employed. In order for field-sequential color display systems to have a pleasing appearance, the primary images must be presented at sufficient rates that the eye fuses them into full-color. Thus, single-display field sequential systems require a minimum frame rate of 90 Hz to avoid flicker. Likewise, field-sequential full-color cameras require 90 Hz framing to acquire color images at video rates. Field sequential displays require an electronic driving means for switching the filter through the primary color states in sequence, synchronized with the shutter array. Techniques for the design and fabrication of such electronics are well known in the art.

The shutter arrays and the camera receiver are pixelated devices. The polarization switches of color filter 100 can also be pixelated. One application for this is for cases where the camera or display does not have a response time fast enough to record or display a complete frame at the desired framing speed. In this case the color filter can be segmented such that while one segment is still being recorded or displayed, another segment can have moved on to the next color in the sequence. If desired, the passive PRS polarizer itself can be pixelated.

PRS devices can be used in subtractive display systems which use multiple displays interposed between color and neutral polarizers. Such systems produce full-color using a cascade of displays, each operating on a specific primary band. As such, full-color can be produced using video rate black and white displays.

The PRS color polarizers of this invention have been illustrated with specific embodiments described above. These embodiments demonstrate design considerations and the performance of the color polarizers, but are not intended to limit the range and scope of the invention. Sufficient description of structure, design methods and optimization considerations is presented herein to enable one skilled in the art to fabricate virtually endless variations of the color polarizers of this invention. Similarly, the color shutters have been demonstrated with but a few of the multitude of polarization switches and liquid crystal polarization switches known in the art. Application of the color filter of this invention to pixelated displays and recorders has been illustrated herein. Many more specific embodiments of displays and recorders, as well as other applications for the color polarizers and color filters of this invention will be readily apparent to those skilled in the art.

TABLE 1

Five retarder square profile R/C

| Retarder Orientation | Design # | | | |
|---|---|---|---|---|
| | #1 | #2 | #3 | #4 |
| (1) | 66.3 | 44.1 | 24.9 | 11.1 |
| (2) | 16.1 | 10.4 | −9.5 | 12.6 |
| (3) | −23.0 | −46.5 | 21.7 | −2.0 |
| (4) | −27.7 | −6.7 | −37.2 | −36.7 |
| (5) | −15.4 | −33.1 | −53.7 | −72.6 |

TABLE 2

Seven retarder square profile R/C

| Retarder Orientation | Design # | | | | | | | | |
|---|---|---|---|---|---|---|---|---|---|
| | #1 | #2 | #3 | #4 | #5 | #6 | #7 | #8 | #9 |
| (1) | −23.0 | −4.0 | −4.9 | −0.8 | −23.8 | −4.1 | −5.1 | −0.8 | −40.9 |
| (2) | 57.2 | 36.4 | −47.3 | 8.3 | 56.6 | 37.2 | 48.0 | 8.5 | −42.8 |
| (3) | 50.7 | 53.1 | −4.2 | 18.1 | 52.1 | 55.8 | −2.6 | 19.3 | 24.7 |
| (4) | 9.3 | −13.7 | 16.8 | 16.9 | 12.2 | −10.4 | 18.9 | 21.4 | 17.0 |
| (5) | −17.1 | −18.6 | 23.1 | −3.8 | −14.5 | −16.3 | 26.6 | −0.7 | −4.5 |
| (6) | −18.2 | 8.0 | −44.1 | −45.4 | −16.8 | 9.8 | −40.9 | −43.5 | 46.1 |
| (7) | −8.3 | −45.9 | −40.0 | −77.8 | −7.9 | −44.8 | −39.0 | −77.4 | −7.0 |

15

TABLE 3

Šolc R/C

| Design # | Retardance (Waves) | Number of Retarders | Configuration | FWHM | $\lambda_3$ | $\lambda_2$ | $\lambda_1$ | $\lambda_a$ | $\lambda_0$ | $T_0$ | $T_1$ | $T_2$ |
|---|---|---|---|---|---|---|---|---|---|---|---|---|
| 1 | 1.5 | 2 | FOLDED | 121 | — | — | 487 | 580 | 650 | 100 | — | — |
| 2 | 1.5 | 3 | FOLDED | 102 | 444 | 488 | 541 | 599 | 650 | 100 | 1.2 | 1.2 |
| 3 | 1.5 | 4 | FOLDED | 86 | 428 | 487 | 566 | 610 | 650 | 100 | 4.3 | 4.3 |
| 4 | 1.0 | 2 | FAN | 125 | — | — | 452 | 575 | 680 | 100 | — | — |
| 5 | 1.0 | 3 | FAN | 107 | — | 447 | 514 | 594 | 670 | 100 | 1.2 | 1.2 |
| 6 | 1.0 | 4 | FAN | 109 | — | 429 | 532 | 592 | 650 | 100 | 4.2 | 4.2 |

TABLE 4

Šolc G/M

| Design # | Retardance (Waves) | Number of Retarders | Configuration | FWHM | $\lambda_3$ | $\lambda_2$ | $\lambda_1$ | $\lambda_0$ | $\lambda_{-1}$ | $\lambda_{-2}$ | $\lambda_{-3}$ | $T_0$ | $T_1$ | $T_2$ |
|---|---|---|---|---|---|---|---|---|---|---|---|---|---|---|
| 1 | 1.5 | 2 | FOLDED | 135 | — | — | 408 | 545 | — | — | — | 100 | — | — |
| 2 | 1.5 | 3 | FOLDED | 94 | — | 409 | 453 | 545 | 684 | — | — | 100 | 1.2 | — |
| 3 | 1.5 | 4 | FOLDED | 72 | — | 408 | 475 | 545 | 640 | — | — | 100 | 4.3 | — |
| 4 | 2.5 | 2 | FOLDED | 80 | — | — | 453 | 545 | 680 | — | — | 100 | — | — |
| 5 | 2.5 | 3 | FOLDED | 57 | 426 | 454 | 486 | 545 | 621 | 681 | — | 100 | 1.2 | 1.2 |
| 6 | 2.5 | 4 | FOLDED | 43 | 416 | 454 | 501 | 545 | 598 | 680 | — | 100 | 4.3 | 4.3 |
| 7 | 2.0 | 2 | FAN | 100 | — | — | 436 | 545 | 700 | — | — | 100 | — | — |
| 8 | 2.0 | 3 | FAN | 71 | 404 | 436 | 473 | 545 | 643 | — | — | 100 | 1.2 | 1.2 |
| 9 | 2.0 | 4 | FAN | 54 | — | 434 | 490 | 545 | 613 | 700 | — | 100 | 4.2 | 4.2 |
| 10 | 3.0 | 2 | FAN | 67 | — | — | 467 | 545 | 653 | — | — | 100 | — | — |
| 11 | 3.0 | 3 | FAN | 47 | 443 | 467 | 495 | 545 | 607 | 654 | — | 100 | 1.2 | 1.2 |
| 12 | 3.0 | 4 | FAN | 36 | 433 | 465 | 507 | 545 | 589 | 650 | — | 100 | 4.2 | 4.2 |

TABLE 5

Šolc B/Y

| Design # | Retardance (Waves) | Number of Retarders | Configuration | FWHM | $\lambda_0$ | $\lambda_R$ | $\lambda_{-1}$ | $\lambda_{-2}$ | $\lambda_{-3}$ | $T_0$ | $T_1$ | $T_2$ |
|---|---|---|---|---|---|---|---|---|---|---|---|---|
| 1 | 1.5 | 2 | FOLDED | 90 | 430 | 440 | 641 | — | 650 | 100 | — | — |
| 2 | 1.5 | 3 | FOLDED | 76 | 440 | 481 | 552 | 660 | 650 | 100 | 1.2 | 1.2 |
| 3 | 1.5 | 4 | FOLDED | 59 | 450 | 482 | 528 | 671 | 650 | 100 | — | 4.3 |
| 4 | 1.0 | 4 | FAN | 89 | 450 | 499 | 479 | — | 680 | 100 | — | 4.2 |
| 5 | 2.0 | 2 | FAN | 83 | 450 | 495 | 598 | — | 670 | 100 | — | — |
| 6 | 2.0 | 3 | FAN | 58 | 450 | 481 | 531 | 600 | | 100 | 1.2 | 1.2 |
| 7 | 2.0 | 4 | FAN | 45 | 450 | 473 | 507 | 594 | 650 | 100 | 4.2 | 4.2 |

TABLE 6

Split-Element R/C

| Design # | SE Retardance (Waves) | C Retardance (Waves) | $\lambda_{SE}$ | $\lambda_c$ | FWHM | $\lambda_3$ | $\lambda_2$ | $\lambda_1$ | $\lambda_B$ | $\lambda_0$ | $T_0$ | $T_1$ | $T_2$ |
|---|---|---|---|---|---|---|---|---|---|---|---|---|---|
| 1 | 1.5 | 0.5 | 650 | 750 | 131 | — | — | 488 | 572 | 662 | 95 | 8.5 | — |
| 2 | 1.5 | 1.0 | 680 | 630 | 117 | — | 420 | 510 | 586 | 665 | 96 | 6.4 | — |
| 3 | 2.5 | 1.0 | 630 | 670 | 120 | — | 447 | 525 | 582 | 636 | 97 | 6.5 | 4.5 |
| 4 | 2.5 | 1.5 | 650 | 633 | 107 | 406 | 473 | 542 | 594 | 645 | 98 | 6.2 | 14.5 |
| 5 | 3.5 | 1.5 | 630 | 650 | 85 | 441 | 488 | 551 | 594 | 633 | 98 | 6.9 | |
| 6 | 3.5 | 2.0 | 640 | 630 | 81 | 458 | 504 | 560 | 600 | 638 | 99 | 6.1 | 13.2 |
| 7 | 4.5 | 2.0 | 640 | 630 | 63 | 458 | 496 | 495 | 552 | 612 | 99 | 7.7 | 4.7 |
| 8 | 4.5 | 2.5 | 620 | 610 | 62 | 465 | 508 | 558 | 589 | 618 | 99 | 8.1 | 9.5 |
| 9 | 5.5 | 2.5 | 600 | 610 | 51 | 472 | 508 | 550 | 578 | 602 | 99 | 6.0 | 6.8 |

TABLE 7

Split-Element G/M

| Design # | SE Retardance (Waves) | C Retardance (Waves) | FWHM | $\lambda_3$ | $\lambda_2$ | $\lambda_1$ | $\lambda_0$ | $\lambda_{-1}$ | $\lambda_{-2}$ | $\lambda_{-3}$ | $T_0$ | $T_1$ | $T_2$ |
|---|---|---|---|---|---|---|---|---|---|---|---|---|---|
| 1 | 1.5 | 0.5 | 179 | — | — | 409 | 545 | — | — | — | 100 | — | — |
| 2 | 1.5 | 1.0 | 159 | — | — | 409 | 545 | — | — | — | 100 | — | — |
| 3 | 2.5 | 1.0 | 104 | — | — | 454 | 545 | 681 | — | — | 100 | 18.9 | — |
| 4 | 2.5 | 1.5 | 97 | — | 409 | 454 | 545 | 681 | — | — | 100 | 2.4 | — |
| 5 | 3.5 | 1.5 | 73 | — | 409 | 477 | 545 | 636 | — | — | 100 | 14.7 | — |
| 6 | 3.5 | 2.0 | 70 | — | 436 | 477 | 545 | 636 | — | — | 100 | 3.4 | 20.0 |
| 7 | 4.5 | 2.0 | 57 | 409 | 436 | 490 | 545 | 613 | — | — | 100 | 12.7 | 2.1 |
| 8 | 4.5 | 2.5 | 54 | 409 | 454 | 490 | 545 | 613 | 681 | — | 100 | 4.1 | 16.7 |
| 9 | 5.5 | 2.5 | 46 | 428 | 454 | 500 | 545 | 600 | 681 | — | 100 | 11.6 | 2.8 |
| 10 | 55 | 3.0 | 45 | 428 | 467 | 500 | 445 | 600 | 654 | — | 100 | 4.5 | 14.7 |
| 11 | 6.5 | 3.0 | 39 | 443 | 467 | 488 | 545 | 591 | 654 | — | 100 | 10.9 | 3.3 |
| 12 | 6.5 | 3.5 | 38 | 443 | 477 | 506 | 545 | 591 | 636 | — | 100 | 4.9 | 13.4 |

TABLE 8

Split-Element B/Y

| Design # | SE Retardance (Waves) | C Retardance (Waves) | $\lambda_{SE}$ | $\lambda_c$ | FWHM | $\lambda_0$ | $\lambda_R$ | $\lambda_{-1}$ | $\lambda_{-2}$ | $\lambda_{-3}$ | $T_0$ | $T_{-1}$ | $T_{-2}$ |
|---|---|---|---|---|---|---|---|---|---|---|---|---|---|
| 1 | 1.5 | 0.5 | 430 | 410 | 110 | 428 | 510 | 645 | — | — | 100 | — | — |
| 2 | 1.5 | 1.0 | 430 | 450 | 108 | 436 | 501 | 645 | — | — | 99 | — | — |
| 3 | 2.5 | 1.0 | 450 | 430 | 85 | 447 | 494 | 563 | — | — | 98 | 13.5 | — |
| 4 | 2.5 | 1.5 | 440 | 450 | 78 | 443 | 485 | 550 | 675 | — | 99 | 3.7 | — |
| 5 | 3.5 | 1.5 | 460 | 450 | 62 | 460 | 491 | 537 | 675 | — | 99 | 10.8 | — |
| 6 | 3.5 | 2.0 | 450 | 460 | 58 | 452 | 482 | 525 | 613 | — | 99 | 5.9 | 15.2 |
| 7 | 4.5 | 2.0 | 470 | 460 | 49 | 469 | 493 | 529 | 613 | 700 | 99 | 8.0 | 3.8 |
| 8 | 4.5 | 2.5 | 460 | 475 | 46 | 464 | 486 | 518 | 594 | 690 | 95 | 10.5 | 8.7 |
| 9 | 0.75 | | | | | | | | | | | | |
| | 1.25 | 1.5 | 550 | 440 | 97 | 447 | 498 | 550 | 660 | — | 98 | 4.5 | — |

TABLE 9

Two Additive Primary Color Shutters

| Design # | Active Filter (Transmitted Colors) | Blocking Filter (Transmitted Color) | Output (Transmitted Colors) |
|---|---|---|---|
| 1 | Red/Cyan | None | Red/Cyan |
| 2 | Red/Cyan | Yellow | Red/Green |
| 3 | Red/Cyan | Magenta | Blue/Red |
| 4 | Green/Magenta | None | Green/Magenta |
| 5 | Green/Magenta | Yellow | Red/Green |
| 6 | Green/Magenta | Cyan | Blue/Green |
| 7 | Blue/Yellow | None | Blue/Yellow |
| 8 | Blue/Yellow | Magenta | Blue/Red |
| 9 | Blue/Yellow | Cyan | Blue/Green |

TABLE 10

Two Subtractive Primary Color Shutters

| Output | Dye Type Color Polarizer | Stack |
|---|---|---|
| C/M | B | R/C or G/M |
| C/Y | G | R/C or B/Y |
| M/Y | R | G/M or B/Y |

What is claimed is:

1. A transmissive color polarization manipulator, comprising:
a retarder stack comprising at least three retarder films each having a retardance and an orientation selected such that, when light from an optical source passes through the at least three retarder films, a desired spectral portion of the optical source is substantially polarized with a first polarization and a different spectral portion is substantially polarized with an orthogonal polarization, wherein the retardance and orientation of each of the at least three retarder films is selected such that the optical power for the desired spectral portion of the optical source substantially polarized with a first polarization is substantially maximized for the given number of retarder films.

2. The device of claim 1, wherein the at least three retarder films comprise polymer retarders.

3. The device of claim 1, wherein the at least three retarder films comprise thin films.

4. The device of claim 1, wherein the desired spectral portion comprises a desired color.

5. The device of claim 4, wherein the desired color comprises a desired primary color.

6. The device of claim 4, wherein the desired color is saturated.

7. An optical system, comprising:
an optical source that outputs light having a given spectral output and a given power distribution within the spectral output; and
a transmissive color polarization manipulator comprising at least two retarder films optically coupled to the optical source, wherein each of the at least two retarder films has a retardance and an orientation selected such that, when light from the optical source passes through the at least two retarder films, a desired spectral portion of the optical source is substantially polarized with a first polarization and a different spectral portion is substantially polarized with an orthogonal polarization, wherein the retardance and orientation of each of the at least two retarder films is selected such that the optical power for the desired spectral portion of the optical source substantially polarized with a first polarization is substantially maximized for the given number of retarder films.

8. The device of claim 7, wherein the at least two retarder films comprise polymer retarders.

9. The device of claim 7, wherein the at least two retarder films comprise thin films.

10. The device of claim 7, wherein the desired spectral portion comprises a desired color.

11. The device of claim 10, wherein the desired color comprises a desired primary color.

12. The device of claim 10, wherein the desired color is saturated.

13. A transmissive color polarization manipulator, comprising at least five retarder films arranged in a stacked configuration and each having a retardance and an orientation selected such that, when light from an optical source passes through the at least five retarder films, a desired spectral portion of the optical source is substantially polarized with a first polarization and a different spectral portion is substantially polarized with an orthogonal polarization, wherein the retardance and orientation of each of the at least five retarder films is selected such that the optical power for the desired spectral portion of the optical source substantially polarized with a first polarization is substantially maximized for the given number of retarder films.

14. The color polarization manipulator of claim 13, wherein the at least five retarder films comprise one or more polymer films.

15. The color polarization manipulator of claim 13, wherein the at least five retarder films are stacked on top of each other.

16. The color polarization manipulator of claim 13, wherein the at least five retarder films comprise at least fifteen retarder films.

17. The color polarization manipulator of claim 13, wherein at least two or more of the at least five retarder films abut each other.

18. The color polarization manipulator of claim 13, wherein the at least five retarder films abut each other.

19. An optical system, comprising:
an optical source; and
a transmissive color polarization manipulator comprising a plurality of optical retarders optically coupled to each other and to the optical source, each of the plurality of retarders having an orientation and a retardance selected such that, when light from the optical source passes through the plurality of retarders, a desired spectral portion having at least one predetermined color coordinate is substantially polarized with a first polarization and a different spectral portion is substantially polarized with an orthogonal polarization, wherein the retardances and orientations of each of the retarders are selected such that a throughput of the desired spectral portion substantially polarized with a first polarization is substantially maximized for the given number of retarders.

20. The optical system of claim 19, wherein the at least one predetermined color coordinate comprises a predetermined hue.

21. The optical system of claim 20, wherein the predetermined hue corresponds to a primary color.

22. The optical system of claim 19, wherein the at least one predetermined color coordinate comprises a predetermined saturation.

23. The optical system of claim 19, wherein the at least one predetermined color coordinate comprises a predetermined saturation and a predetermined hue.

24. The optical system of claim 19, wherein the desired spectral portion substantially polarized with the first polarization has a substantially saturated hue.

25. The optical system of claim 24, wherein the substantially saturated hue is a substantially saturated primary color.

26. A transmissive color polarization manipulator for receiving light from an optical source and outputting a desired spectral portion having at least one predetermined color characteristic, comprising:

a plurality of retarders optically coupled to each other and to an optical source, each of said plurality of retarders having an orientation and a retardance selected such that, when light from the optical source passes through the plurality of retarders, the desired spectral portion having at least one predetermined color characteristic is substantially polarized with a first polarization and a different spectral portion is substantially polarized with an orthogonal polarization, wherein the retardances and orientations of the retarders are selected such that a throughput of the desired spectral portion substantially polarized with a first polarization is substantially maximized for the given number of retarders.

27. The color polarization manipulator of claim 26, wherein the at least one predetermined color characteristic comprises a predetermined hue.

28. The color polarization manipulator of claim 27, wherein the predetermined hue corresponds to a prixmary color.

29. The color polarization manipulator of claim 26, wherein the at least one predetermined color characteristic comprises a predetermined saturation.

30. The color polarization manipulator of claim 26, wherein the at least one predetermined color characteristic comprises a predetermined saturation and a predetermined hue.

31. The color polarization manipulator of claim 26, wherein the desired spectral portion has a substantially saturated hue.

32. The color polarization manipulator of claim 31, wherein the substantially saturated hue is a substantially saturated primary color.

\* \* \* \* \*